(12) United States Patent
Hampden-Smith et al.

(10) Patent No.: US 7,264,788 B2
(45) Date of Patent: *Sep. 4, 2007

(54) FUEL REFORMER CATALYST AND ABSORBENT MATERIALS

(75) Inventors: Mark J. Hampden-Smith, Albuquerque, NM (US); Paolina Atanassova, Albquerque, NM (US); Jian-Ping Shen, Albuquerque, NM (US); James Brewster, Rio Rancho, NM (US); Paul Napolitano, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 9 days.

This patent is subject to a terminal disclaimer.

(21) Appl. No.: 10/996,791

(22) Filed: Nov. 24, 2004

(65) Prior Publication Data

US 2005/0232858 A1 Oct. 20, 2005

Related U.S. Application Data

(63) Continuation-in-part of application No. 10/723,424, filed on Nov. 26, 2003.

(60) Provisional application No. 60/525,467, filed on Nov. 26, 2003.

(51) Int. Cl.
*C01B 3/02* (2006.01)
*C01B 3/56* (2006.01)

(52) U.S. Cl. .................. 423/648.1; 423/220; 423/230; 423/231; 423/651; 423/652; 423/653; 423/654; 423/655; 423/656

(58) Field of Classification Search ................ 423/220, 423/230, 231, 648.1, 651, 652, 653, 654, 423/655, 656
See application file for complete search history.

(56) References Cited

U.S. PATENT DOCUMENTS

| | | | |
|---|---|---|---|
| 3,516,808 A | 6/1970 | Curran et al. | |
| 3,865,924 A | 2/1975 | Gidaspow et al. | 423/230 |
| 4,231,760 A | 11/1980 | Lancet et al. | 48/197 R |
| 4,316,813 A | 2/1982 | Voss | 252/189 |
| 4,330,430 A | 5/1982 | Lancet et al. | 252/420 |
| 4,775,396 A | 10/1988 | Rastelli et al. | 55/58 |
| 4,810,266 A | 3/1989 | Zinnen et al. | 55/68 |
| 5,079,209 A | 1/1992 | Nalette et al. | 502/411 |
| 5,091,358 A | 2/1992 | Birbara et al. | 502/412 |
| 5,186,727 A | 2/1993 | Chang | 55/35 |
| 5,214,019 A | 5/1993 | Nalette et al. | 502/400 |
| 5,427,751 A | 6/1995 | Nalette et al. | 423/230 |
| 5,454,968 A | 10/1995 | Nalette et al. | 252/192 |
| 5,520,894 A | 5/1996 | Heesink et al. | 423/230 |
| 5,595,949 A | 1/1997 | Goldstein et al. | 502/20 |
| 5,653,955 A | 8/1997 | Wheelock | 423/638 |
| 5,769,909 A | 6/1998 | Bonk et al. | 48/127.9 |
| 6,083,862 A | 7/2000 | Wheelock | 502/41 |
| 6,103,143 A | 8/2000 | Sircar et al. | 252/373 |
| 6,103,393 A | 8/2000 | Kodas et al. | 428/570 |
| 6,113,869 A | 9/2000 | Jain et al. | 423/219 |
| 6,180,029 B1 | 1/2001 | Hampden-Smith et al. | 252/301.4 R |
| 6,228,150 B1 | 5/2001 | Armstrong et al. | 95/139 |
| 6,271,172 B2 | 8/2001 | Ohashi et al. | 502/400 |
| 6,280,503 B1 | 8/2001 | Mayorga et al. | 95/96 |
| 6,303,092 B1 | 10/2001 | Anand et al. | 423/418.2 |
| 6,312,658 B1 | 11/2001 | Hufton et al. | 423/418.2 |
| 6,338,809 B1 | 1/2002 | Hampden-Smith et al. | 264/7 |
| 6,379,430 B1 | 4/2002 | Monereau | 95/96 |
| 6,387,337 B1 | 5/2002 | Pennline et al. | 423/220 |
| 6,387,845 B1 | 5/2002 | Masahiro et al. | 502/407 |
| 6,428,685 B2 | 8/2002 | Khare | 208/208 R |
| 6,479,429 B1 | 11/2002 | Khare | 502/414 |
| 6,565,627 B1 | 5/2003 | Golden et al. | 95/96 |
| 6,589,493 B2 | 7/2003 | Hosaka et al. | 423/230 |
| 6,660,680 B1 | 12/2003 | Hampden-Smith et al. | 502/180 |
| 6,669,917 B2* | 12/2003 | Lyon | 423/437.1 |
| 6,682,838 B2 | 1/2004 | Stevens | 429/17 |
| 6,753,108 B1 | 6/2004 | Hampden-Smith et al. | 429/44 |
| 6,824,576 B2* | 11/2004 | Lightner | 48/127.9 |
| 6,967,183 B2 | 11/2005 | Hampden-Smith et al. | 502/101 |
| 2002/0056686 A1 | 5/2002 | Kyrlidis et al. | 210/656 |
| 2002/0085967 A1 | 7/2002 | Yokota | 422/198 |
| 2002/0088740 A1 | 7/2002 | Krause et al. | 208/46 |
| 2002/0090334 A1 | 7/2002 | Stevens et al. | 423/247 |
| 2003/0035770 A1* | 2/2003 | Cole | 423/648.1 |
| 2003/0103880 A1 | 6/2003 | Bank et al. | 422/211 |
| 2004/0126316 A1* | 7/2004 | Peterson | 423/648.1 |
| 2004/0136901 A1* | 7/2004 | Bakker et al. | 423/648.1 |
| 2005/0230659 A1 | 10/2005 | Hampden-Smith et al. | 252/189 |
| 2005/0232856 A1* | 10/2005 | Stevens et al. | 423/651 |
| 2005/0232858 A1 | 10/2005 | Hampden-Smith et al. | |

OTHER PUBLICATIONS

Byer et al.; Kinetics of the Reaction between HF and CaO for Fluoride Emission Control; Environ. Sci. Technol., vol. 17, No. 2, pp. 84-88, 1983.

(Continued)

*Primary Examiner*—Timothy C. Vanoy
(74) *Attorney, Agent, or Firm*—Marsh Fischmann & Breyfogle LLP

(57) ABSTRACT

Materials that are useful for absorption enhanced reforming (AER) of a fuel, including absorbent materials and catalyst materials and methods for using the materials. The materials can be fabricated by spray processing. The use of the materials in AER can produce a $H_2$ product gas having a high $H_2$ content and a low level of carbon oxides.

80 Claims, 61 Drawing Sheets

OTHER PUBLICATIONS

Dam-Johansen et al.; Catalytic Reduction of Nitric Oxide by Carbon Monoxide Over Calcined Limestone: Reversible Deactivation in the Presence of Carbon Dioxide; Applied Catalysis B: Environmental 5 (1995) 283-304.

Gullett et al.; Reaction Kinetics of Ca-Based Sorbents With HCl; Ind. Eng. Chem. Res. 1992, 31, 2437-2446.

Käßner et al., Comparative Characterization of Basicity and Acidity of Metal Oxide Catalysts For The Oxidative Coupling Of Methane By Different Methods; Applied Catalysis A: General 139 (1996) 107-129.

Koper et al.; Destructive Adsorption of Chlorinated Hydrocarbons On Ultrafine (Nanoscale) Particles of Calcium Oxide; Chem. Mater. 1993, 5, 500-505.

Lawrence et al., The Reactions Between Ca-based Solids and Gases Representative of Those Found In A Fluidized-Bed Incinerator; Chemical Engineering Science 55 (2000) 6129-6137.

Olanders et al., Reduction of Nitric Oxide Over Magnesium Oxide And Dolomite at Fluidized Bed Conditions; Energy & Fuels 1995, 9, 680-684.

Seki et al.; Calcium Oxide and Strontium Oxide As Environmentally Benign and Highly Efficient Heterogeneous Catalysts for the Tishchenko Reaction Of Furfural; Chem. Commun, 2001, 1000-1001.

Shirai et al.; Hot Defluorination of Reducing Gases With Lime-Pellets; Environ. Sci. Techno. 2000, 34, 798-803.

Wei et al.; Effect Of Base Strength And Basicity On Catalytic Behavior Of Solid Bases For Synthesis Of Dimethyl Carbonate From Propylene Carbonate And Methanol; Fuel Processing Technology 83 (2003) 175-182.

Weinell et al.; Hydrogen Chloride Reaction With Lime And Limestone: Kinetics And Sorption Capacity; Ind. Eng. Chem. Res. 1992, 31, 164-171.

Zijlma et al.; The Influence of $H_2O$ and $CO_2$ On The Reactivity Of Limestone For The Oxidation of $NH_3$; Fuel 79 (2000) 1449-1454.

Agnihotri et al.; Influence of Surface Modifiers on the Structure of Precipitated Calcium Carbonate; Ind. Eng. Chem. Res., 1999, 38, 2283-2291.

Balasubramanian et al.; Hydrogen From Methane In A Single-Step Process; Chemical Engineering Science 54 (1999) 3543-3552.

Lin et al.; Hydrogen Production From Coal by Separating Carbon Dioxide During Gasification; Fuel 81 (2002) 2079-2085.

Ortiz et al.; Hydrogen Production Using Sorption-Enhanced Reaction; Ind. Eng. Chem. Res. 2001, 40, 5102-5109.

van der Ham et al.; Proposal For A Regenerative High-Temperature Process For Coal Gas Cleanup With Calcined Limestone; Ind. Eng. Chem Res.; 1996, 35, 1487-1495.

\* cited by examiner

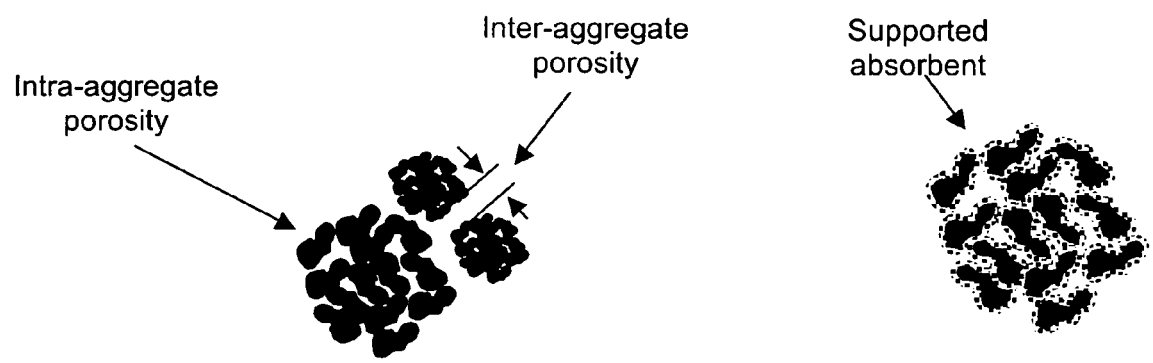
Fig. 8
Fig. 10
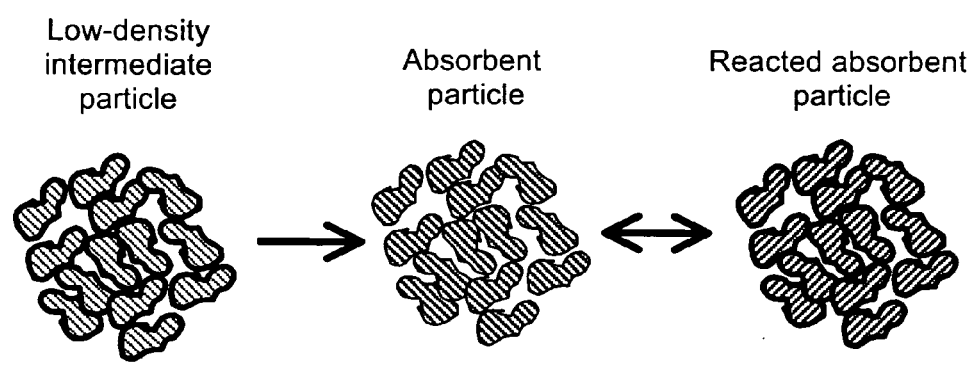
Fig. 11

(a)

(b)

(a)

(b)

(a)

(b)

FUEL REFORMER CATALYST AND ABSORBENT MATERIALS

CROSS-REFERENCE TO RELATED APPLICATIONS

This application is a continuation-in-part application of U.S. patent application Ser. No. 10/723,424 entitled "FUEL REFORMER CATALYST AND ABSORBENT MATERIALS," filed Nov. 26, 2003. This application also claims priority to U.S. Provisional Patent Application Ser. No. 60/525,467 entitled "CARBON DIOXIDE ABSORBENT MATERIALS AND METHODS FOR MAKING SAME", filed on Nov. 26, 2003. This application is also related to U.S. patent application Ser. No. 10/996,672, entitled "PARTICULATE ABSORBENT MATERIALS AND METHODS FOR MAKING SAME", filed on Nov. 24, 2004. The disclosure of each of the foregoing applications is incorporated herein by reference in its entirety.

BACKGROUND OF THE INVENTION

1. Field of the Invention

The present invention relates to particulate materials that are useful for fuel reformers, such as particulate catalyst materials for hydrogen ($H_2$) production from carbon-based fuels and particulate absorbent materials for the removal of acid gases such as $CO_2$ and $H_2S$ from gas streams. The particulate materials can be produced by spray processing of precursors to form a powder batch of the particulate absorbent materials, or intermediate compounds that can be converted to the absorbent material. The present invention is also directed to fuel reformers incorporating the particulate materials and methods for using the materials. The present invention is also directed to the combination of a highly reversible, high-capacity $CO_2$ absorbent material with steam reforming and/or water gas shift catalysts to achieve single step reforming of hydrocarbon fuels to $H_2$ with a high conversion efficiency. The particulate materials can be formed into extrudates, pellets or monoliths, or can be coated onto a substrate.

2. Description of the Related Art

Hydrogen ($H_2$) is an important material in the chemical, petroleum and energy industries. In the chemical and petroleum industries, $H_2$ is used for the manufacture of ammonia ($NH_4$) and methanol ($CH_3OH$), and is used in a variety of petroleum hydrotreating processes. A growing demand for H2 is forecast in the future, particularly for petroleum refining of heavy, high-sulfur crude oil. $H_2$ is also an environmentally clean energy source for the generation of electric power and space heating, and a substantial increase in $H_2$ demand is expected in the near future.

Steam reforming, including steam-methane reforming (SMR), partial oxidation (POX) and autothermal reforming (ATR) are the major processes for $H_2$ production from fossil-based fuels such as natural gas, and are expected to remain processes of choice for the next several decades. These fuel-processing technologies involve multiple steps and severe operating conditions. For example, SMR involves the endothermic reaction of $CH_4$ (methane, e.g., from natural gas) with water to form $H_2$ and carbon monoxide (CO). The primary reformer operates at a temperature of approximately 800° C. to 850° C. and about 20 atm of pressure, and large quantities of supplemental fuel must be burned to supply the energy necessary to maintain the reformer temperature. The reforming step is followed by at least one water gas shift (WGS) reactor to increase the $H_2$ content and reduce the CO content. This is followed by CO cleanup using selective oxidation, hydrogen membrane separation, pressure swing adsorption (PSA) or methanation. The reactions that occur during SMR of $CH_4$, are illustrated by Equations 1 to 3:

$$\text{Reforming } CH_4 + H_2O \rightarrow 3H_2 + CO \tag{1}$$

$$\text{Shift } CO + H_2O \rightarrow H_2 + CO_2 \tag{2}$$

$$\text{Cleanup } CO + O_2 \rightarrow CO_2 \tag{3}$$

Another commercially available method for the production of hydrogen from hydrocarbons is partial oxidation (POX). According to this method, $CH_4$ or a similar hydrocarbon feed stock is oxidized to produce CO and $H_2$ in accordance with the reaction illustrated by Equation 4:

$$CH_4 + \tfrac{1}{2}O_2 \rightarrow 2H_2 + CO \tag{4}$$

The efficiency of the POX reactor is relatively high, however, POX systems are typically less energy efficient than SMR because of the utilization of higher temperatures and the problem of heat recovery.

Auto thermal reforming (ATR) combines some of the features of SMR and POX. In ATR, a hydrocarbon feed such as $CH_4$ is reacted with steam and air to produce a $H_2$-rich gas. Both the SMR and POX reactions take place (Equations 1 and 4). With the correct mixture of input fuel, air and steam, the POX reaction supplies all the heat needed to drive the catalytic SMR reaction. However, as with SMR and POX systems, a WGS reactor and a $H_2$ purification stage are required to remove carbon oxides.

Fuel cells provide electricity through chemical oxidation-reduction reactions and have tremendous advantages over other types of power generation devices in terms of energy efficiency and environmental compatibility. For low temperature applications, the most promising type of fuel cell is the proton exchange membrane (PEM) fuel cell, which employs $H_2$ as a fuel in the anode and $O_2$ as an oxidant in the cathode. However, the cost of constructing the distribution infrastructure to safely transport pure $H_2$ gas over long distances presents an economic barrier to the exploitation of fuel cells, particularly for the transportation sector. Therefore, distributed production by smaller reforming systems that convert hydrocarbons to $H_2$ is a more viable option for the near future. However, conventional fuel-processing technologies for $H_2$ production from hydrocarbons are unsatisfactory for providing $H_2$ to PEM fuel cells due to low reforming efficiencies resulting from the multiple steps and severe operating conditions that are required, as is discussed above. Further, the reformate typically has a low $H_2$ content (45 to 50 mol. % on a dry basis) and a high CO and $CO_2$ content. The reformate can also include other gases, such as $N_2$, depending on the reforming method.

The low $H_2$ content in the reformate reduces the fuel cell performance and requires that greater amounts of expensive CO tolerant catalysts (typically Pt-based) and membrane materials be utilized for reasonable system efficiency as compared to fuel cells operating on pure $H_2$. The high levels of $CO_2$ in the reformate also cause two additional problems. The $CO_2$ converts to CO in the PEM stack due to the reverse water gas shift reaction (reverse of Equation 2) and the CO can poison the catalyst. Also, the acidic nature of $CO_2$ and water solutions promotes a number of reactions that can reduce the useful lifetime of the PEM stacks to some extent.

The deficiencies of conventional fuel reforming processes can be overcome to a certain extent by following the WGS step with amine scrubbing, hydrogen membrane separation and/or pressure swing adsorption (PSA). With amine scrubbing it is often necessary to further reduce the concentration of carbon oxides to trace levels by methanation. PSA requires operation at a significant pressure, which lowers system efficiency and produces a tail gas containing 25% to 30% of the $H_2$ produced during column blowdown and purge. While the energy content of the tail gas can be recovered and used in the reforming process, it is often the case that the energy content of the combined fuel cell anode tail gas and the purification tail gas is greater than the energy required by the reforming process.

A variety of approaches have been explored to develop a fuel processing technology that uses simple chemical processes, has low energy consumption and generates high purity $H_2$. These include the application of reaction-separation membranes and the application of absorption materials. One promising approach is absorption enhanced reforming (AER). AER combines a SMR catalyst and a $CO_2$ absorbent (e.g., CaO) in a single reactor so that reforming, shift, and $CO_2$ absorption occur simultaneously.

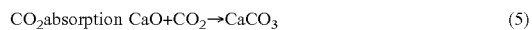

$$CO_2 \text{ absorption } CaO + CO_2 \rightarrow CaCO_3 \qquad (5)$$

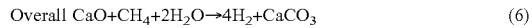

$$\text{Overall } CaO + CH_4 + 2H_2O \rightarrow 4H_2 + CaCO_3 \qquad (6)$$

Many potential benefits over conventional reforming have been demonstrated using AER. These include: (i) reforming at a significantly lower temperature (about 600° C.), while achieving an increased conversion of $CH_4$ to $H_2$; (ii) lower capital cost as compared to conventional SMR; (iii) producing $H_2$ at feed gas pressure (200 to 400 psig) and at relatively high purity (>95%) directly from the reactor; (iv) reducing or even eliminating downstream purification steps; (v) minimizing side reactions and increasing catalyst lifetime; (vi) reducing the excess steam used in conventional reforming, particularly when treating heavy fuels; and (vii) effective fixing of the $CO_2$.

It should be noted that various terminology has been used in the literature to describe the reaction of $CO_2$ and a solid material such as CaO. Among the terms used are adsorption, absorption, sorption and fixing of $CO_2$. In general, none of these terms precisely describes this complex process, which starts with adsorption of the $CO_2$ onto the surface of a solid, followed by a chemical conversion of the solid and expansion of this process into the bulk of the solid. Therefore, the terms adsorption, absorption and fixing (to describe the process), and adsorbent and absorbent (to describe the solid material) are used interchangeably within the present specification.

The use of AER for $H_2$ production for use in a fuel cell has been disclosed in U.S. Pat. No. 6,682,838 by Stevens. The benefits of this approach for hydrogen production from solid fuels such as biomass and coal have also been demonstrated by S. Lin et al. (*Fuel* 2002, 81, 2079).

There are a variety of $CO_2$ absorption materials available for AER. Reactive $CO_2$ absorption materials such as CaO-based absorbents are preferred because these types of materials typically have much higher equilibrium capacities than other absorbents. For example, under ideal conditions methylethanolamine captures 6 g/100 g (grams of $CO_2$ per 100 gram of material), silica gel absorbs 1.32 g/100 g, and activated carbon absorbs 8.8 g/100 g. Materials used for PSA such as $K_2CO_3$/Hydrotalcite can only remove a small portion of $CO_2$, about 1.98 g/100 g. In contrast, CaO can capture up to 78.57 g/100 g. Even assuming only a 50 wt. % capacity over repeated cycles, the value of 39.3 g/100 g for CaO is 5 to 10 times higher than the above absorbents.

The conversion of hydrocarbons in the presence of steam and a $CO_2$ absorbent can be traced back to as early as 1868. Recently some results for hydrogen production using this concept have been reported by D. P. Harrison et al., Chemical Engineering Science 1999, 54, 3543. The $CO_2$ absorbents typically used for AER in the literature have poor reactivity, low $CO_2$ capacity, and poor recyclability. The key to successfully commercialize AER methods is to develop an absorbent with high activity and capacity, and particularly with high recyclability to maintain sufficient activity and capacity over numerous carbonation and decarbonation cycles.

Natural CaO-based absorbents such as limestone and dolomite are plentiful and inexpensive, but they are soft and friable and do not stand up well to handling and recycle use. To improve the recyclability, some work has been focused on the pelletizing of limestone by using different binders. See, for example, U.S. Pat. No. 4,316,813 by Voss et al. Some work also focused on the modification of natural materials such as dolomite to tailor the physicochemical properties of the material. The synthesis of a CaO-based absorbent through boiling of CaO into $Ca(OH)_2$ or the carbonation of calcium salt solution such as calcium nitrate or $Ca(OH)_2$ into calcium carbonate, then decomposition of the carbonate into CaO has been disclosed by L. S. Fan et al., Ind. Eng. Chem. Res., 1999, 38, 2283. Others have disclosed the preparation of CaO-based materials by aerogel methods.

Another class of sorption materials effective for $CO_2$ removal for both syngas and effluents are lithium-base materials such as mixed oxides of lithium with silicon and/or zirconium. For example lithium zirconate (e.g., $LiZrO_2$) and lithium silicates (having the general formula $Li_xSi_yO_z$) as is described in U.S. Pat. No. 6,387,845 by Masahiro et al., the contents of which are incorporated herein by reference in its entirety, are examples of such materials. It is disclosed that these materials can also incorporate other dopants to enhance their performance, such as Al, K, Fe, Mg and the like, and that the lithium-based materials are reversible upon the application of heat. While the use of lithium zirconate is more widespread at present, the adoption of lithium silicate is increasing due to its lower production costs, lighter weight and more rapid $CO_2$ absorption capabilities. For example, one gram of lithium silicate is capable of absorbing 62 milligrams of $CO_2$, making the material 30 times more efficient than lithium zirconate. Lithium silicate is also 70 percent lighter and about 85 percent less expensive than lithium zirconate, since it uses silicon instead of the more expensive zirconium as a starting material.

The foregoing methods generally result in limited control over the composition and microstructure of the powders. The morphology and surface properties such as surface area, pore volume and pore size are among the characteristics that have a critical impact on the performance of the absorbent. This is due to the nature of the reactions that occur. First, carbonation takes place on the external and internal surfaces of CaO-based absorbent, which forms a carbonate layer. Then, the chemical reaction advances with the diffusion of $CO_2$ through the carbonate layer into the unreacted core CaO active sites. Therefore, higher reactivity and faster kinetics can be expected for small particle size CaO due to the higher surface to bulk ratio of the absorbent species. A more porous structure will also lead to higher reactivity and recyclability, and a lower decarbonation temperature due to the easier $CO_2$ diffusion into or out of the outer carbonate layer.

Despite the theoretical improvement offered by AER, it has not been widely implemented. One of the major barriers to the implementation of AER has been the need for a $CO_2$ absorbent with high performance (e.g., high $CO_2$ absorption capacity) that does not degrade significantly over the number of cycles (removal of $CO_2$ and generation of $H_2$ followed by regeneration of the $CO_2$ absorbent) that are required for a commercial product. That is, after $CO_2$ absorption, the absorbent must be regenerated, (decarbonized), to remove the absorbed $CO_2$. Currently available absorbent materials start to degrade in performance over just a few cycles and cannot retain a high constant capacity during subsequent cycles, and therefore are not commercially useful for most applications.

It would be advantageous to provide a method for producing absorbent powders that would enable control over the powder characteristics such as particle size, surface area and pore structure, as well as the versatility to accommodate compositions which are either difficult or impossible to produce using existing production methods. It would be particularly advantageous if such powders could be produced in large quantities on a substantially continuous basis. Further value can be derived from these powders if they can be incorporated into structures that can be integrated into reactor beds that enable a suitable combination of high space velocity and high absorption capacity while retaining their performance characteristics.

SUMMARY OF THE INVENTION

The present invention is generally directed to methods and materials that are useful for the conversion of a carbon-based fuel to a $H_2$-rich product gas. These methods are referred to herein as absorption enhanced reforming (AER).

According to one embodiment of the present invention, a method for the conversion of a carbon-based fuel to a $H_2$-rich gas is provided. The method includes the steps of providing a carbon-based fuel, converting the carbon-based fuel to an intermediate gas product by contacting the carbon-based fuel with at least a first conversion catalyst, contacting the intermediate gas product with an absorbent material to absorb $CO_2$ and form a $H_2$-rich gas, where the absorbent material has a theoretical absorption capacity for $CO_2$. The $H_2$-rich gas is extracted from the contacting step and the absorbent is then regenerated. The above steps are repeated at least ten times, wherein the absorbent material retains at least about 50 mol. % of its theoretical absorption capacity after each of the repeating steps. Thus, the absorbent material advantageously maintains a high absorption capacity over a number of cycles. According to one aspect of this embodiment of the present invention, the converting step includes steam reforming of the carbon-based fuel and the first conversion catalyst is a steam reforming catalyst. The converting step can also be selected from the group consisting of auto-thermal reforming, partial oxidation and catalytic partial oxidation of the carbon-based fuel. The $H_2$-rich gas that is extracted from the contacting step can be further contacted with a water-gas shift catalyst.

The absorbent material can also retain a high absorption capacity over many more cycles and in one embodiment can maintain its absorption capacity over at least 50 cycles, over at least 100 cycles and even over 500 cycles. Further, the absorbent material can retain 70 mol. % and even at least 90 mol. % of its theoretical capacity after each of the repeating steps. In one embodiment, the steps are repeated at least 200 times and the absorbent material retains at least about 10 mol. % of its theoretical absorption capacity after each repeating step. The absorbent material can even retain at least about 25 mol. % and even about 50 mol. % of its theoretical absorption capacity after each of the 200 repeating steps.

The absorbent material of the present invention can include a metal oxide selected from the group consisting of Group 1 and Group 2 metal oxides. For example, the absorbent material can be a calcium-containing compound such as calcium oxide. The absorbent material in one aspect is selected from the group consisting of $CaO:MgO$, $CaO:Al_2O_3$, $CaO:TiO_2$, $CaO:ZrO_2$ and $CaO:Al_2O_3:MgO$. Particularly preferred among these are $CaO:Al_2O_3$, $CaO:TiO_2$. The absorbent material preferably includes at least about 30 weight percent CaO. Other preferred absorbent materials include lithium oxide.

It is preferred that the contacting step occurred at a temperature of not greater than about 800° C. The carbon-based fuel can be a hydrocarbon-based fuel, can be a gaseous fuel such as methane or can be a liquid fuel such as diesel fuel, JP-8 aviation fuel, kerosene, ethanol or gasoline. The fuel can also be LPG. According to one aspect, the $H_2$-rich gas that is extracted from the contacting step includes at least about 95 mol. % $H_2$ after each of the repeating steps.

According to one aspect, the regenerating step includes heating the absorbent material to a temperature of at least about 700° C. The absorbent material can be pelletized, can be in the form of monolith or can be an extrudate. Further, the conversion catalyst can also be pelletized. According to one aspect, the absorbent and the first conversion catalyst are formed into extrudates where the extrudate includes both the absorbent material and the first conversion catalyst. The absorbent material can have a substantially spherical morphology.

The absorbent material is also capable of retaining at least about 10 grams $CO_2$ per 100 grams of unreacted absorbent compound after each of the repeating steps. According to another aspect, the absorbent material can retain at least about 20 grams and even at least about 40 grams of $CO_2$ per 100 grams of unreacted absorbent compound after each of the repeating steps.

According to another embodiment of the present invention, a steam-reforming catalyst is provided. The steam reforming catalyst includes a particulate support structure and a metal dispersed on the support structure. The steam-reforming catalyst has a high conversion efficiency and in one aspect is capable of achieving at least about 90% of the theoretical thermodynamic conversion of methane to hydrogen at a temperature of 600° C., a $H_2O:C$ ratio of 3:1 and a gas hour space velocity (GHSV) of 5000 $h^{-1}$ in the absence of an absorbent for $CO_2$. According to another aspect, the catalyst achieves at least about 90% of the theoretical thermodynamic conversion. According to another aspect, the catalyst achieves at least about 90% of the theoretical thermodynamic conversion of methane to hydrogen at a temperature of 600° C., a $H_2O:C$ ratio of 3:1 and a gas hour space velocity (GHSV) of 10000 $h^{-1}$ in the absence of an absorbent for $CO_2$.

According to another aspect, the catalyst achieves at least about 90% of the theoretical thermodynamic conversion of methane to hydrogen at a temperature of 600° C., a $H_2O:C$ ratio of 3:1 and a gas hour space velocity (GHSV) of 12500 $h^{-1}$ in the absence of an absorbent for $CO_2$.

According to another aspect, the support is selected from the group consisting of the metal oxides of aluminum, cerium, zirconium, lanthanum, silicon, magnesium, zinc and combinations thereof.

According to another aspect, the dispersed metal is selected from the group consisting of Rh, Ni, Ru, Pt, Pd and alloys thereof. According to another aspect, the reforming catalyst comprises from about 0.1 wt. % to about 5 wt. % of the metal. According to another aspect, the support structure comprises $Al_2O_3$ and the dispersed metal comprises Rh.

According to another aspect, the reforming catalyst is pelletized. According to another aspect, the reforming catalyst is coated on a support. According to another aspect, the reforming catalyst has substantially spherical morphology.

According to another embodiment of the present invention, a particulate composite material is provided that includes a first phase comprising an absorbent material adapted to absorb $CO_2$ and a second phase comprising a conversion catalyst selected from the group consisting of a reforming catalyst and a water-gas shift catalyst.

According to one aspect the absorbent material comprises a calcium compound.

According to another aspect the mass ratio of the absorbent material to the conversion catalyst is greater than 1:1. According to another aspect the mass ratio of the absorbent material to the conversion catalyst is from about 20:1 to about 3:1. According to another aspect the mass ratio of the absorbent material to the catalyst is from about 9:1 to about 5:1.

According to another aspect, the catalyst is a reforming catalyst, such as one comprising a metal selected from Rh, Ni, Ru, Pt, Pd, and alloys thereof dispersed on a support phase selected from the group consisting of metal oxides of aluminum, cerium, zirconium, lanthanum, silicon, magnesium, zinc and combinations thereof.

According to another aspect the catalyst is a water-gas shift catalyst, such as one comprising a metal dispersed on a support phase, the metal being selected from the group consisting of Fe, Co, Cu and Cr.

According to one aspect the particulate composite material is pelletized. According to another aspect the particulate composite material is coated on a support structure.

According to another aspect the absorbent material comprises an absorbent compound having a reaction fraction of at least about 70 mol. %.

According to another aspect the absorbent material comprises an absorbent compound having a reaction fraction of at least about 30 mol. % after 100 cycles.

According to another aspect the absorbent material comprises a reversible absorbent compound.

According to another aspect the absorbent material comprises an absorbent compound that retains at least about 50 mol. % of the theoretical $CO_2$ absorption capacity of the absorbent compound after at least about 10 cycles.

According to another aspect the absorbent material comprises an absorbent compound that retains at least about 70 mol. % of the theoretical $CO_2$ absorption capacity of the absorbent compound after at least about 10 cycles.

According to another aspect the absorbent material comprises an absorbent compound that retains at least about 90 mol. % of the theoretical $CO_2$ absorption capacity of the absorbent compound after at least about 10 cycles.

According to another aspect the absorbent material comprises an absorbent compound that retains at least 10 grams $CO_2$ per 100 grams of unreacted absorbent compound after 10 cycles.

According to another aspect the absorbent material comprises an absorbent compound that retains at least 20 grams $CO_2$ per 100 grams unreacted absorbent after 10 cycles.

According to another aspect, the absorbent material comprises an absorbent compound that retains at least 30 grams $CO_2$ per 100 grams unreacted absorbent after 10 cycles.

According to another aspect the absorbent material comprises an absorbent compound that retains at least 40 grams $CO_2$ per 100 grams unreacted absorbent after 10 cycles.

According to another aspect the absorbent material comprises an absorbent compound that retains at least 50 grams $CO_2$ per 100 grams unreacted absorbent after 10 cycles.

According to another aspect the composite material has substantially spherical morphology.

According to another embodiment, a method for the fabrication of composite particles including an absorbent material and a catalyst is provided. The method includes the steps of forming a precursor solution, the precursor solution comprising: (i) a liquid; (ii) a precursor to an absorbent material; and (iii) a precursor to a catalyst phase. The precursor solution is atomized to form precursor droplets and which are heated to remove the liquid therefrom and form the composite particles.

According to another aspect the heating step comprises a first heating step to react the active absorbent precursor to an intermediate precursor compound and a second heating step to convert the intermediate precursor compound to the absorbent material. According to another aspect, the second heating step is at a temperature that is higher than the first heating step.

According to another aspect, the heating step comprises heating the precursor solution to a temperature sufficient to form the absorbent material in a single step.

According to another aspect the absorbent material precursor is selected from the group consisting of calcium oxalate, calcium nitrate, calcium acetate, calcium lactate and calcium hydroxide.

According to another aspect the absorbent material precursor comprises calcium nitrate.

According to another aspect the precursor solution further comprises a porosity enhancing agent.

According to another aspect the catalyst phase precursor comprises a precursor to a metal selected from the group consisting of Rh, Ni, Ru, Pt, Pd and alloys thereof.

According to another aspect the catalyst phase precursor comprises a precursor to Rh.

According to another aspect the catalyst phase precursor comprises particulate alumina.

According to another aspect the composite particles have an average particle size ($d_{50}$) of from about 1 μm to about 30 μm.

According to another aspect the heating step comprises heating the precursor droplets to a temperature of at least about 200° C.

According to another aspect the heating step is carried out in a spray dryer.

According to another aspect the composite particles have substantially spherical morphology.

According to another embodiment of the present invention, a method for the fabrication of a conversion catalyst is provided. The method includes the steps of forming a precursor solution comprising a metal precursor and a support precursor and atomizing the precursor solution to form precursor droplets, and heating the precursor droplets to convert at least the metal precursor to metal-containing clusters dispersed on the support.

According to one aspect the metal precursor is selected from group consisting of acetate and nitrate salts of Rh, Ni, Ru, Pt, Pd and mixtures thereof.

According to another aspect the support precursor is selected from the group consisting of alumina, ceria, zirconia, silica, magnesium oxide, zinc oxide and combinations thereof.

According to another aspect the support precursor is selected from the group consisting of acetate and nitrate salts of aluminum, cerium, zirconium, silicon, magnesium, zinc and combinations thereof.

According to another aspect the heating step comprises heating the precursor droplets to a temperature of at least about 200° C.

According to another aspect the heating step comprises heating the precursor droplets to a temperature of at least about 300° C.

According to another aspect the heating step is carried out in a spray dryer.

According to another aspect the heating step is carried out in a spray pyrolysis reactor.

According to another aspect the particles have substantially spherical morphology.

According to another embodiment of the present invention, a method for the fabrication of a particulate absorbent material is provided. The method can include the steps of atomizing a liquid-containing precursor solution to form precursor droplets, the precursor solution comprising at least a first precursor to an absorbent compound, heating the precursor droplets to form dried precursor droplets, and converting the dried precursor droplets to an absorbent material comprising an absorbent compound.

According to one aspect, the heating step and the converting step occur sequentially in a spray pyrolysis operation. According to another aspect, the heating step forms an intermediate compound capable of being post-processed to form a particulate absorbent material, and the converting step comprises heating the intermediate compound to form the particulate absorbent material.

According to another aspect, the first precursor is at least partially soluble in the precursor solution. According to another aspect, the first precursor is selected from the group consisting of metal oxalates and metal hydroxides. According to another aspect, the first precursor is selected from the group consisting of calcium nitrate, calcium acetate, calcium oxalate and calcium hydroxide. According to another aspect, the first precursor comprises calcium oxalate.

According to another aspect, the heating step comprises heating the droplets in the presence of an oxygen-containing gas.

According to another aspect, the precursor solution further comprises a morphology-enhancing agent, such as a morphology-enhancing agent selected from the group consisting of lactic acid, glycine, alcohols, ammonium nitrate, polymers and carbohydrazide.

According to another aspect, the precursor solution further comprises a second precursor, the second precursor being selected to form a compound selected from the group consisting of aluminum oxides, magnesium oxides, silicon oxides and titanium oxides. According to another aspect, the precursor solution further comprises a second precursor, the second precursor being selected to form magnesium oxide. According to another aspect, the precursor solution further comprises a second precursor comprising magnesium nitrate. According to another aspect, the precursor solution further comprises a second precursor, the second precursor being selected to form alumina. According to another aspect, the precursor solution further comprises a second precursor comprising particulate alumina.

According to another aspect, the precursor solution further comprises a second precursor, the second precursor being selected to form a metal selected from the group consisting of Mg, Ni, Zn and Cu.

According to another aspect, the heating step comprises heating the precursor droplets to a temperature of at least about 300° C.

According to another aspect, the converting step comprised heating the intermediate compound.

According to another aspect, the atomizing step comprises atomizing the precursor solution using a spray nozzle. According to another aspect, the atomizing step comprises atomizing the precursor solution using ultrasonic transducers.

According to another aspect, the particles have an average size of from about 1 μm to about 50 μm. According to another aspect, the particulates have substantially spherical morphology.

According to one aspect, the absorbent material comprises CaO. According to another aspect, the absorbent material comprises ZnO. According to another aspect, the absorbent material comprises $Li_2O$.

These and other aspects of the present invention are described in more detail herein below.

DESCRIPTION OF THE DRAWINGS

FIG. 8 illustrates the aggregate particle morphology of a particulate absorbent material according to an embodiment of the present invention.

FIG. 10 illustrates the aggregate particle morphology of a supported absorbent material according to an embodiment of the present invention.

FIG. 11 illustrates the aggregate particle morphology of an absorbent material according to an embodiment of the present invention.

DESCRIPTION OF THE INVENTION

Figure 1:
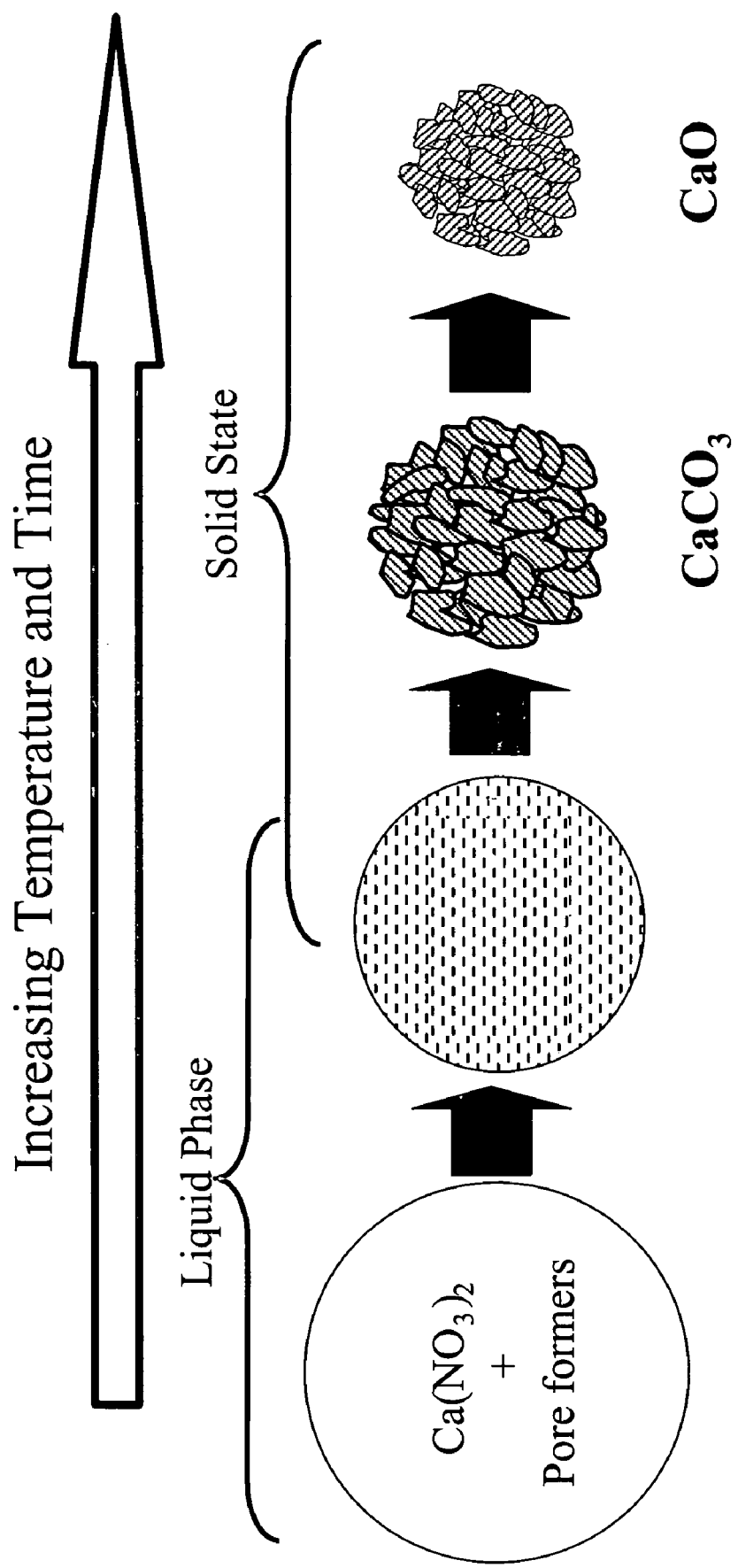
FIG. 1 schematically illustrates a spray pyrolysis method for the fabrication of particles according to an embodiment of the present invention.

The present invention is directed to improved materials, and methods for making the materials, that are particularly useful in absorption-enhanced reforming (AER) processes for the production of a hydrogen-rich gas from carbon-based fuels such as hydrocarbons. The materials can include, but are not limited to, absorbent materials, such as CaO-based reactive absorbent materials for $CO_2$ absorption, and catalytic materials, such as supported $Rh/Al_2O_3$ catalysts for steam reforming and the water-gas shift reaction. Absorbent materials and catalytic materials are collectively referred to herein as active materials.

The "absorption" of one species by an absorbent material can occur by a variety of different mechanisms and is often described using a number of different terms, which can often lead to confusion. In the present application, the word absorption and the process of absorption is used in the broadest sense to include at least physisorption, chemical absorption and absorption with chemical reaction.

The absorbent materials according to the present invention include at least a first absorbent compound. Preferably the absorbent compound is a reactive absorbent compound. Preferred reactive absorbent compounds can be selected from metal oxides, and in particular can be selected from Group 1 and Group 2 metal oxides. Examples of Group 1 metal oxides include lithium oxide ($Li_2O$), sodium oxide ($Na_2O$) and potassium oxide ($K_2O$). Examples of Group 2 metal oxides include magnesium oxide (MgO), calcium oxide (CaO), strontium oxide (SrO) and barium oxide (BaO). Particularly preferred among these for $CO_2$ absorption are the Group 2 metal oxides, particularly calcium oxide. Lithium oxide is also preferred for some applications. It will be appreciated that other metal oxide compounds (e.g., silver oxide) may be useful for the absorption of a particular chemical species, and such metal oxide compounds are also within the scope of the present invention. It will be appreciated that combinations of two or more absorbent compounds can also be utilized in the absorbent material.

Preferred steam reforming catalysts include rhodium (Rh) metal dispersed on a support such as alumina ($Al_2O_3$). The active metal species can also include metals such as nickel (Ni), platinum (Pt), palladium (Pd) and combinations of these metals. These and other active materials are discussed in more detail below.

Overview of Spray Processing

The materials of the present invention are preferably fabricated by spray drying, spray conversion or spray pyrolysis methods, which are collectively referred to herein as spray processing methods. The spray processing methods of the present invention are capable of producing a wide variety of active materials and microstructures. The major attribute of spray processing is the ability to fabricate compositions and microstructures that cannot be fabricated by other powder manufacturing methods, combined with the ability to economically produce high volumes of material. The flexibility to fabricate unique combinations of compositions and microstructures comes from the fact that spray processing combines aspects of both liquid phase and solid state processing.

Spray processing generally includes the step of providing a precursor composition, typically in a flowable liquid form. The precursor composition typically includes at least a precursor to the desired active material. In the case of supported active materials, the precursor composition can also include a precursor to or a suspension of the support phase. The precursor composition is atomized to form a suspension of liquid precursor droplets and the liquid is removed from the liquid precursor droplets, such as by heating, to form the desired powder, or a dry precursor to the desired powder. Typically, at least one component of the liquid precursor is chemically converted into a desired component of the powder.

Group 1 and Group 2 metal oxides are preferred absorbent materials according to one embodiment of the present invention. Spray processing precursors for Group 1 and Group 2 metal oxides can be selected from Group 1 metal salts and Group 2 metal salts, such as nitrate, oxalate, acetate and hydroxide metal salts, with oxalates, nitrates and hydroxides being particularly preferred for some applications. Thus, particularly preferred precursors include Ca-oxalate, Ca-nitrate, Ca-hydroxide, Li-oxalate, Li-nitrate and Li-hydroxide.

According to one embodiment, precursors such as oxalates may be formed in a liquid precursor solution from which droplets are subsequently formed by spray processing. For example, a nitrate salt ($M(NO_3)_x$) where M is a metal, can be reacted with ammonium oxalate to precipitate M-oxalate in the liquid.

It is often desirable to form the metal oxide absorbent with a high level of porosity or crystallinity and therefore it may be advantageous to include a morphology enhancing agent in the liquid precursor composition, where the morphology enhancing agent is adapted to enhance the porosity or crystallinity of the final powder. Morphology enhancing agents can preferably be selected from lactic acid, glycine, alcohols, ammonium nitrate, polymers and carbohydrazide. The amount of morphology enhancing agent in the precursor solution can be varied, and in one embodiment is from about 5 vol. % to about 40 vol. % of the total amount of precursors in the precursor solution.

Other components can be included in the absorbent materials according to the present invention, as is discussed in more detail below. Included among these are inert materials such as aluminum oxides (e.g., $Al_2O_3$), magnesium oxides (e.g., MgO), silicon oxides (e.g., $SiO_2$), titanium oxides (e.g., $TiO_2$) and mixtures of two or more oxides. As used herein, inert materials are those that are substantially non-reactive with the chemical species such as $CO_2$ within the temperature range that the reactive absorbent compound is reactive with the chemical species. For example, MgO is reactive with $CO_2$ at relatively low temperatures, but is considered inert with respect to a CaO absorbent compound since MgO does not react with $CO_2$ at the high temperatures utilized with CaO. Precursors for such materials can include metal oxides and metal salts, particularly nitrate salts such as Al-nitrate or Mg-nitrate. In addition, the absorbent material can include other metals such as iron (Fe), magnesium (Mg), zinc (Zn) and copper (Cu). Precursors for these metals can be selected from the metal nitrates, sulfates, carbonates, acetates, oxalates, hydroxides and metal oxide nanoparticles, including fumed metal oxides.

For the production of catalyst materials according to the present invention, a precursor to the active metal species is provided. For example, Rh precursor can preferably be selected from rhodium metal salts such as rhodium acetate $Rh(OAc)_3$ and rhodium nitrate $Rh(NO_3)_3$. The active metal species can also include metals such as nickel (Ni), platinum (Pt) and palladium (Pd) and precursors for these metals can be selected from nitrates, ammines, hydroxides, chlorides and the like.

Figure 2:
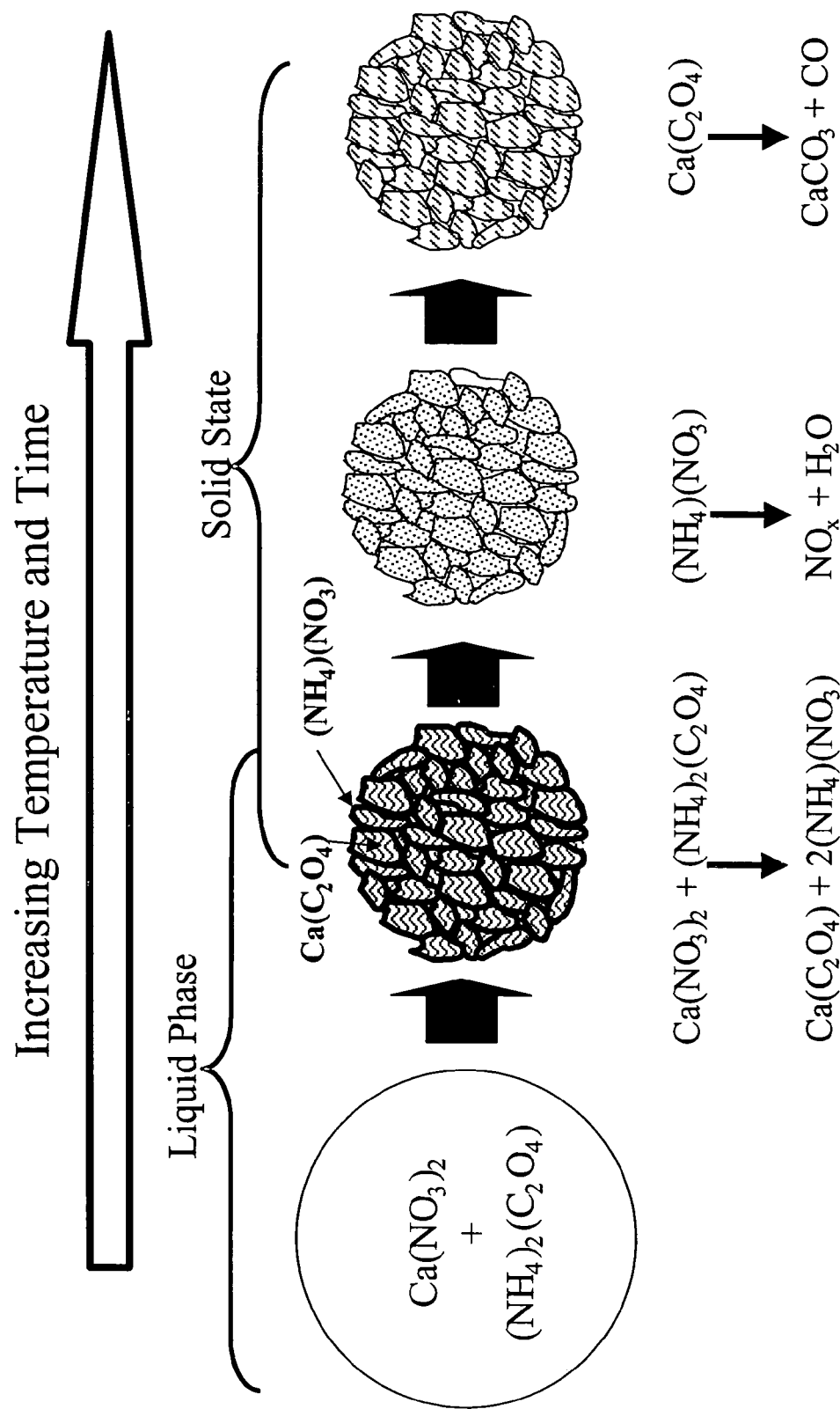
FIG. 2 schematically illustrates a spray conversion method for the fabrication of particles according to an embodiment of the present invention.
Figure 3:
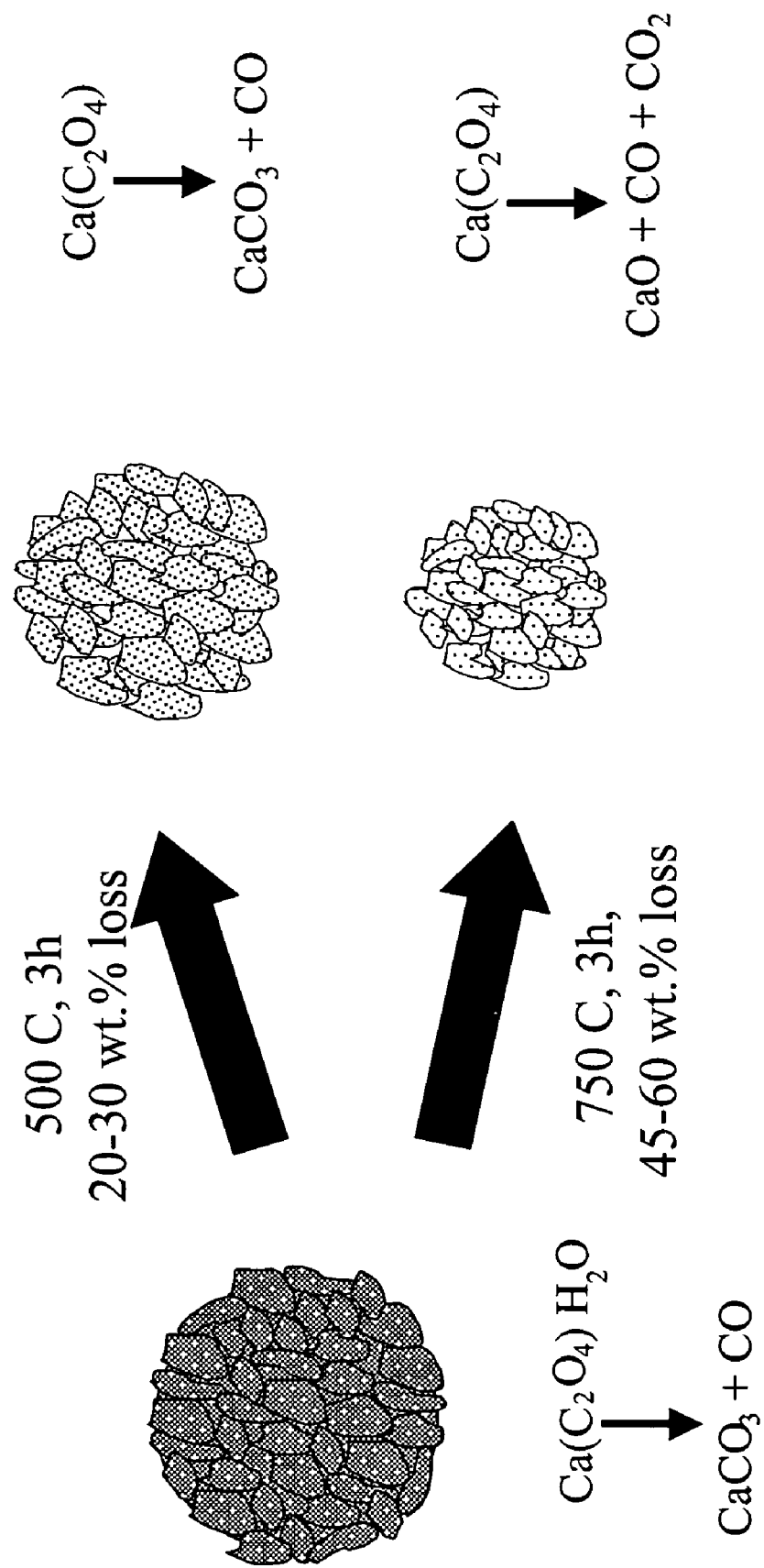
FIG. 3 schematically illustrates a post-processing method for the fabrication of particles according to an embodiment of the present invention.

The spray processing methods can combine the drying of the precursors and the conversion to the active material in one step in the same reactor, where both the removal of the solvent and the conversion of a precursor occur essentially simultaneously. Although the following discussion is directed primarily to the production and use of CaO as an absorbent material, it will be appreciated that the methods are also applicable to other metal oxide absorbent compounds disclosed herein. This method is referred to as spray pyrolysis, and is schematically illustrated in FIG. 1 for the production of CaO from $Ca(NO_3)_2$. In another embodiment, the spray processing method dries the precursors and partially converts the precursors to an intermediate compound that can subsequently be converted to the absorbent material. This method is schematically illustrated in FIG. 2 for the production of a $CaC_2O_4$ intermediate compound. The complete conversion to the active material and/or the crystallization of the active material can occur in a second step, such as the step that is schematically illustrated in FIG. 3 for the conversion of $CaC_2O_4$ to CaO or $CaCO_3$. This second step is referred to herein as post-processing. Thus, spray processing can be followed by heating or calcination, e.g., a method illustrated in FIG. 2 followed by a method such as that illustrated in FIG. 3. By varying reaction time, temperature and type of precursors, the spray processing methods can produce powder morphologies and active material structures that yield improved performance.

When the active material phase is dispersed on an inert support in the form of active material clusters, the precursor composition can include particulates that form the inert support phase. According to the present invention, such particulates can include particulate carbon or particulate aluminum oxide, such as particulate boehmite.

Preferably, the supported active material phase is formed while the precursor to the active material phase is in intimate contact with the surface of the support phase particles and the active material precursor is rapidly reacted on the surface of the support phase particles. The reaction and formation of the supported active material preferably occurs over a very short period of time such that the growth of large active material clusters is limited. Preferably, the active material precursor is exposed to the elevated reaction temperature to form the active material for not more than about 600 seconds, more preferably not more than about 100 seconds and even more preferably not more than about 10 seconds. The means by which the active material precursor is reacted is discussed in detail below.

Preferably, the spray processing methods are capable of forming a spherical aggregate particle structure. As used herein, an aggregate particle structure is a cohesive particulate that is comprised of many smaller primary particles. The spherical aggregate particles form as a result of the formation and drying of the precursor solution droplets during spray processing.

Spray processing methods for the production of the active materials can be grouped by reference to several different attributes of the apparatus used to carry out the spray processing method. These attributes include: the main gas flow direction (e.g., vertical or horizontal); the type of atomizer (e.g., submerged ultrasonic, ultrasonic nozzle, two-fluid nozzle, single nozzle pressurized fluid); the type of gas flow (e.g., laminar with no mixing, turbulent with no mixing, co-current of droplets and hot gas, countercurrent of droplets and gas or mixed flow); the type of heating (e.g., hot wall system, hot gas introduction, combined hot gas and hot wall, plasma or flame); and the type of powder collection system (e.g., cyclone, bag house, electrostatic or settling).

The absorbent and catalytic powders of the present invention can be prepared by starting with an aqueous-based precursor liquid consisting of a dissolved metal salt. The processing temperature can be controlled so the metal precursor decomposes to form the active material, or an intermediate compound that can be converted to the active material, such as by heating in a post-processing step.

The first step in the process is the evaporation of the solvent (typically water) as the droplet is heated resulting in a particle of dried solids and/or metal salts. A number of methods to deliver heat to the droplet/particle are possible: horizontal hot-wall tubular reactors, spray dryer and vertical tubular reactors can be used, as well as plasma, flame and laser reactors. Horizontal hot-wall tubular reactors are disclosed in U.S. Pat. No. 6,103,393 by Kodas et al. Spray dryers are disclosed, for example, in U.S. Pat. No. 5,615,493 by Funder and U.S. Pat. No. 5,100,509 by Pisecky et al. A plasma reactor is disclosed in U.S. Pat. No. 6,689,192 by Phillips et al. and a flame reactor is disclosed in U.S. Pat. No. 5,958,361 by Laine et al. Laser reactors are disclosed in U.S. Pat. No. 6,248,216 by Bi et al. Each of the foregoing U.S. patents is incorporated herein by reference in its entirety.

As the particles experience either higher temperature or longer time at a specific temperature, the metal precursor decomposes. Preferably, the time that the droplets/particles experience a given temperature is controlled and therefore the degree of porosity, crystallinity, the microstructure and other properties can be controlled.

The atomization technique for generating the precursor droplets has a significant influence over the characteristics of the final active material powder, such as the particle surface area, porosity, size, the spread of the particle size distribution (PSD), as well as the production rate of the powder. Some techniques cannot atomize fluids with even moderate particle loadings or high viscosities. Several methods exist for the atomization of precursor compositions, including those that contain suspended particulates. These methods include but are not limited to: ultrasonic transducers (usually at a frequency of 1-3 MHz); ultrasonic nozzles (usually at a frequency of 10-150 KHz); rotary atomizers; two-fluid nozzles; and pressure atomizers.

Ultrasonic transducers are generally submerged in a liquid and the ultrasonic energy produces atomized droplets on the surface of the liquid. Two basic ultrasonic transducer disc configurations, planar and point source can be used. Deeper fluid levels can be atomized using a point source configuration since the energy is focused at a point that is some distance above the surface of the transducer. The scale-up of submerged ultrasonic transducers can be accomplished by placing a large number of ultrasonic transducers in an array. Such a system is illustrated in U.S. Pat. No. 6,338,809 by Hampden-Smith et al., the disclosure of which is incorporated herein by reference in its entirety.

Scale-up of nozzle systems can be accomplished by either selecting a nozzle with a larger capacity or by increasing the number of nozzles used in parallel. Typically, the droplets produced by nozzles are larger than those produced by ultrasonic transducers. Particle size is also dependent on the gas flow rate. For a fixed liquid flow rate, an increased airflow decreases the average droplet size and a decreased airflow increases the average droplet size. It is difficult to change droplet size without varying the liquid or airflow rates. However, two-fluid nozzles have the ability to process larger volumes of liquid per unit time than ultrasonic transducers.

Ultrasonic spray nozzles also use high frequency energy to atomize a fluid. Ultrasonic spray nozzles have some advantages over single or two-fluid nozzles such as the low velocity of the spray leaving the nozzle and lack of associated gas flow. The nozzles are available with various orifice sizes and orifice diameters that allow the system to be scaled for the desired production capacity. In general, higher frequency nozzles are physically smaller, produce smaller droplets, and have a lower flow capacity than nozzles that operate at lower frequencies. A drawback of ultrasonic nozzle systems is that scaling up the process by increasing the nozzle size increases the average particle size. If a particular particle size is required, then the maximum production rate per nozzle is set. If the desired production rate exceeds the maximum production rate of the nozzle, additional nozzles or additional production units are required to achieve the desired production rate.

The shape of the atomizing surface determines the shape and spread of the spray pattern. Conical, microspray and flat atomizing surface shapes are available. The conical atomizing surface provides the greatest atomizing capability and has a large spray envelope. The flat atomizing surface provides almost as much flow as the conical surface but limits the overall diameter of the spray. The microspray atomizing surface is for very low flow rates where narrow spray patterns are needed. These nozzles are preferred for configurations where minimal gas flow is required in association with the droplets.

Particulate suspensions in the precursor solution (e.g., for the production of a supported active material) may present several problems with respect to atomization. For example, submerged ultrasonic atomizers re-circulate the suspension through the generation chamber and the suspension concentrates over time. Further, some fraction of the liquid atomizes without carrying the suspended particulates. Other problems encountered when using submerged ultrasonic transducers is that the transducer discs can become coated with the particles and or precursor over time. Further, the generation rate of particulate suspensions can be very low using submerged ultrasonic transducer discs. This is due in part to energy being absorbed or reflected by the suspended particles.

For spray drying, the aerosol can be generated using three basic methods. These methods differ in the type of energy used to break the liquid masses into small droplets. Rotary atomizers (utilization of centrifugal energy) make use of spinning liquid droplets off of a rotating wheel or disc. Rotary atomizers are useful for co-current production of droplets in the range of 20 μm to 150 μm in diameter. Pressure nozzles (utilization of pressure energy) generate droplets by passing a fluid under high pressure through an orifice. These can be used for both co-current and mixed-flow reactor configurations and typically produce droplets in the range of 50 μm to 300 μm. Multiple fluid nozzles such as a two-fluid nozzle (utilization of kinetic energy) produce droplets by passing a relatively slow moving fluid through an orifice while shearing the fluid stream with a relatively fast moving gas stream. As with pressure nozzles, multiple fluid nozzles can be used with both co-current and mixed-flow spray dryer configurations. This type of nozzle can typically produce droplets in the size range of 5 μm to 200 μm.

For example, two-fluid nozzles are used to produce aerosol sprays in many commercial applications, typically in conjunction with spray drying processes. In a two-fluid nozzle, a low-velocity liquid stream encounters a high-velocity gas stream that generates high shear forces to accomplish atomization of the liquid. A direct result of this interaction is that the droplet size characteristics of the aerosol are dependent on the relative mass flow rates of the liquid precursor and nozzle gas stream. The velocity of the droplets as they leave the generation zone can be quite large which may lead to unacceptable losses due to impaction. The aerosol also leaves the nozzle in a characteristic pattern, typically a flat fan, and this may require that the dimensions of the reactor be sufficiently large to prevent unwanted losses on the walls of the system.

Thus, numerous atomization techniques for spray processing are possible for the production of active material powders and different versions are preferred for different feed streams and products.

The atomized precursor composition must be heated to remove solvents and react precursor components. For example, a horizontal, tubular hot-wall reactor can be used to heat a gas stream to a desired temperature. Energy is delivered to the system by maintaining a fixed boundary temperature at the wall of the reactor and the maximum temperature of the gas is the wall temperature. Heat transfer within a hot wall reactor occurs through the bulk of the gas. Buoyant forces that occur naturally in horizontal hot wall reactors aid this transfer. The mixing also helps to improve the radial homogeneity of the gas stream. Passive or active mixing of the gas can also increase the heat transfer rate. The maximum temperature and the heating rate can be controlled independent of the inlet stream with small changes in residence time. The heating rate of the inlet stream can also be controlled using a multi-zone furnace.

The use of a horizontal hot-wall reactor according to the present invention is generally preferred to produce particles with a size of not greater than about 5 μm. Above about 5 μm, settling of particles can cause significant material losses. One disadvantage of such reactors is the poor ability to atomize particulates when using submerged ultrasonics for atomization.

Alternatively, the horizontal hot-wall reactor can be used with a two-fluid nozzle to atomize the droplets. This approach is preferred for precursor feed streams containing higher levels of particulate materials, such as a particulate support precursor. A horizontal hot-wall reactor can also be used with ultrasonic nozzle atomization techniques. This allows atomization of precursor containing particulates, however the large droplet size leads to losses of materials on reactor walls and other surfaces making this an expensive method for powder production.

While horizontal hot-wall reactors are specifically useful for some particle morphologies and compositions according to the present invention, particularly for the spray pyrolysis method illustrated in FIG. 1, spray processing systems in the configuration of a spray dryer are the preferred production method for large quantities of absorbent and catalytic powders in accordance with some applications of the present invention. Such spray processing systems are particularly useful for the general method schematically illustrated in FIG. 2.

Spray drying is a process wherein powders are produced by atomizing a precursor to produce droplets and evaporating the liquid to produce a dry aerosol, wherein thermal decomposition of one or more precursors may take place to produce the powder. The residence time in the spray dryer is the average time the process gas spends in the drying vessel as calculated by the vessel volume divided by the process gas flow using the outlet gas conditions. The peak excursion temperature (i.e., the reaction temperature) in the spray dryer is the maximum temperature of a particle, averaged throughout its diameter, while the particle is being processed and/or dried. The droplets are heated by supplying a pre-heated carrier gas.

Three types of spray dryer systems are useful for the spray drying of the active material powders according to the present invention. An open system is useful for spray drying of powders using air as an aerosol carrier gas and an aqueous feed solution as a precursor. A closed system is useful for spray drying of powders using an aerosol carrier gas other than air. A closed system is also useful when using a non-aqueous or a semi-non-aqueous solution as a precursor. A semi-closed system, including a self-inertizing system, is useful for spray drying of powders that require an inert atmosphere and/or precursors that are potentially flammable.

Two spray dryer designs are particularly useful for the production of the active material powders of the present invention. A co-current spray dryer is useful for the production of materials that are sensitive to high temperature excursions (e.g., greater than about 350° C.) or that require a rotary atomizer to generate the aerosol. Mixed-flow spray dryers are useful for producing materials that require relatively high temperature excursions (e.g., greater than about 350° C.) or require turbulent mixing forces.

In a co-current spray dryer, the hot gas is introduced at the top of the unit where the droplets are generated with any of the atomization techniques mentioned above. The maximum temperature that a droplet/particle is exposed to in a co-current spray dryer is the temperature of the outlet. Typically, the outlet temperature is limited to about 200° C., although some designs allow for higher temperatures. In addition, since the particles experience the lowest temperature in the beginning of the time-temperature curve and the highest temperature at the end, the possibility of precursor surface diffusion and agglomeration is high.

A preferred spray processing system according to the present invention is based on a mixed-flow spray dryer. A mixed-flow spray dryer introduces the hot gas at the top of the unit and the precursor droplets are generated near the bottom and are directed upwardly. The droplets/particles are forced towards the top of the unit then fall and flow back down with the gas, increasing the residence time in the spray dryer. The temperature the particles experience is also higher as compared to a co-current spray dryer. This is important, as most spray dryers are not capable of reaching the higher temperatures that are required for the conversion of some metal salts.

For mixed flow spray dryers the reaction temperatures can be high enough for the decomposition of metal precursors such as Rh precursors (e.g., between 250° C. and 350° C.) useful for preparation of reforming catalysts such as a $Rh/Al_2O_3$ supported catalyst. The highest temperature in these spray dryers is the inlet temperature (e.g., 600° C. and higher), and the outlet temperature can be as low as 90° C. Therefore, the particles reach the highest temperature for a relatively short time, which advantageously reduces precursor migration or surface diffusion. This spike of high temperature quickly converts the precursor and is followed by a mild quench since the spray dryer temperature quickly decreases after the maximum temperature is achieved. The spike-like temperature profile is advantageous for the generation of highly dispersed metal or metal oxide active material clusters on the surface of a support phase. Mixed flow spray dryers are particularly preferred for the spray processing of a precursor solution that includes particulate metal compound precursors, such as Ca-oxalate particulates.

The range of useful residence times for producing the active material powders depends on the spray dryer design type, atmosphere used, nozzle configuration, feed liquid inlet temperature and the residual moisture content. In general, residence times for the production of the active material powders can range from 5 seconds up to 5 minutes. According to one embodiment, the residence time is from about 15 seconds to about 45 seconds.

The range of inlet temperatures for producing the active material powders depends on the spray dryer design type, atmosphere used, nozzle configuration, feed liquid, and energy required to perform drying and/or decomposition functions.

In general, the outlet temperature of the spray dryer determines the residual moisture content of the powder. For the production of the absorbent and catalytic powders according to the present invention, the range of useful outlet temperatures depends on the spray dryer design type, atmosphere used, nozzle configuration, feed liquid, inlet temperature, and residual moisture content. For example, a useful outlet temperature according to one embodiment of the present invention ranges from about 200° C. to about 350° C. According to another embodiment, a useful outlet temperature is at least about 450° C., more preferably at least about 600° C. Other equipment that is desirable for producing the active material powders using a spray dryer includes a heater for the gas and a collection system. Either direct heating or indirect heating, including burning fuel, heating electrically, liquid-phase heating or steam heating, can accomplish heating of the gas. The most useful type of heating for the production of the powders processed with an inlet temperature greater than 350° C. is direct fuel burning.

Many collection methods are useful for collecting powders produced on a spray dryer. These methods include, but are not limited to those using cyclone, bag/cartridge filter, electrostatic precipitator, and various wet collection techniques.

The active material powders may also need to be post-processed by conventional calcination methods to convert them into another chemical composition prior to pelletization. For example, it may be advantageous to convert a metal oxalate with a particular structure into a metal carbonate and/or further to a metal oxide through a thermal post-processing step (FIG. 3). Likewise, it may be advantageous to convert a metal carbonate to a metal oxide while retaining the beneficial attributes of the pore structure. The post processing ideally needs to be carried out under conditions that are not detrimental to the structure and performance of the material. Where the post processing is a thermally-induced transformation, the temperature needs to be carefully chosen to effect the chemical change, without inducing significant sintering or significantly altering the performance of the material. A number of methods can be used to effect this thermal transformation including heat treatment in a static bed or a moving bed.

According to one preferred embodiment, the post-processing occurs in a moving bed such as a rotary calciner in which the powder is delivered to a furnace which contains a rotating reactor tube such that the bed of particles is constantly moving to avoid particle to particle agglomeration and also provide a fresh exposure of the surface of the particle bed to allow out gassing of the material ($CO_2$ in the case of the examples described above). This continual "agitation" of the powder bed avoids depth-dependant variations that can occur with a fixed bed reactor. Preferred heating rates for such post-processing are between about 1° C./min and 100° C./min, more preferably between 1° C. and 10° C./min.

In accordance with the foregoing, the present invention is directed to the fabrication of an absorbent material that is useful for AER by spray processing. The spray processing includes the formation of a precursor solution and the conversion of the precursor solution into a plurality of droplets. The droplets are then heated to a reaction temperature to convert the droplets to an absorbent material and/or an intermediate compound that can be subsequently converted to an absorbent material. Preferred precursors for the absorbent materials and catalyst materials according to the present invention are discussed above.

For the fabrication of metal oxide absorbent materials by spray processing according to the present invention, including Group 1 and Group 2 metal oxides such as calcium oxide, it is preferred that the reaction temperature be at least about 300° C. and more preferably is at least about 600° C. Further, the reaction temperature preferably does not exceed about 1150° C. and more preferably does not exceed about 900° C. The reaction time (i.e., approximate residence time in the spray reactor) can be at least about 10 seconds and preferably does not exceed about 500 seconds.

As is discussed above, the spray processing method can be used to form an intermediate compound that is capable of being converted to an absorbent material. It will also be appreciated that spray processing can produce a mixture of both the absorbent material or absorbent compound, and an intermediate compound. The conversion of the intermediate compound to an absorbent material is referred to herein as post-processing. Preferably, the post—processing includes heating the intermediate compound, such as to a temperature of at least about 250° C. and preferably at least about 750° C. The post-processing heating temperature preferably is not so high that the particles sinter or agglomerate, and in one embodiment is not greater than about 900° C. Preferably, the post-processing time is at least about 10 minutes and preferably does not exceed about 6 hours, and more preferably does not exceed about 3 hours.

AER

The particulate materials of the present invention are particularly applicable to AER processes. As is discussed above, AER has significant advantages over conventional reforming technologies. The fuels that can be used in AER processes include carbon-based fuels, such as natural gas, other gases such as propane, liquids such as alcohols, gasoline, diesel and jet fuel, and solid fuels such as biomass, coal and other forms of carbon. A general AER method for hydrogen production using various fuels is illustrated by the reactions of Equations 11 to 14:

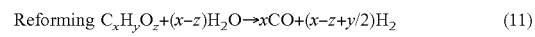

Reforming $C_xH_yO_z+(x-z)H_2O \rightarrow xCO+(x-z+y/2)H_2$ (11)

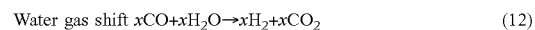

Water gas shift $xCO+xH_2O \rightarrow xH_2+xCO_2$ (12)

$CO_2$ fixing $xCaO+xCO_2 \rightarrow xCaCO_3$ (13)

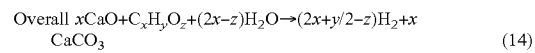

Overall $xCaO+C_xH_yO_z+(2x-z)H_2O \rightarrow (2x+y/2-z)H_2+xCaCO_3$ (14)

where $C_xH_yO_z$ represents different types of carbon-based fuels. For example, when z≠0, $C_xH_yO_z$ can represent either alcohols such as methanol ($CH_3OH$), ethanol ($C_2H_5OH$) or bio-oil from biomass, which can include acids (e.g., acetic acid), carbohydrates (e.g., dextrose) and oxygenated aromatics (e.g., cresol). When z=0, $C_xH_y$ represents fossil-based hydrocarbon fuels such as natural gas (predominately methane), gasoline, jet fuel, diesel fuel, and the like. When y=z=0, or z=0 and x>>y, $C_xH_y$ represents carbon sources such as coal.

Figure 4:
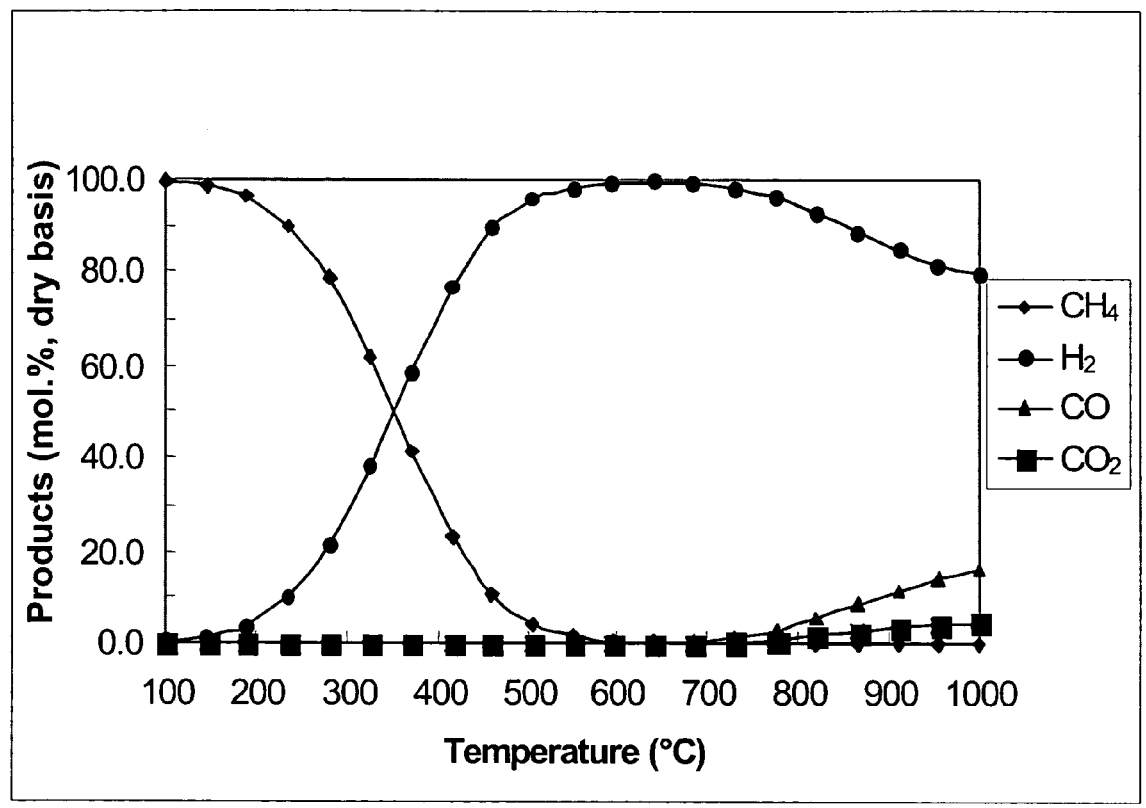
FIG. 4 illustrates the calculated equilibrium gas composition for steam reforming of methane in the presence of CaO as a $CO_2$ absorbent.
Figure 5:
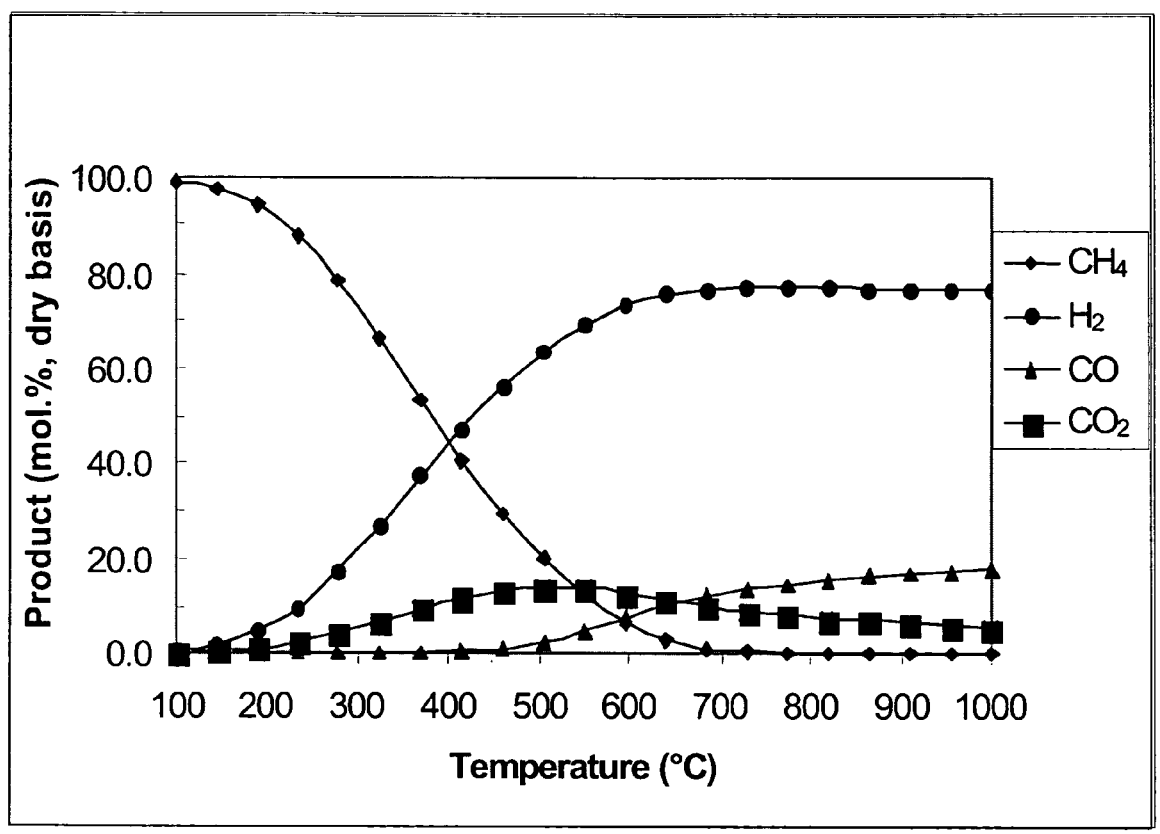
FIG. 5 illustrates the calculated equilibrium gas composition for steam reforming of methane without a $CO_2$ absorbent.

FIGS. 4 and 5 illustrate the calculated thermodynamic gas composition (dry basis) obtained by steam methane reforming (SMR) as a function temperature at atmospheric pressure with and without a CaO absorbent. Specifically, FIG. 4 illustrates that at 600° C., AER can achieve at least 98% conversion to $H_2$, as compared to only 75% conversion under normal conditions of SMR, as illustrated in FIG. 5. Further, FIG. 4 illustrates that the CO concentration can be decreased to less than 1% in an AER reformer as compared to the normal of 6 to 10% in conventional SMR, and the total amount of carbon oxides including CO and $CO_2$ is less than 2%, as compared to 25% in conventional SMR (FIG. 5). Similar conclusions can be reached by comparison of SMR and AER thermodynamics for reforming of other fuels such as LPG, gasoline, kerosene, jet fuel, bio-oil from biomass and. Therefore, for a variety of fuels, it is desirable to remove the $CO_2$ during the reforming step as opposed to post WGS $CO_2$ removal.

Figure 6:
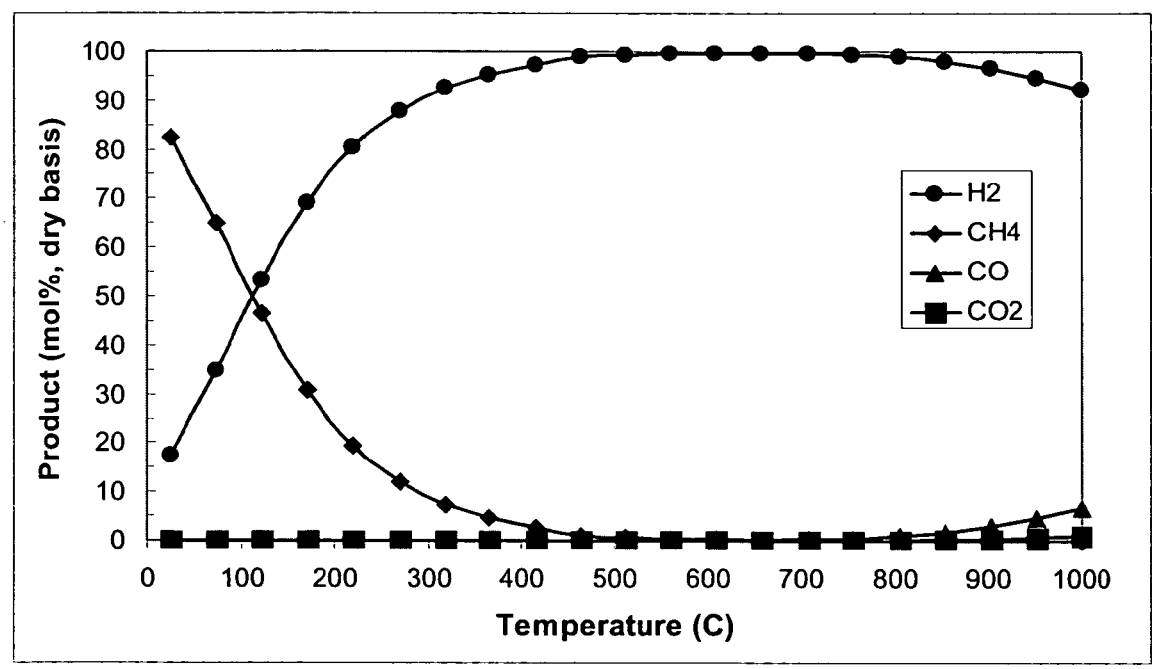
FIG. 6 illustrates the calculated equilibrium gas composition for steam reforming of methane in the presence of $Li_2O$ as a $CO_2$ absorbent.

According to one embodiment of the present invention, lithium oxide ($Li_2O$) is utilized as the reactive absorbent compound. $Li_2O$ is particularly useful for absorption temperatures in the range of from about 300 to about 600° C. and desorption temperatures in the range of from about 750 to about 1100° C. FIG. 6 illustrates the calculated thermodynamic gas composition for lithium oxide.

In addition to AER, absorbents such as CaO are used in a variety of other applications to remove poisons, contaminants or reaction by-products. The compounds to be removed are normally gases under the operating conditions of the system and the absorbents are usually heated to elevated temperatures in order to initiate a chemical reaction between the gas to be removed and the surface of the absorbent. The chemical reactions between the absorbent and the gas to be removed are normally stoichiometric, so once the active material in the absorbent has either been consumed or rendered passive it is either physically replaced or the material is isolated and the reaction is reversed to re-generate the original material.

For example, $H_2S$ can be removed from a gas stream using CaO as the absorbent to react with the $H_2S$ to form calcium sulfide (CaS). The CaO absorbent can be regenerated from the CaS bed by oxidation-reduction reactions.

Figure 7:
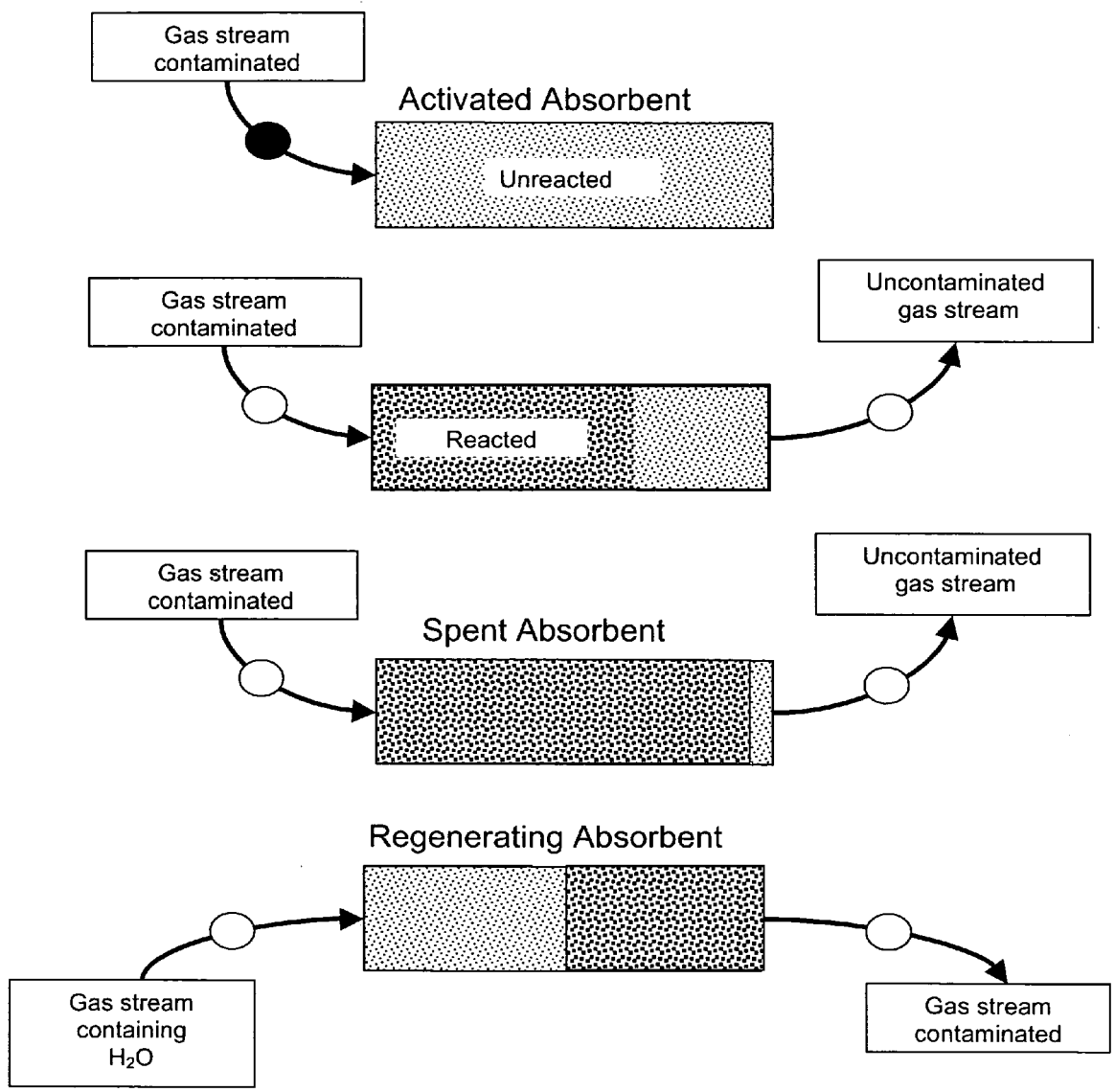
FIG. 7 illustrates a process of the absorption of a contaminant from a gas stream with a regenerating step.

A simple illustration of one cycle of carbonation/decarbonation of CaO with $CO_2$ is illustrated in FIG. 7. Referring to FIG. 7, an activated absorbent bed comprising CaO (as loose powder, pellets, extrudates or a monolith) is packed into a reactor. The absorbent bed can include loose CaO powder, pelletized CaO powder, a surface coated with CaO powder or a monolith of the CaO. A gas stream including $CO_2$ is admitted to the reactor and the CaO reacts selectively with the $CO_2$ to form $CaCO_3$. Further reaction between the CaO and $CO_2$ eventually consumes all the available CaO and converts it into $CaCO_3$, which is non-reactive with $CO_2$. Further use of this reactor under these conditions will not remove additional $CO_2$ and the contaminated gas will pass through the reactor. The feed is then stopped and a regeneration gas, in this case air and steam, is passed through the reactor, which is heated to an elevated temperature, to reverse the reaction, remove $CO_2$ from the $CaCO_3$ and thereby regenerate the active CaO absorbent bed.

While CaO is described as an example of a reversible $CO_2$ absorbent throughout the body of this text, those skilled in the art will recognize that there are a number of other absorbent materials to which the same principles of this invention also apply. As is discussed above, these absorbent materials can include the oxides of Group 1 and Group 2 metals of the periodic table of elements.

The primary issue affecting recyclability is that $CaCO_3$ has a much lower density than the CaO absorbent. Therefore, for a fixed mass of absorbent in a reactor bed, there is a large volume increase as CaO is converted to $CaCO_3$. Due to the high temperature typically required for cycling the $CaCO_3$ back to CaO, particle sintering and reduction of porosity occurs leading to a reduced $CO_2$ absorption capacity on the second cycle. Therefore, a high initial absorption capacity through the production of a high surface area CaO powder will not, by itself, lead to retention of a high capacity during subsequent cycles. Decrepitation is also common and leads to plugging of the bed.

In the context of the cyclic nature of AER, both the kinetics and the mechanism of the carbonation and decarbonation reactions are important. In order to achieve a high absorption capacity, it is necessary to use a material having a high content of active absorbent compound, such as CaO. However, a number of design criteria need to be taken into account involving the chemical, physical and system aspects of the reversible $CO_2$ reaction bed. These aspects include the careful design of the microstructure of the absorbent material to decrease diffusion-based limitations associated with gas transport and surface diffusion through the substantially impervious $CaCO_3$ surface layer, the chemical composition and microstructure to adjust the rate constants of the carbonation/decarbonation reactions and the strength of the material in pelletized, coated or monolith form. As is discussed above, one of the critical issues to overcome is the change in density and therefore the change in microstructure and porosity on cycling between CaO and $CaCO_3$.

Current reactive $CO_2$ absorbents suffer from a rapid loss of porosity and from sintering during multiple carbonation/decarbonation temperature swing operations. The materials prepared by conventional methods, such as precipitation and solid state processing, either lack the desired porosity or the desired crystal size, which are two critical parameters to material performance. An absorbent lacking adequate porosity will result in slow kinetics for both carbonation and decarbonation. Some research suggests that an average pore size in the range of 5 to 20 nm is less susceptible to pore plugging. (Ghosh-Dastidar, A.; Mahuli, S. K.; Agnihotri, R.; Fan, L.-S. Investigation of High Reactivity Calcium Carbonate Sorbent for Enhanced $SO_2$ Removal. *Ind. Eng. Chem. Res.*, 1996, 35 (2), 598). Also, $CO_2$ gas can only penetrate a thin (about 0.1 µm) shell of the CaO solid particle during repeated carbonation and decarbonation cycles, which is less than one tenth of the normal CaO particle size. $CO_2$ absorbents present in natural and conventional materials generally have a large particle size, low porosity and lack a three-dimensional pore network structure.

According to one embodiment of the present invention, the microstructure of the absorbent particles is controlled to enable mass transport of the reactants and products to and from the surface of the powder during contaminant removal and regeneration and to retain the beneficial microstructure throughout multiple cycles. The absorbent particles according to this embodiment are produced by spray processing, which enables tight control over the chemical composition and microstructure of the materials.

Figure 9:
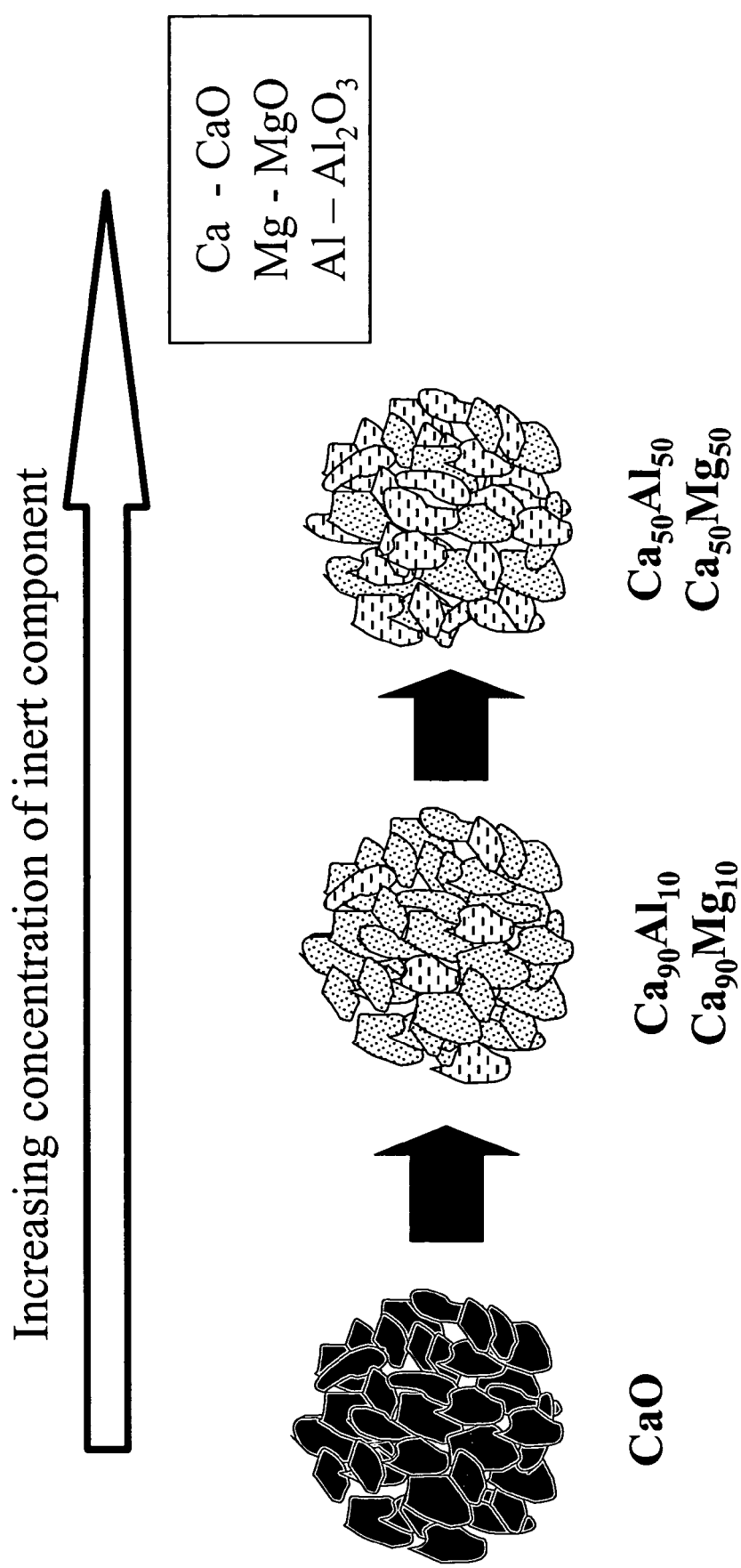
FIG. 9 illustrates the aggregate particle morphology of a particulate absorbent material according to an embodiment of the present invention.

The powder batch produced by spray processing according to one embodiment of the invention includes substantially spherical aggregate particles that consist of smaller primary particles. This particle structure is illustrated in FIG. 8. The preferred size of the smaller primary particles is not greater than about 500 nm, more preferably not greater than about 300 nm and even more preferably not greater than about 100 nm. The primary particles are preferably at least about 10 nm in size, such as at least about 30 nm in size. The spherical aggregate particles may have different sizes and spread of size distribution that can be controlled by spray processing. The microstructure of the aggregates is also controlled by spray processing to control the surface area, crystallinity, size and porosity within each aggregate. The aggregate microstructure, average size and spread of the size distribution are controlled to provide the optimum performance in a given application depending on the operating and regeneration parameters. In another embodiment of the invention, the substantially spherical particles are composite particles that have controlled composition and morphology (FIG. 9). For example, the particles can include various ratios of CaO and MgO, or $Al_2O_3$, $TiO_2$ or $ZrO_2$ with other metals or metal oxides present to achieve desired catalytic properties such as enhanced adsorption kinetics, water-gas-shift activity or reforming activity. The role of additives that are inert with respect to $CO_2$ absorption at the absorption temperature of the absorbent compound (e.g., MgO or $Al_2O_3$) is to aid the recyclability of the CaO-containing powders by minimizing the sintering and loss of surface area and pore volume. The sintering inhibition characteristics of these additives may be derived from the composite nature of the microstructure and/or from the use of dopant ions in the CaO lattice.

The $d_{50}$ average particle size of the powders (intermediate compounds or final active materials) generated by spray conversion methods according to a preferred embodiment of the present invention is preferably not greater than 20 µm, more preferably not greater than 10 µm and even more preferably not greater than 5 µm.

The surface area of the aggregate or composite powders (intermediate compounds or final active materials) will depend on the composition (addition of inert compounds such as alumina); however the surface area (as measured by BET nitrogen adsorption) is preferably greater: than 5 $m^2/g$, more preferably greater than 10 $m^2/g$, even more preferably greater than 15 $m^2/g$ and most preferably greater than 30 $m^2/g$.

The pore volume of the powders (intermediate compounds or final active materials) generated by spray processing methods according to the present invention is preferably greater than about 0.01 $cm^3/g$, more preferably greater than about 0.04 $cm^3/g$ and even more preferably greater than about 0.15 cm$^3$/g. In one embodiment, the pore volume is from about 0.05 cm$^3$/g to about 0.3 cm$^3$/g. As is discussed above, the pore volume of the absorbent powder can be increased by including a pore enhancing agent in the precursor composition. Further, the absorbent (e.g., CaO) can advantageously absorb $CO_2$ to form a carbonated absorbent compound (e.g., $CaCO_3$) where the pore volume of the carbonated compound is not less than 70% of the pore volume of the absorbent compound, more preferably is not less than 80% of the pore volume of the absorbent compound and even more preferably is not less than 90% of the pore volume of the absorbent compound.

Further, the preferred average pore size for the powder is from about 10 nm to about 30 nm, more preferably from about 10 nm to about 20 nm. The average pore size is measured by the BET nitrogen adsorption method.

Spray processing enables control over the powder batch characteristics in the following manner. The average aggregate size and spread of the aggregate size distribution is controlled by controlling the size and size distribution of the droplets produced by the droplet generator because each individual droplet becomes an individual particle. The size and size distribution of the aggregates in the powder batch is controlled independent of the chemical composition of the powder. Furthermore, the microstructure, composition and crystallinity of the aggregates and the sub-particles that comprise the aggregates are controlled by the nature of the precursors that are used to produce the droplets and the processing parameters (especially the temperature/time history) of the particles in the gas phase during spray processing. As a result, the powder batch produced by spray processing, whether directly used to produce pellets, extrudates, monoliths or powder coatings, or used after post-processing subsequent to the spray processing step, can have a controlled microstructure at a number of different length scales. The size and size distribution of the particles produced by spray processing can be varied to control the pore size and size distribution between the aggregates (inter-aggregate porosity, FIG. 8).

As is discussed above, the aggregates produced by spray processing according to the present invention are preferably in the size range of from about 0.3 μm to about 20 μm. As a result, the pore sizes of the inter-aggregate pores will typically be in the micron size range and therefore classified as macro-porosity. In one embodiment of the present invention, the aggregate particles include smaller primary particles of the absorbent compound or other components that have been aggregated by spray processing. The finer primary particles are derived either from soluble precursors or suspensions of particulate precursors. The typical size of the primary particles is in the range of from about 30 nm to 500 nm. As a result, the size of the pores formed between the sub-particles in the aggregate is in a similar size range and the pores are classified as meso-porosity. Finally, the primary particles themselves can range from being fully crystalline (i.e., single crystal) to being amorphous. Single crystal sub-particles are likely to be fully dense and exhibit no further porosity, but amorphous particles can include pores that are classified as microporosity. In another embodiment of the present invention, the absorbent particles are composite particles of various amorphous or crystalline metal oxides.

According to one embodiment of the present invention, the porosity of the absorbent powder batch is controlled at the microporosity, mesoporosity and macroporosity scales to reduce the loss of surface area and pore volume and maintain a high activity over a large number of regeneration cycles.

In one embodiment of the present invention, the aggregate particles formed by the spray processing method have controllable inter-aggregate porosity (i.e., porosity between the aggregates) as well as intra-aggregate porosity (i.e., porosity within the aggregates). It would normally be expected that the inter-aggregate pores (micron size) are larger than the intra-aggregate pores (nanometer size).

In some cases, the absorbent reacts with species to be removed on the surface of the absorbent and forms a passivating layer, which limits the further reaction of underlying absorbent with the contaminant. As a result, the mass activity of the absorbent is relatively low and once the surface of the absorbent has reacted with the contaminant species, there will be a decrease in the rate of further reaction with the contaminant. One way to improve the mass activity according to the present invention is to disperse the absorbent on or form a composite with a relatively high surface area support, which is passive or inert (i.e., does not substantially react) with respect to the contaminant. A representation of this embodiment is illustrated in FIG. 10, where the spray-processed spherical agglomerates include sub-particles made up of support material with an absorbent supported/dispersed over the surface of the sub-particles. The methods for controlling the microstructure and morphology of the absorbent powder, as described above, can also be applied to the supported absorbent. The structure of the supported absorbent material can be in the form of a coating around the support particles or as a composite with interpenetrating support and absorbent material networks.

The correct combination of macroporosity, mesoporosity and microporosity will depend on the composition of the material, the conditions under which it is reacted with the species to be absorbed and the conditions under which the de-activated absorbent is re-activated. The importance of this aspect of the invention can be clarified further by reference to specific materials. Table 1 lists the density of a number of relevant Ca-based compositions and the calculated volume per mol of fully dense material.

TABLE 1

| Compound | Density (g/cc) | Volume (cc/mol) |
|---|---|---|
| CaO | 3.25 | 17 |
| $CaCO_3$ | 2.93 | 37 |
| CaS | 2.5 | 29 |
| $CaC_2O_4$ | 2.2 | 67 |

The density of the $CaCO_3$ is lower than that of CaO as expected from the higher atomic volume of $CO_2$. As a result, given that the molar mass of calcium is constant through the removal of $CO_2$ and the reactivation of the $CaCO_3$, the volume will increase on conversion of the CaO to $CaCO_3$. Therefore, this volume increase is likely to remove some of the porosity imparted to the original CaO powder. Regeneration of CaO from $CaCO_3$ will result in a decrease in volume of the absorbent, but the pore structure formed as a result of the regeneration of CaO could be significantly different relative to the starting CaO. This is typically the problem with existing CaO powder made by conventional routes because the majority of the reactivity is derived from the high surface area of small particles and/or the presence of a roughened surface. After several regeneration cycles, the surfaces become smooth and/or the small particles tend to sinter, leading to a reduction in surface area and pore volume, and a reduction in reactivity. According to one embodiment of the present invention, the porosity of the absorbent powder batch is controlled at the microporosity, mesoporosity and macroporosity scales to reduce the loss of surface area and pore volume and maintain a high activity over a large number of regeneration cycles.

There are a number of advantages in accordance with this embodiment of the present invention. The mass activity of the absorbent is significantly higher compared to the situation where an unsupported absorbent is used, assuming that the surface of the unsupported absorbent passivates. This can enable the use of more exotic or expensive absorbent materials, because a relatively small mass of absorbent can be dispersed over the surface of or inter-mixed with a relatively inexpensive support such as a metal oxide support. Preferred metal oxide supports include $SiO_2$, $Al_2O_3$, $ZrO_2$ and $TiO_2$. The mass ratio of the absorbent material to the inert support material can preferably be varied between 95:5 and 50:50, and most preferably is between 90:10 and 70:30. The presence of inert materials can isolate the active component and prevent sintering of the material, particularly during multiple temperature swings and cycles. A further advantage is that the support does not substantially react with the contaminant species and therefore there is no change in the volume or density of the support framework. As a result, the microstructure of the powder does not change significantly and a relatively high surface area can be preserved over a large number of regeneration cycles.

The specific microstructure of the supported or composite absorbent will depend upon the specific reaction needs. For example, a relatively thin coating of a highly reactive supported absorbent may have extremely good selectivity and reactivity to remove low levels of gas species at a relatively high space velocity. However, the capacity of the absorbent bed will be relatively low due to the relatively low mass of absorbent present compared to a thicker coating. As a result, a larger bed may be required to increase the total capacity of the absorbent. Alternatively, a thicker absorbent coating on an inert support or a composite particle with interpenetrating networks of absorbent and inert materials may require lower space velocities, but the capacity of the bed will be higher. However, there may also be situations in which nano composite structures comprised of relatively high mass of absorbent but with appropriate porosity might enable high space velocities.

According to another embodiment of the present invention, the absorbent materials are fabricated from intermediate calcium compounds having a low density, such as calcium oxalate ($CaC_2O_4$) and calcium carbonate ($CaCO_3$). Decomposition of these intermediate compounds into the CaO absorbent will alter the microstructure of the intermediate compound, but in a controlled way, and will therefore lead to an increased surface area in the CaO absorbent as compared to conventional preparation methods. In addition, the spray processing method for making either the intermediate compound or the final absorbent compound introduces additional levels of meso- and micro-porosity and therefore a specific microstructure which is unattainable with conventional preparation methods.

According to this embodiment, the microstructural changes to the absorbent that occur during regeneration cycles is reduced by starting with a powder batch that includes an intermediate compound that has a density similar to or less than that of the reacted absorbent, but which itself is a precursor to form the absorbent material. The goal is to establish the microstructure of the powder using a low density intermediate material to avoid sintering of the particles and reduction in surface area and porosity. One approach is to produce the reacted material as the intermediate powder batch, for example a powder batch including $CaCO_3$, rather than only CaO. After the powder batch including $CaCO_3$ is pelletized or coated onto a surface, the $CaCO_3$ is treated to form CaO having a high level of porosity. Controlling the microstructure of the $CaCO_3$ powder batch establishes the specific microstructure, surface area and porosity in the system with a combination of composition (addition of inert additives) and processing conditions (choosing the correct spray conversion and post processing conditions) for the absorbent material. When CaO is formed from $CaCO_3$ in the first step, because $CaCO_3$ has a lower density than CaO, the surface area and porosity of the CaO batch will decrease to a lesser extent relative to the $CaCO_3$ batch from which it is derived if a beneficial starting porosity structure is achieved in the initial intermediate compound.

Other materials with a low density can be selected as the intermediate material. Referring to Table 1, $CaC_2O_4$ has a lower density than $CaCO_3$. Therefore, $CaC_2O_4$ can be used as a starting material to establish the microstructure, porosity, aggregate size and size distribution of the powder batch. A wide variety of other materials can also be used which have a density similar to $CaCO_3$, in particular inorganic and metal-organic compounds which are soluble in water or other solvents such that they can be employed in spray processing.

This embodiment of the present invention is illustrated in FIG. 11. In the first step, after forming the pellet or depositing the powder coating including the low density material, the powder batch is treated to form the activated absorbent in a form that has a higher surface area and porosity compared to the starting material. The powder batch can be treated either before pelletizing or coating by post-processing of the intermediate compound powder or after pelletizing or coating the intermediate powder into the reactor. The activated absorbent is then used to remove the contaminant species and is converted to the deactivated absorbent. The deactivated absorbent will have the pore distribution and microstructure capable of sustaining multiple generation cycles without significant loss of surface area, porosity or structural integrity.

The reversible reaction with $CO_2$ is less likely to close porosity and reduce the surface area of CaO obtained by direct spray processing or post processing through the sequential decomposition of $CaC_2O_4$ or $CaCO_3$ as compared to designing the microstructure around CaO. Another aspect of this embodiment of the present invention involves the execution of sequential chemical reactions involving specific reagents and pore forming chemicals performed by spray processing to produce discrete particles comprising specific compositions and microstructures that are constructed in a logical design sequence. This aspect of the present invention is illustrated in FIG. 2.

Specifically, FIG. 2 illustrates a case where the chemical reactions in the individual particles occur in the following sequence:

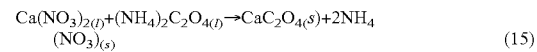

$$Ca(NO_3)_{2(l)} + (NH_4)_2C_2O_{4(l)} \rightarrow CaC_2O_{4(s)} + 2NH_4(NO_3)_{(s)} \quad (15)$$

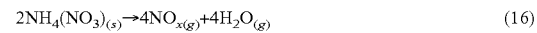

$$2NH_4(NO_3)_{(s)} \rightarrow 4NO_{x(g)} + 4H_2O_{(g)} \quad (16)$$

$$CaC_2O_{4(s)} \rightarrow CaCO_{3(s)} + CO_{(g)} \quad (17)$$

$$CaCO_{3(s)} \rightarrow CaO_{(s)} + CO_{2(g)} \quad (18)$$

Leading to the overall chemical reaction:

$$Ca(NO_3)_{2(s)} + (NH_4)_2C_2O_4(s) \rightarrow CaO + CO_{(g)} + CO_2(g) + 4NO_x(g) + 4H_2O_{(g)} \quad (19)$$

By carrying out this reaction in a stepwise fashion in the gas phase, the microstructure can be fabricated in a stepwise fashion. This ability does not exist in a single solid-state or liquid phase powder manufacturing step.

The precursors and reagents are chosen with the intent to lead to the following reaction sequence. $Ca(NO_3)_2$ is one preferred precursor for CaO in spray processing methods such as spray pyrolysis and spray conversion. In this reaction sequence the evaporation of water occurs quickly, on the order of milliseconds, while the whole gas phase material processing sequence takes place on the order of seconds. Therefore, the majority of the reactions in this sequence are solid-state reactions. $Ca(NO_3)_2$ reacts with $(NH_4)_2(C_2O_4)$ according to the reaction of Equation 15 to form $CaC_2O_4$. The reaction rate can be suppressed at room temperature using the correctly formulated (pH adjusted) solution. $CaC_2O_4$ has a low solubility in water and thermally decomposes before it melts, so the reaction can occur in the solution phase as the droplets enter the reactor and the microstructure of the resulting $CaC_2O_4$ product is preserved. The $NH_4NO_3$ that is formed acts as a pore forming reagent and thermally decomposes at a temperature higher than the temperature at which $CaC_2O_4$ is formed but lower than the decomposition temperature of $CaC_2O_4$, thus introducing porosity. In another embodiment, the precipitation reaction is controlled so that $CaC_2O_4$ particulates are formed in solution, preferably with a well-controlled particle size. For example, the precipitated particles can have a size of not greater than about 500 nm, such as not greater than about 300 nm and more preferably not greater than about 100 nm. Preferably the average particle size is at least about 10 nm. $CaC_2O_4$ is known to thermally decompose first to $CaCO_3$ (at about 500° C.) and then to CaO (at about 750° C.). Therefore, in this sequence, the microstructure and porosity designed into the solid-state product is first constructed around $CaC_2O_4$, the material with the highest molar volume, and then transferred to $CaCO_3$ and ultimately to CaO through post-processing steps. The crucial aspect of this reaction scheme is that the reactions occur sequentially, separated by both time in the reactor as well as the temperature at different locations in the reactor while substantially retaining the microstructure at both the nanometer scale and micrometer scale. If the same reagents are processed by conventional solution and/or solid-state processing, the microstructure cannot be tailored across this wide variety of length scales in discrete particles.

It is worth noting that the foregoing embodiments can be employed in any variation or combination to achieve excellent reactivity and the ability to go through multiple regeneration cycles (recyclability). For example, the ability to control the microstructure, morphology, aggregate size and aggregate size distribution within an absorbent powder batch can be combined with a supported absorbent or with a supported low density precursor to an absorbent. For example, in the case where the powder batch is pelletized, one of the phases can be selected to create a structural support such that during active use and regeneration, the pellets retain their structural integrity. For example, the support on which the precursor to the active absorbent or the active absorbent itself is dispersed can be an active material in peptization during pellet formation to form a three-dimensional support network. In addition, one or more catalytically active materials may be incorporated into the structure to achieve a catalytic function in addition to a gas absorption function. This aspect of the present invention is discussed in more detail below.

According to one embodiment of the present invention, the absorbent material, which includes the CaO absorbent compound, can include a second component that does not undergo the carbonation/decarbonation reaction at the reaction temperature, such as MgO. Dolomite is a naturally existing material comprised of $CaCO_3$ and $MgCO_3$. However, natural dolomite has fairly low initial surface area and comprises only about 50 wt. % $CaCO_3$ and therefore the initial capacity is significantly reduced and the change in microstructure on carbonation/decarbonation cycles leads to rapid loss of surface area and porosity. The presence of MgO in processed natural dolomite does introduce some advantageous WGS capability to the material. However, it has been found according to the present invention that other additional components can be used to achieve improved WGS activity at much lower weight loadings, as is described below.

According to one embodiment of the present invention, the recyclability of the CaO absorbent can be improved by integrating the absorbent with substantially inert additional materials such as metal oxides selected from $Al_2O_3$, MgO, $TiO_2$ or $SiO_2$ to form composite particles. According to this embodiment, the absorbent compound and the inert material are intimately mixed to form the absorbent material, as opposed to the embodiment discussed above where the absorbent compound is supported on the surface of an inert material.

For example, the introduction of soluble reagents such as $Mg(NO_3)_2$ in the starting precursor solution will result in the formation of a tailored dolomite-like composition. Introduction of nanophase particulate $Al_2O_3$ will result in the formation of a $CaO/Al_2O_3$ composite. The composition of the intermediate compound as well as for the final absorbent powder is also of great importance since it determines if the combination of high absorption capacity and excellent recyclability can be achieved. For example, low amounts of the inert additive (alumina, titania, silica or MgO) may lead to absorbent materials that have high sorption capacity since the amount of CaO will be high. However these high CaO materials may not have enough resistance to sintering and may be susceptible to rapid decrease of surface area and porosity, and therefore have low activity after multiple cycles. The amount of inert additive therefore is preferably not greater than 70 wt. % of the total absorbent material, more preferably not greater than about 50 wt. % such as from about 1 wt. % to about 50 wt. % of the absorbent material. More preferably, the inert additive is present at a level of not greater than about 30 wt. % of the total absorbent material such as from about 5 wt. % to 30 wt. % and even more preferably is not greater than 20 wt. % of the total absorbent powder. Accordingly, the absorbent material preferably includes at least 30 wt. % of the absorbent compound, more preferably at least about 50 wt. % of the absorbent compound and even more preferably at least about 70 wt. % of the absorbent compound.

The composite absorbent material which includes the absorbent compound and the inert material can retain a high absorption capacity, such as at least about 10 grams $CO_2$ per 100 grams of unreacted absorbent material. More preferably, the absorbent material retains an absorption capacity of at least about 20 grams $CO_2$, even more preferably at least about 30 grams $CO_2$ per 100 grams of unreacted absorbent material and even more preferably at least about 40 grams $CO_2$ per 100 grams of unreacted absorbent material. The absorbent compound contained within the absorbent material preferably has an absorption capacity of at least about 30 mol. %, more preferably at least about 50 mol. %, even more preferably at least about 70 mol. % and even more preferably at least about 90 mol. %.

Reaction Rate Enhancement

The reactivity of the individual active sites in the absorbent compound is dictated by the chemical composition and crystalline structure of the absorbent as well as by the reaction conditions during manufacture of the absorbent. The chemical composition can influence the activity for a specific reaction with a gas species by adjusting the electronic and steric nature of the activity of the surface reaction sites. For example, the presence of a dopant can enhance the reactivity compared to the material without a dopant. Steric effects may enhance the reactivity by having atoms present which distort the surface structure to make the active sites more sterically accessible for reaction with the contaminant. The reactivity of the absorbent is also strongly influenced by its crystalline structure, and surface defects are also known to enhance the reactivity of the surfaces. Different crystal faces of a crystalline material also have different reactivities and crystalline materials with more reactive crystallographic planes exposed on the surface will result in a higher overall activity of the absorbent. In some cases amorphous (non-crystalline) materials are more reactive than crystalline materials. The size of the individual amorphous or crystalline particles can also be important due to the strain when very small particles or crystallites are present, especially below about 50 nm in size.

The number of active sites is also important to the overall activity of the absorbent compound. The total number of active sites normally correlates with the content of the active component and the surface area of the material. An absorbent that has a higher surface area will have a higher number of active sites. The total activity of the material, often defined by its mass activity or specific activity, is the product of the number of active sites and their individual activity. Therefore, the surface area of two samples of the same material may be similar, but because the reactivity of the respective active sites in each material is different, the total reactivity is different. Also, some active sites may be disposed in pore channels that are too small to be reached by the targeted species (e.g., $CO_2$). Indeed, it is possible to have an absorbent that has a lower surface area relative to another sample of the same material, but that has a higher overall activity. This is why in the design of absorbent materials, other factors such as pore volume and pore size distribution, surface composition and crystallinity of the phases are as important as the surface area with respect to achieving high overall absorption capacity. In addition, the ability of the absorbent structure to retain its pore structure and surface composition after thermal and reaction cycles is critical to its use as a reversible absorbent. In summary, both the concentration (number) of accessible active sites and their individual activity determine the overall reaction kinetics and have a strong influence on the system design and operating conditions.

The recycle time in the fuel processing system is dictated by the size of the $CO_2$ absorbent bed, the number of beds present and the rate at which the $CO_2$ is absorbed and desorbed. Based on the initial studies of the materials and the thermodynamics among CaO, $CO_2$ and $CaCO_3$, it has been determined that $CO_2$ absorption has a relatively high rate at a lower temperature compared to $CO_2$ desorption, as expected. In addition, provided the microstructure of the materials in the bed is correctly designed and within typical space velocities, it is likely that the methane feed rate, rather than the surface reaction kinetics, limits the rate of carbonation. This assumes that through the optimum microstructure, the formation of an impervious $CaCO_3$ layer is avoided, which is known to limit the rate of $CO_2$ uptake after all exposed surfaces of CaO have reacted.

The more difficult problem to solve is achieving decarbonation kinetics that are sufficiently rapid that the decarbonation step does not limit the recycle time. Increasing the temperature can increase the rate constant for the decarbonation reaction, but this may lead to some sintering of the material and reduce the cycle life. Therefore, alternative strategies need to be employed to minimize the time required for decarbonation.

The microstructure of the CaO bed can affect the rate of decarbonation and an increase in the rate of decarbonation has been observed as the particle size of CaO-based powders is decreased. Since the size of the CaO particles is not small enough to introduce changes in the strength of the chemical bonds (i.e., the particles are below a quantum confinement limit of about 30 nm), these results most probably reflect a change in the powder microstructure leading to an improvement in the diffusion transport characteristics of the material. However, the microstructure according to the present invention can also be further optimized to improve the kinetics of the reaction provided the feature size of the changes are at or below a crystallographic length scale of 30 nm (i.e., to create surface tension and surface pressure effects).

According to the present invention, the CaO lattice structure can also be doped with elements that lead to an enhancement of the kinetics of the decarbonation reaction. The dopants can be selected from mono-valent, divalent and polyvalent metals, preferably from the group consisting of Mg, Ni, Zn, Fe and Cu. Preferably, the dopants are present at a level of at least about 0.1 at. % and not greater than about 10 at. %, such as at least about 1 at. % and not greater than about 5 at. %. These dopants can also lead to an enhancement of the $CO_2$ absorption rate by the CaO-based absorbent. Therefore, it is preferred that the changes in the absorbent composition do not lead to an increase in the rate of decarbonation at the expense of significantly decreasing the rate of absorption and therefore to change the rate-limiting step for carbonation from being limited by the fuel feed to the rate of the surface reaction.

Accordingly, high performance $CO_2$ absorbents can be fabricated by spray processing CaO-based absorbents that have varying amounts of metal ions, which have a smaller ionic radius compared to $Ca^{2+}$ and are electropositive so that the presence of such a hetero atom in the structure of CaO will change the physicochemical properties of crystal structure by altering the bond distance and electronic structure owing to the difference of ion potential (Z/r) between the calcium ion and the introduced metal ions. Accordingly, Mg, Ni, Zn, Fe and Cu cations are preferred, provided that the doped absorbent materials have a crystal structure similar to CaO with an isometric-hexoctahedra structure and/or similar to dolomite with a trigonal-rhombohedral structure, such as akimotoite and ankerite with a composition of $(M_xN_yP_z)CO_3$, where M, N and P are the divalent or higher valency metal cations other than Ca, such as Mg, Fe or Si and where x, y, z are the molar fraction of total metal ions.

Regeneration of Sample Performance During System Operation

During reversible absorption of $CO_2$, the microstructure of the particles can change over longer periods of time at elevated temperature and/or after a large number of cycles. This can lead to a decrease in the absorption capacity of the material. The absorption capacity can be restored by the treatment of the material with reagents that can re-establish the pore structure of the material. One such reagent that can increase the capacity of the absorbent material after it has been reduced is water. Treatment of the absorbent with water above room temperature increases the capacity of the material for future cycles. This treatment can be applied multiple times to prolong the material lifetime (i.e., the capacity and number of cycles of the material). While not wishing to be bound by any theory, it is believed that the mechanism of the performance improvement is as follows. The reduction in capacity is likely due to a sintering of the material at the nanosize level. In the case of CaO, it is likely that the surface area is reduced over time through chemical rearrangement and formation of Ca—O—Ca bonds, possibly via formation of Ca—OH intermediates, removing previously accessible pores. The reaction of the strained Ca—O—Ca bonds with water or another similar reagent, regenerates Ca—OH bonds which on carbonation re-establishes the previous structure.

Other reagents that may be suitable to regenerate the surface area and recyclability of these materials, including protic reagents such as methanol, organic acids and inorganic acids.

SMR Catalysts

Two types of materials are required to affect the overall reaction illustrated by Equation 14, namely a highly reactive, high capacity, highly reversible $CO_2$ absorbent as is discussed above, and a highly active SMR catalyst to catalyze the reaction of Equation 1. Nickel-based catalysts are often used because they are highly active and inexpensive, but they are susceptible to sulfur poisoning and carbon deposition at steam to carbon molar ratios ($H_2O$:C) below about 3:1. This can lead to shorter life and reliability of the reforming system.

A variety of catalyst compositions may be valuable to effect catalytic reactions in general and steam reforming reactions in particular. These materials are typically comprised of active catalyst materials dispersed over the surface of a relatively high surface area support. The active catalyst particle is typically a metal, metal alloy, metal oxide, metal nitride or metal carbide and the support phase typically comprises a metal oxide, or in some cases carbon, a metal or a metal nitride. The above materials can be made by a spray processing method as is described above, such as where a precursor to the active phase is dissolved in a solvent, which also contains dispersed particles of the support, and droplets of the suspension are generated and subjected to a heat treatment in various spray processing configurations. Depending on the time-temperature history, active clusters are formed onto the surface of the high surface area support.

$Rh/Al_2O_3$ catalysts are preferred according to the present invention since this catalyst is highly active and less sensitive to poisoning by sulfur contaminants than nickel-based SMR catalysts. However, this catalyst contains a relatively expensive precious metal (Rh).

To develop $Rh/Al_2O_3$ reforming catalysts that are commercially acceptable, the Rh loading on the support must be relatively low while remaining highly active to convert hydrocarbons to $H_2$ at a level close to the equilibrium level under the reforming conditions, particularly at a high space velocity. The catalyst should also have a sufficient lifetime. According to one embodiment of the present invention, the $Rh/Al_2O_3$ materials have a high dispersion of Rh on the $Al_2O_3$, and the $Al_2O_3$ can be selected to have a range of surface areas and porosities. Such catalysts can be fabricated by spray processing.

According to the present invention, the steam-reforming catalyst includes a support material, preferably a support material selected from the group consisting of the metal oxides of aluminum, cerium, zirconium, lanthanum, silicon, magnesium, zinc and combinations thereof. The support material includes a metal (i.e., metal clusters) dispersed on a support material wherein the metal is preferably selected from the group consisting of rhodium, nickel, ruthenium, platinum, palladium and alloys thereof. Rhodium is particularly preferred. The reforming catalyst preferably includes from about 0.1 wt. % to about 1 wt. % of the metal. A particularly preferred reforming catalyst includes rhodium dispersed upon an alumina support ($Rh/Al_2O_3$).

Figure 12:
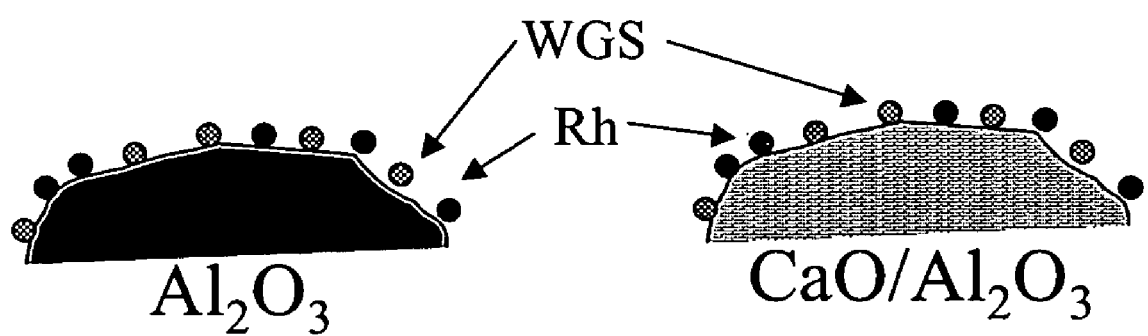
FIG. 12 illustrates the structure of a supported composite particle including a water gas shift catalyst and reforming catalyst according to an embodiment of the present invention.

The reforming catalyst can also be produced by spray conversion separately or can be incorporated into the CaO absorbent, i.e., as a multi-functional composite material. FIG. 12 illustrates one of the preferred embodiments of this aspect of the present invention where the $Rh/Al_2O_3$ catalyst is prepared in combination with the CaO absorbent material.

Integration of WGS Catalysts

There are various levels of synergy required between all functions needed to achieve high efficiency in the overall AER reaction. Therefore, in addition to the absorption function, two or more other functions can be integrated. For example, in addition to the reforming activity, materials with WGS activity can also be incorporated to enhance the carbonation/decarbonation kinetics.

Even in the presence of a $CO_2$ absorbent, steam reforming alone will likely be insufficient to guarantee a low CO content in the reformed fuel stream. As a result, sufficient amounts of high-temperature WGS catalysts can be incorporated into the reformer to ensure rapid conversion of CO to $CO_2$. For example, the WGS catalyst can be incorporated into the $Al_2O_3$ support of the $Rh/Al_2O_3$ particles. The WGS catalyst can also be incorporated into the CaO absorbent. Further, a single composite material can be produced in which the $Rh/Al_2O_3$ and WGS catalyst can be incorporated onto the surface of the CaO. Two of these embodiments are illustrated in FIG. 12. For reasons of material compatibility within the system, perovskite phase metal oxide catalysts based on Ca are particularly preferred as the support phase.

Other WGS catalyst compositions that can be incorporated into this structure include the metal oxides such as iron and chromium oxides, the precious metal or metal alloy supported materials such as $Pt/Al_2O_3$, $Pt/CeO_2$, $Pt/CeO_2$—$ZrO_2$, $Au/TiO_2$ and $Au/Fe_2O_3$, perovskites including transition metals and other materials having the capability to convert CO to $CO_2$.

Integration of $CO_2$ Absorbent

According to one embodiment of the present invention, separate pellets of $Rh/Al_2O_3$ catalyst and CaO-based $CO_2$ absorbent are fabricated with a goal of reducing the Rh content to below 0.05 wt. % based on the total mass of absorbent plus reforming catalyst. According to this embodiment, there is substantially no intimate contact between the catalytically active sites (Rh) and the $CO_2$ absorption sites, the proximity of these species being limited by their relative concentrations, the pellet size and the pellet shape. For example, the pellets can be fabricated with an absorbent to SMR catalyst mass ratio of about 9:1. As a result, the average length scale between the $CO_2$ generation site and the $CO_2$ absorption site will be several millimeters (the size of the pellets). There is a strong motivation to further reduce the amount of SMR catalyst (Rh) because it is the most expensive material in this system.

According to another embodiment of the present invention, the powders of the individual $Rh/Al_2O_3$ catalysts and CaO-based $CO_2$ absorbents are mixed and pelletized together in the same pellets. The advantage of this approach over using separate pellets is that the mixed powder within each pellet enables a much closer spatial proximity of the SMR catalyst to the absorbent, on the order of 10 s to 100 s of microns. Also, in contrast to the separate pellet approach, significant changes to the ratio of $Rh/Al_2O_3$ and CaO-based absorbent can be made with less significant changes in the spatial proximity of the active materials.

In yet another embodiment of the present invention, the $Rh/Al_2O_3$ and CaO-based absorbent are combined into a single multi-component particle where the active materials are found within the same particle. This is feasible according to the present invention because of compatibility in the spray processing steps (temperature and time history), that can be utilized to make these materials. For example, the Rh reagent can be pre-reacted with the surface of the $Al_2O_3$ nanoparticles in a solution phase step prior to mixing all the reagents and spray processing. In this embodiment, the spatial proximity between the $Rh/Al_2O_3$ and CaO-based $CO_2$ absorbent will be closest, in the range of nanometers to sub-micron and the spatial separation will be least affected by a change in the ratio of the two active materials, such as when they are mixed as separate pellets. This can lead to a significant reduction in the amount of Rh in the integrated absorbent/catalyst pellets and therefore to a reduction in the materials and the overall reactor cost.

Figure 13:
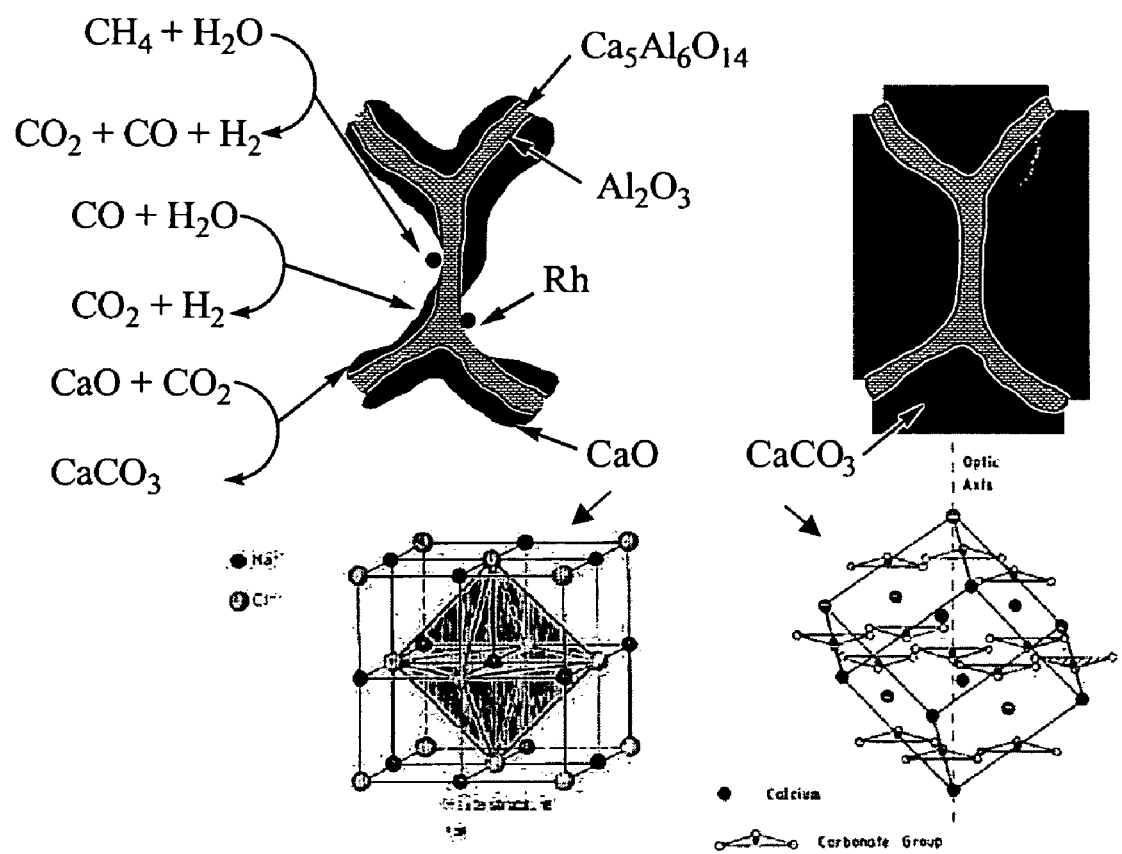
FIG. 13 illustrates the structure of a composite absorbent/catalyst particle according to an embodiment of the present invention.

FIG. 13 illustrates a type of microstructure according to this embodiment of the present invention. An $Al_2O_3$ skeleton provides structural support to the absorbent and binds strongly to the CaO, based on the formation of well known calcium aluminate compounds at the interface, such as $Ca_5Al_6O_{14}$. The distribution of mesoporous CaO throughout this system allows access to the gaseous reagents enabling the CaO to "breath" $CO_2$. Comparison of the crystal structures of CaO (NaCl structure, cubic symmetry) and the calcite polymorph of $CaCO_3$ (trigonal symmetry) shows that they are structurally related, which explains how $CO_2$ can be reversibly absorbed by CaO without massive structural breakdown of the material.

The particulate multi-component composite particles can be fabricated utilizing spray processing of precursors to one or more of the materials. Alternatively, the multi-component composite particles can be formed by separately fabricating each of the phases to be included in the particle (e.g., by spray processing), dispersing the materials in a liquid and spray processing the solution to form the dispersion particles.

According to one embodiment, the particulate composite material includes an absorbent material phase adapted to absorb $CO_2$ and a catalyst phase selected from a reforming catalyst phase and a water-gas shift catalyst phase. The mass ratio of the absorbent phase to the catalyst phase is preferably from about 20:1 to about 3:1, more preferably from about 9:1 to about 5:1. The absorbent material phase in the composite particles can preferably include an absorbent compound having a reaction fraction of at least about 70 mol. %, and can retain a reaction fraction of at least about 30 mol. % after 100 cycles. Further, the absorbent material phase can include an absorbent compound that retains at least about 30 mol. % of the theoretical $CO_2$ absorption capacity of the absorbent compound after at least about 10 cycles, more preferably at least about 40 mol. % of the theoretical absorption capacity after at least about 10 cycles. The absorbent material phase can also preferably retain at least 10 grams of $CO_2$ per 100 grams of unreacted absorbent material after each cycle. Further, the absorbent phase can preferably retain at least about 15 grams $CO_2$ per 100 grams unreacted absorbent after 10 cycles, more preferably at least about 20 grams $CO_2$ per 100 grams unreacted absorbent after 10 cycles, even more preferably at least about 30 grams $CO_2$, even more preferably at least about 40 grams $CO_2$ and even more preferably at least about 50 grams $CO_2$ per 100 grams unreacted absorbent after 10 cycles.

Formation of Reactor Bed: Pelletization

Extrusion is the most economic and commonly applied shaping technique for the formation of pellets of catalysts and supports. For extrusion, the catalyst powder is generally in the form of a wet paste or a powder that is converted to a wet paste within the extrusion machine itself. The extrusion machine forces the paste through a die and cuts the extruded material at the desired length. The detailed process can be described as follows.

A paste of catalyst powder is fed from a hopper into a screw drive. Peptizing agents, such as nitric acid or other organic acids such as acetic acid, may be added to deagglomerate the primary particles by lowering the zeta potential, improving the extrusion process. The screw forces the paste through holes in the end plate. Usually circular in cross section, these holes can also be made in the shape of cogs or rings, ovals, stars, three-lobed joined rings, or hollow rings similar to macaroni. As the ribbon of slurry emerges from the hole, it begins to dry and harden sufficiently to maintain its shape. The extruder can be equipped with a slicing device, so that the ribbon is either cut into prescribed lengths by the knife rotating outside the end plate or simply allowed to break up as it falls onto a moving belt on its way to the driver.

Extruding equipment can be classed in one of two categories: press extruders and screw extruders. Press extruders are used principally for pastes that are viscous, whereas screw extruders are preferred for thixotropic products. The ease of extrusion and quality of the product depend on the following properties of the paste:

1. Viscosity (adhesivity): A non-thixotropic product that is too viscous will block the extruder. A product that lacks in viscosity cannot be extruded with a screw and will give extrudates without mechanical resistance when extruded by a press.
2. Thixotropy (fluidity): Certain substances become less viscous under shearing forces, and then recover their initial state after the forces have been released for a time called the relaxation time. The existence of such thixotropic properties is eminently favorable for the flow of a paste and formation of a solid granule at the exit of a die, providing the relaxation time is short enough.
3. Stability: Under extrusion conditions, there should be no dynamic sedimentation of the product through exuding water and forming a paste that is too viscous.
4. Homogeneity: The paste must be homogeneous to assure that the quality of the product is constant. When necessary, the paste is homogenized in a mixer-kneader under controlled conditions of temperature, time, and pH. An excess of kneading can in fact compact the material and suppress potential macropores. Screw extruders partially knead the paste as it travels along the screw.

Even for a given charge with specific properties, the operating variables are rather poorly defined and are closely related to the type of equipment. Generally they include: mixing time, water content, adhesives content, paste aging and extrusion temperature. In the case that a powder does not have certain level of fluidity or plasticity, various additives can be used to aid the pre-forming of pastes or microgranules, such as:

1. Lubricants for improving the rheological behavior, such as liquid (water, mineral oil) or solid (starch or clays like montmorillonite, stearic acid, and various stearates);
2. Binders (aluminas or clays). Binders are added to also increase the post-compression adhesion, as for example starch is added for palletizing/extrusion of active carbon;
3. Peptizing agents such as dilute acetic or nitric acid to deagglomerate the particles. By peptizing, an increase in the adhesive forces due to chemical bonds resulting from contact between the pastes can be achieved, meanwhile the particle surfaces are made more chemically reactive; and
4. Combustible materials to increase the porosity (the so-called pore-formers like carbon black, graphite, talc, starch, etc.).

If the extrusion is performed well, the particles (extrudates or pellets) formed are very regular, hard, and uniform. However, if the extrusion is uneven and the rate of extrusion from one section of the dies is different from that of another section, the particle length can be quite variable and the hardness and sharpness of the ends can also be variable. The extruder, however, can rapidly produce great quantities of product of various shapes and as a consequence is relatively inexpensive in comparison with pilling or pelletizing.

In practice, the particulate catalysts and absorbents have to be pelletized to meet a certain crush strength. Pelletization of powders typically involves reaction of the powders to be pelletized with a binder and extrusion of the paste through a die to give the desired pellet geometries. In the case of catalysts and gas absorbent materials, the binder system is typically $Al_2O_3$ combined with a peptizing agent such as an organic acid. On reaction, these materials yield a metal-organic compound that penetrates the entire structure and on subsequent thermal decomposition yields a continuous $Al_2O_3$ skeleton that provides mechanical support. Ideally, the extrudates will maintain the high reactivity and high cycle ability of the original powder after pelletizing.

There are a number of approaches to pelletization. One is directly pelletizing the powders (e.g., CaO) that show high reactivity to $CO_2$ carbonation. Another is pelletizing an intermediate powder precursor like $CaC_2O_4$ and $CaCO_3$ with a certain amount of binder. After post-processing, the decomposition of precursors into CaO will facilitate the formation of the microstructure and porosity of the extrudates, and the obtained pellets will maintain or even improve the absorbent performance during carbonation/decarbonation cycles. In this approach, however, the amount of binder used for extrusion should be carefully considered to achieve maximum capacity for $CO_2$ removal.

According to one embodiment, a pellet includes at least about 5 wt. % of a particulate intermediate compound to an absorbent compound where the particulate intermediate compound has a theoretical density that is not greater than the theoretical density of the absorbent compound and wherein the particulates are substantially spherical. The pellet can preferably have a crush strength of at least about 1 N/mm. The pellet can include, for example, alumina as a binder.

Formation of Reactor Bed: Coated Structures

The pelletization of the materials described above is only one of a number of methods to create a reactor bed for AER. The advantages of a pelletized bed are that the capacity of the bed is relatively high. However, under some circumstances, the operating space velocity of such a pelletized reactor bed can limit the performance of the overall system. Therefore, as according to another embodiment of the present invention, the materials can be coated onto a surface that provides a high available surface area for the powder. The structures that are typically coated are high surface area structures such as porous monoliths, honeycomb structure monoliths or corrugated support structures. These support structures are typically comprised of metals or metal oxides to aid in thermal stability and in some cases to improve thermal conductivity.

In order to coat the support structures, the powders are often formed into a slurry, paste or ink that is then applied to the support surface. Methods to coat the powders described herein onto the surface of the support structures may include wash-coating, dipping, screen printing, ink-jet printing, spraying or any other printing or coating, digital or analog technologies known to those skilled in the art.

In addition to a coated structure, the active materials, particularly the absorbent materials, can be fabricated into a monolith, such as a honeycomb structure having a relatively high surface area.

Formation of Reactor Bed: Textile, Cloth or Paper Support

While the advantage of the coated structures is that the space velocity of the system can be increased, one potential limitation of the coated structures is a reduction in capacity. In order to achieve a better compromise between the capacity and space velocity characteristics of coated structures and pellets, the materials described herein can be incorporated into porous cloths. The cloths may be comprised of woven or non-woven fibers of a variety of different materials including various metals (for example, copper, nickel or stainless steel), metal oxides or carbon fibers. In a preferred embodiment, the powders are incorporated into a metal-based cloth to improve the thermal characteristics of the powder bed.

In order to coat the cloth structures, the powders are often formed into a slurry, paste or ink that is then applied to the cloth surface. Methods to coat the powders onto the surface of the cloth structures may include wash-coating, dipping, screen printing, ink-jet printing, spraying or any other printing or coating, digital or analog technologies known to those skilled in the art.

In another embodiment, the powders may be incorporated into the bulk of the textile, cloth or paper at the time of the manufacture of the textile, cloth or paper support. In the typical paper or non-woven cloth manufacturing process, the powders are mixed with the fibers in the original slurry and as the suspended materials are removed from the slurry, the powders are trapped inside the structure of the material. Post processing may be necessary to achieve some chemical attachment between the particles and the support to complement the mechanical entrapment within the pore structure created by the fibers.

AER

In accordance with the foregoing description and the following examples, the materials of the present invention can advantageously been utilized in an absorption enhanced reforming (AER) process for the conversion of a carbon-based fuel to a $H_2$-rich product gas. The enhanced reforming process can be enhanced steam reforming, enhanced autothermal reforming, enhanced partial oxidation or enhanced catalytic partial oxidation. The carbon-based fuel is preferably a hydrocarbon-based fuel, such as a gaseous hydrocarbon fuel or a liquid hydrocarbon fuel. Preferred gaseous fuels are those that include methane (e.g., natural gas) and preferred liquid fuels include diesel fuel, JP-8 aviation fuel, kerosene, ethanol and gasoline.

According to one embodiment, the carbon-based fuel is contacted with at least a first conversion catalyst such as an SMR catalyst and optionally a WGS catalyst to catalyze the conversion of the carbon-based fuel to an intermediate gas product that includes $H_2$. Other components can be provided with the carbon-based fuel, such as steam (e.g., Equation 1), oxygen (e.g., air as in Equation 4) or a mixture of oxygen and steam. The intermediate gas product includes $CO_2$ and is contacted with an absorbent material to absorb $CO_2$ and form a $H_2$ rich gas. Although the steps of converting the carbon-based fuel and absorbing the $CO_2$ are described as separate steps, it will be appreciated by those skilled in the art that these steps can occur essentially simultaneously, such as when the catalyst material and the absorbent material are intimately mixed in the reactor bed. It is preferred that the carbon-based fuel contact the catalyst and the absorbent at a temperature of not greater than about 800° C. However, it has been found that the conversion and absorption can occur at temperatures not exceeding about 600° C. The $H_2$-rich gas is extracted from the contacting step to absorb $CO_2$ and preferably has a $H_2$ content of at least about 95 mol. %, more preferably at least about 98 mol. %.

Thereafter, the absorbent can be regenerated by decarbonizing the absorbent to complete the cycle. Regeneration of the absorbent can include heating the absorbent to an elevated temperature, such as at least about 700° C., possibly in the presence of water or another reagent. According to the present invention, the absorbent material can be cycled (i.e., absorbing $CO_2$ and then regenerating to remove substantially all of the chemically bound $CO_2$) at least ten times, wherein the absorbent material retains at least about 50 mol. % of its theoretical absorption capacity based on the quantity of active absorbent compound present for every cycle through at least ten cycles. According to certain preferred embodiments of this aspect of the present invention, the absorbent can retain at least about 50 mol. % of its theoretical absorption capacity for every cycle up to 50 cycles, more preferably up to 100 cycles and even more preferably up to 500 cycles. Further, the absorbent material can preferably retain at least about 70 mol. % of its theoretical absorption capacity for every cycle up to ten cycles and more preferably that the absorbent material can retain at least about 90 mol. % of its theoretical absorption capacity for every cycle up to ten cycles. In one embodiment, the absorbent is cycled at least 200 times and the absorbent material retains at least about 10% of its theoretical absorption capacity, more preferably at least about 25% of its theoretical absorption capacity and even more preferably at least about 50% of its theoretical absorption capacity after 200 cycles.

The absorbent materials according to the present invention also have a high initial absorption capacity for $CO_2$. According to one embodiment, the initial absorption capacity (expressed as a reaction fraction of active absorbent compound) is at least about 60 mol. %, and more preferably is at least about 70 mol. %. As is discussed above, the absorbent and/or the catalyst can be pelletized or can be coated onto a rigid or semi-rigid support structure or can be formed into a monolith.

According to another embodiment, the total mass of the absorbent material retains at least about 10 grams of $CO_2$ per 100 grams unreacted absorbent compound after each cycle. More preferably, the absorbent material retains at least 20 grams $CO_2$ per 100 grams unreacted absorbent compound after each of the cycles, even more preferably at least about 30 grams $CO_2$ per 100 grams unreacted absorbent compound after each of the cycles, even more preferably at least about 40 grams $CO_2$ per 100 grams unreacted absorbent compound after each of the cycles and even more preferably at least 50 grams $CO_2$ per 100 grams unreacted absorbent compound after each of the cycles. Further, such high absorption capacity can be achieved over 50 cycles, over 100 cycles and even over 500 cycles.

According to another embodiment, the absorbent material can be cycled at least 50 times wherein the absorbent material retains at least about 20 mol. % of its theoretical $CO_2$ absorption capacity after each cycle. More preferably, the absorbent material retains at least about 40 mol. % of its theoretical $CO_2$ absorption capacity, even more preferably at least about 60 mol. % and even more preferably at least about 90 mol. % of its theoretical absorption capacity.

According to one embodiment, the absorbent material includes an absorbent compound and an inert compound intimately mixed with the absorbent compound. Examples of such materials are discussed above. The absorbent material preferably has an absorption capacity of at least about 10 grams $CO_2$ per 100 grams of absorbent material after 100 cycles, more preferably at least about 15 grams $CO_2$ per 100 grams of absorbent material after 100 cycles, even more preferably at least about 20 grams $CO_2$ per 100 grams of absorbent material after 100 cycles and even more preferably at least about 30 grams $CO_2$ per 100 grams of absorbent material after 100 cycles. The absorbent compound contained within the absorbent material preferably has an absorption capacity of at least about 10 mol. % after 100 cycles, more preferably at least about 15 mol. % after 100 cycles, and even more preferably at least about 30 mol. % after 100 cycles.

It is also an advantage of the present invention that the absorbent does not undergo large fluctuations in bulk density over numerous cycles. The bulk density of the materials described in the present specification is defined as the mass of the particles divided by the volume they occupy, including the pore spaces between the particles. This volume includes the solid material volume, the open and closed pore volume within the particles, as well as the interparticle void volume. The bulk density of the material is typically derived from a mercury porosimetry measurement. For example, according to one embodiment, the absorbent material is formed into a pellet having a first bulk density. The pellet can then be used in an AER reaction, substantially as described above, and the pelletized absorbent will carbonize upon absorption of $CO_2$ to form a carbonized pellet having a second bulk density. After the pellet is regenerated back to the absorbent material, it will have a third bulk density. Using commercially available absorbent materials, the second bulk density is much lower than the first bulk density and the third bulk density would be similar to the first bulk density. According to the present invention, however, the second bulk density is not significantly different than the first bulk density and the third bulk density is much higher than the first bulk density. The third bulk density is preferably greater than 100% of the first bulk density, such as up to about 140% of the first bulk density.

The SMR catalysts such as $Rh/Al_2O_3$ fabricated according to the present invention also have improved performance as compared to the prior art. Specifically, the SMR catalyst can have a high conversion efficiency for the conversion of a carbon-based fuel to hydrogen. According to one embodiment, the SMR catalyst achieves at least about 90% of the theoretical thermodynamic conversion of methane to hydrogen at a temperature of 600° C., a $H_2O$:C molar ratio of 3:1 and a gas hour space velocity (GHSV) of 5000 hour$^{-1}$ in the absence of an absorbent for $CO_2$. Preferably, the catalyst can achieve at least about 95% of the theoretical thermodynamic conversion under the same conditions. Further, the reforming catalyst can preferably achieve at least about 90% of the theoretical thermodynamic conversion of methane to hydrogen a temperature of 600° C., a molar $H_2O$:C ratio of 3:1 and a gas hour space velocity of 10,000 hour$^{-1}$ in the absence of an absorbent for $CO_2$. Preferably, the reforming catalyst can also obtain at least about 90% of the theoretical thermodynamic conversion under the same conditions but at a gas hour space velocity of 12,500 hour$^{-1}$.

Integration of AER with a Fuel Cell Stack

One of the applications of a single-step reformer (SSR) is as a cost-effective $H_2$ source for stationary residential fuel cells that run on natural gas. The benefits of SSR, particularly the purity of the $H_2$ stream, combined with the potential benefits of using existing metal hydride storage materials, leads to a strong impact on the capital cost and operating efficiency of the fuel cell stack, especially in stationary fuel cell applications including in back-up power units for uninterruptible/emergency power supply applications, as well as residential and commercial applications.

The significance of the SSR reformer on the fuel cell stack capital cost and efficiency is as follows. A state of the art natural gas reformer based on the competing technologies of steam methane reforming and autothermal reforming produces a gas feed for the fuel cell anode that is in the range of 40%-50% $H_2$ with the balance being nitrogen, $CO_2$, water and CO at ppm levels. This gas composition, containing a relatively dilute $H_2$ feed, results in a relatively low power density in the fuel cell stack, the requirement for a relatively high loading on PtRu alloy (to provide CO tolerance) on the anode and reliability problems that are believed to be associated with the reverse water-gas shift reaction where the PtRu alloy converts the $CO_2$ and $H_2$ present to water and CO (thus poisoning the electrocatalyst). In contrast, the gas feed from the SSR system, which due to it's high $H_2$ content and low impurity content, can uniquely be coupled directly with the existing metal hydride hydrogen storage materials has an enormous impact on the cost and operation of the stack. The purer hydrogen feed at a much higher concentration may avoid the need for PtRu alloy on the anode altogether and could lead to a significantly increased power density in the stack resulting in a significant reduction in the size (i.e., number and/or size of MEAs) required to achieve a particular power output. Start-up issues are avoided because the hydrogen storage materials are built into the hydrogen purification system. Furthermore, the $H_2$/air fuel cell stack technology (which can now be used due to the performance of the SSR reformer) is much more mature and reliable compared to the reformed natural gas/air fuel cell technology that is required when the SMR and ATR technology is used. Since it is calculated that around 40% of the fuel cell stack cost is based on the cost of the MEAs, this impact could clearly be significant in reduction of capital and operating cost.

EXAMPLES

The following examples illustrate the production and application of the AER materials according to the present invention, including absorbents, SMR catalysts and multifunctional composite materials.

Absorbents

The absorbent materials according to the present invention can be fabricated by spray pyrolysis or spray drying, and either fabrication method can be followed by post-processing. The following examples illustrate some non-limiting embodiments.

Example A-1

This example illustrates the production of a 5 g batch of Ca-oxide (CaO) absorbent according to the present invention by spray pyrolysis. 21 g of Ca-nitrate ($Ca(NO_3)_2$) is dissolved in 178 g of de-ionized water. 1 g of lactic acid and 1 g of $NH_4$-nitrate ($NH_4NO_3$) is added while stirring and the solution is stirred for 10 minutes. Spray pyrolysis is conducted on an ultrasonic transducer system at a furnace temperature of 900° C., with air as both the carrier gas and the quench gas at 60 SLPM and 5 SCFM, respectively. The reaction residence time of the system is 1.5 seconds, as calculated by the quotient of the system volume and the carrier gas flow rate corrected for temperature expansion. The collected powder batch consists essentially of CaO.

Example A-2

This example illustrates the fabrication of a 1 kg batch of Ca-oxalate ($CaC_2O_4$) according to the present invention using a spray dryer. 1.84 kg of Ca-nitrate is dissolved in 2 kg of de-ionized water and 1.11 kg of $NH_4$-oxalate is dissolved in 4.5 kg of de-ionized water. The two solutions are individually mixed on shear mixers for 30 minutes. The Ca-nitrate solution is slowly added to the $NH_4$-oxalate solution while shearing. The resulting 10 wt. % solids dispersion of precipitated Ca-oxalate is sheared for an additional hour. The precursor dispersion is fed into a mixed-flow spray dryer at a liquid feed rate to maintain inlet/outlet temperatures of 975° F./580° F. (524° C./304° C.), using a two-fluid nozzle with an air pressure of 65 psig. The residence time of the system is 10 seconds as calculated by the quotient of the system volume and the gas flow rate corrected for expansion using the outlet temperature. The powder is collected using a cyclone. The powder batch consists essentially of $CaC_2O_4$.

Example A-3

This example illustrates the fabrication of a 1 kg batch of $CaC_2O_4$ and 5% $Al_2O_3$ according to the present invention in a spray dryer. 1.74 kg of Ca-nitrate is dissolved in 2 kg of de-ionized water and 1.06 kg of $NH_4$-oxalate (($NH_4)_2C_2O_4$) is dissolved in 5 kg of de-ionized water. The two solutions are individually mixed on shear mixers for 30 minutes. The Ca-nitrate solution is slowly added to the $NH_4$-oxalate solution while shearing to precipitate $CaC_2O_4$. The resulting 10 wt. % solids dispersion of precipitated $CaC_2O_4$ is sheared for an additional hour. 0.25 kg of DISPAL 23N4-20 (a 20% boehmite alumina dispersion in water, available from Sasol, North America) is added, followed by 15 minutes of shear mixing. The precursor dispersion is fed into a mixed-flow spray dryer at a liquid feed rate to maintain inlet/outlet temperatures of 975° F./580° F., using a two-fluid nozzle with an air pressure of 65 psig. The residence time of the system is 10 seconds, as calculated above. The powder is collected using a cyclone. The powder batch consists essentially of 5 wt. % $Al_2O_3$ and 95 wt. % $CaC_2O_4$.

Example A-3A

This example illustrates the fabrication of a powder batch consisting essentially of $CaC_2O_4$ with 25% $Al_2O_3$. 1.38 kg of Ca-nitrate is dissolved in 2 kg of de-ionized water. 0.84 kg of $NH_4$-oxalate is dissolved in 5 kg of de-ionized water. The two solutions are mixed on shear mixers individually for 30 minutes. The Ca-nitrate solution is slowly added to the $NH_4$-oxalate solution while shearing. The resulting 10 wt. % solids dispersion of precipitated Ca-oxalate is sheared for an additional hour. 1.25 kg of DISPAL 23N4-20 is added, followed by 15 minutes of shear mixing. The precursor dispersion is fed into a mixed flow spray dryer at a liquid feed rate to maintain inlet/outlet temperatures of 975/580° F., using a two-fluid nozzle with an air pressure of 65 psig. The residence time of the system is 10 seconds, s defined above. The powder is collected using a cyclone and consists essentially of $CaC_2O_4$ and $Al_2O_3$.

Example A-4

This example illustrates the fabrication of a $CaCO_3/Al_2O_3$ composite by spray drying and post-processing according to the present invention. 140 g of a powder consisting essentially of $CaC_2O_4$ and 5% $Al_2O_3$ (Example A-3) is put into 2 quartz boats, which are then loaded into a tube furnace. Under flowing air, the furnace is ramped 10° C./min to 500° C., held for 3 hours and is then cooled to room temperature. The resulting powder consists essentially of $CaCO_3$ and $Al_2O_3$.

Example A-5

This example illustrates the fabrication of a powder batch consisting essentially of $CaCO_3$ and CaO with $Al_2O_3$ by spray drying and post-processing according to the present invention. 140 g of a powder consisting essentially of $CaC_2O_4$ and 5% $Al_2O_3$ made by spray drying (Example A-3) is put into 2 quartz boats, which are then loaded into a tube furnace. Under flowing air, the furnace is ramped 10° C./min to 750° C., held for 3 hrs and is then cooled to room temperature. The resulting powder consists essentially of a mixture of $CaCO_3$, CaO and $Al_2O_3$.

Example A-6

This example illustrates the fabrication of a 500 g batch of a powder consisting essentially of $CaC_2O_4$:$MgC_2O_4$ with a calculated CaO:MgO wt. ratio of 50:50 according to the present invention. Individually, 0.92 kg of Ca-nitrate is dissolved in 1.0 kg of de-ionized water, 0.54 kg of $NH_4$-oxalate is dissolved in 2.5 kg of de-ionized water, 1.0 kg of Mg-nitrate ($Mg(NO_3)_2$) is dissolved in 1.0 kg of de-ionized water, and 0.56 kg of $NH_4$-oxalate is dissolved in 1.8 kg of de-ionized water. These solutions are shear mixed for 30 minutes. Separately, the nitrate solutions are added to the oxalate solutions. The two resulting dispersions of Ca-oxalate and Mg-oxalate are sheared separately for 1 hour and are then combined. The resulting 10 wt. % solids dispersion of precipitated Ca-oxalates and Mg-oxalates is sheared for an additional hour. The precursor dispersion is fed into a mixed-flow spray dryer at a liquid feed rate to maintain inlet/outlet temperatures of 975° F./580° F., using a two-fluid nozzle with an air pressure of 65 psig. The residence time of the system used is 10 seconds, as defined above. The powder is collected using a cyclone and consists essentially of $CaC_2O_4$:$MgC_2O_4$.

Example A-7

This example illustrates the fabrication of a powder batch consisting of a mixture of $CaCO_3$ and CaO:MgO by spray drying and post-processing according to the present invention. 320 g of a $CaC_2O_4$:$MgC_2O_4$ powder made on a spray dryer- and with a calculated CaO:MgO wt. ratio of 50:50 (Example A-6) is put into shallow pans, which are then loaded into a convection oven. Under flowing air, the furnace is ramped 10° C./min to 500° C., held for 3 hours, and is then cooled to room temperature. The resulting powder batch consists essentially of $CaCO_3$ and CaO:MgO.

Example A-8

This example illustrates the fabrication of a powder batch consisting essentially of 95 wt. % $CaCO_3$ and CaO with 5 wt. % $Al_2O_3$ by spray drying and post-processing according to the present invention. A powder batch consisting essentially of $CaC_2O_4$ and 5% $Al_2O_3$, (which is made the same method as Example A-3), is put into a screw feeder and delivered to a rotary calciner comprising an elongated tube at a rate of 1 kg/hr. The tube includes three equal-length heating zones that are set to 450° C., 750° C. and 750° C. respectively. Air is delivered in a counter-current configuration at a rate of 112 SCFH. The elongated tube is set with an angle and rotational rate in order to yield a residence time of 24 minutes.

Example A-9

This example illustrates the fabrication of a 3 kg powder batch consisting essentially of $CaC_2O_4$:$MgC_2O_4$ (with a calculated CaO:MgO wt. ratio of 80:20). Individually, 4.24 kg of Ca-nitrate is dissolved in 5 kg of de-ionized water, 4.11 kg of $NH_4$-oxalate is dissolved in 6 kg of de-ionized water, 1.6 kg of Mg-nitrate is dissolved in 2 kg of de-ionized water and 1.43 kg of $NH_4$-oxalate is dissolved in 5 kg of de-ionized water. These solutions are shear mixed for 30 minutes. Separately, the nitrate solutions are added to the oxalate solutions. The two resulting dispersions of Ca-oxalate and Mg-oxalate are sheared separately for 1 hour then combined. The resulting 10 wt. % solids dispersion of precipitated Ca-oxalate and Mg-oxalate is sheared for an additional hour. The precursor dispersion is fed into a mixed-flow spray dryer at a liquid feed rate to maintain inlet/outlet temperatures of 975° F./580° F., using a two-fluid nozzle with an air pressure of 65 psig. The residence time of the system used is 10 seconds, as calculated above. The powder is collected using a cyclone and consists essentially of $CaC_2O_4$:$MgC_2O_4$.

Example A-10

This example illustrates the fabrication of a powder batch consisting essentially of a mixture of $CaCO_3$ and CaO:MgO by spray drying and post-processing according to the present invention. 200 g of a powder consisting essentially of $CaC_2O_4$:$MgC_2O_4$ (calculated CaO:MgO wt. ratio of 80:20, Example A-9) is put into shallow pans, which are then loaded into a convection oven. Under flowing air, the furnace is ramped 10° C./min to 500° C., held for 3 hrs and is then cooled to room temperature. The resulting powder batch consists of a mixture of $CaCO_3$ and CaO:MgO.

Example A-11

This example illustrates the fabrication of a mixture of $CaCO_3$ and CaO:MgO by spray drying and post-processing according to the present invention. 200 g of $CaC_2O_4$:$MgC_2O_4$ (80:20 ratio, Example A-9) is put into shallow pans, which are then loaded into a convection oven. Under flowing air, the furnace is ramped 10° C./min to 750° C., held for 3 hrs and is then cooled to room temperature.

The foregoing examples illustrate several different fabrication methods for absorbent materials according to the present invention. A number of additional examples including CaO and/or $CaCO_3$ are prepared in a similar fashion and these additional examples are summarized in Table 2. Table 2 lists absorbent materials that are obtained by different methods including spray pyrolysis (SP) and spray drying (SD) with post-processing (PP). Commercial grade CaO (available from J. T. Baker, Phillipsburg, N.J., USA) is also listed for comparison.

TABLE 2

| Example | Composition | Precursor | Method |
|---|---|---|---|
| A-12 | CaO, $CaCO_3$ | Example A-2 | PP at 500° C. for 3 hrs |
| A-13 | CaO, $CaCO_3$ | Example A-2 | PP at 750° C. for 3 hrs |
| A-14 | CaO | Ca-nitrate $NH_4$-nitrate Lactic acid | SP at 900° C. |
| A-15 | CaO | Ca-nitrate $NH_4$-nitrate | SP at 900° C. |
| A-16 | CaO | Ca-nitrate 20% $NH_4$-nitrate 2.5% PVP (10k) | SP at 1000° C. |
| CaO1 | CaO | Commercial Grade | N/A |

Table 3 summarizes a number of additional absorbent examples that include CaO with MgO and/or $Al_2O_3$ that are prepared by various methods according to the present invention.

TABLE 3

| Example | Composition (nominal, expressed as oxides) | Precursor | Method |
|---|---|---|---|
| A-17 | CaO:MgO (50:50 by wt.) 5% $Al_2O_3$ | Ca-nitrate/$NH_4$-oxalate Mg-nitrate/$NH_4$-oxalate DISPAL 23N4-20 | SD |
| A-18 | CaO:MgO (50:50 by wt.) 5% $Al_2O_3$ | Example A-17 | PP at 500° C. for 3 hrs |
| A-19 | CaO:MgO (90:10 by wt.) | Ca-nitrate/$NH_4$-oxalate Mg-nitrate/$NH_4$-oxalate | SD |
| A-20 | CaO:MgO (90:10 by wt.) | Example A-19 | PP at 500° C. for 3 hrs |
| A-21 | CaO:MgO (90:10 by wt.) 5% $Al_2O_3$ | Ca-nitrate/$NH_4$-oxalate Mg-nitrate/$NH_4$-oxalate DISPAL 23N4-20 | SD |
| A-22 | CaO:MgO (90:10 by wt.) 5% $Al_2O_3$ | Example A-21 | PP at 500° C. for 3 hrs |
| A-23 | CaO:MgO (50:50 by at. %) | Ca-nitrate/Mg-nitrate glycine lactic acid | SP |
| A-24 | CaO:MgO (50:50 by at. %) | Ca-nitrate/Mg-nitrate urea ethanol | SP |
| A-25 | CaO:MgO (50:50 by at. %) | Ca-nitrate/Mg-nitrate glycine ethanol | SP |
| A-26 | CaO:MgO (50:50 by at. %) | Ca-nitrate/Mg-nitrate | SP |
| A-27 | CaO 43 wt. % $Al_2O_3$ | Ca-nitrate $NH_4$-oxalate $Al_2O_3$ | SD |
| A-28 | CaO 43 wt. % $Al_2O_3$ | Example A-27 | PP at 500° C. for 3 hrs |

The additives to the precursor compositions in Examples A-23, A-24 and A-25 (namely glycine, lactic acid, urea and ethanol) are porosity-enhancing agents for the purpose of introducing additional porosity into the absorbent materials. Table 4 lists the particle size distribution (PSD), BET surface area, average pore diameter and pore volume for select absorbent examples. For the examples in Table 4 and the following examples herein, the PSD is measured by laser light scattering, such as in a MICROTRAC instrument (Microtrac, Inc., Montgomeryville, Pa.). The BET surface area is measured by nitrogen adsorption and the average pore diameter is measured by BJH adsorption. The pore volume is measured by nitrogen adsorption and is the pore volume only for pores having a diameter of not greater than about 100 nanometers.

TABLE 4

| Example | PSD d10, d50, d90 (μm) | BET Surface Area (m²/g) | Average Pore Diameter (nm) | Pore Volume (cm³/g) |
|---|---|---|---|---|
| A-2 | 2.0, 5.0, 13.0 | 19.6 | 10.6 | 0.0517 |
| A-3 | 2.3, 5.7, 16.0 | 24.5 | 16.5 | 0.101 |
| A-4 | 1.7, 4.4, 11.7 | 17.7 | 13.1 | 0.058 |
| A-5 | 3.7, 10.3, 25.0 | 18.9 | 12.5 | 0.059 |
| A-6 | 1.3, 3.0, 6.0 | 24.2 | 13.9 | 0.084 |
| A-7 | 3.1, 6.7, 14.3 | 60.1 | 16.1 | 0.242 |
| A-8 | 5.5, 14.8, 26.8 | N/A | N/A | N/A |
| A-10 | N/A | 27.8 | 13.4 | 0.093 |

Figure 14:
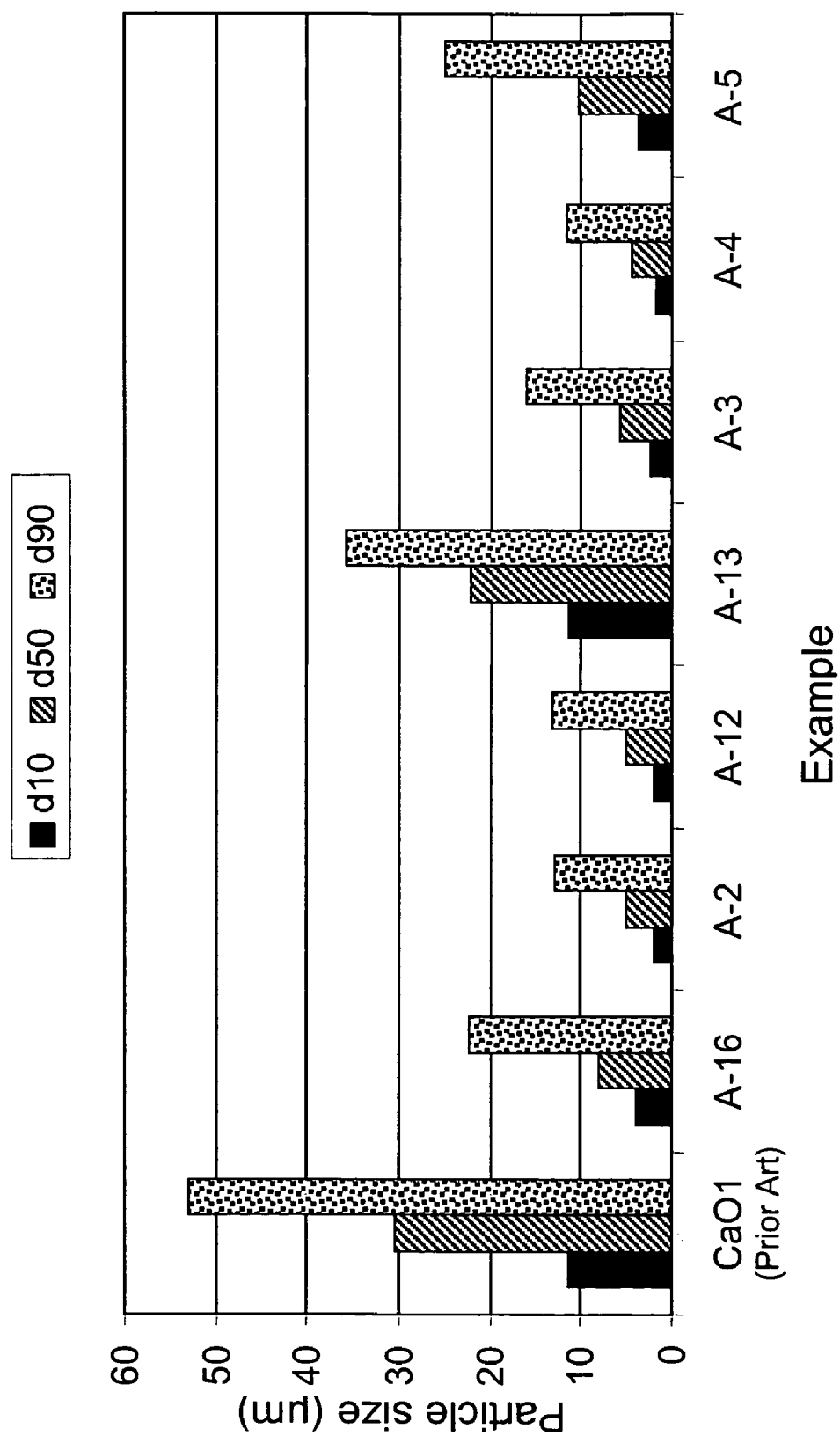
FIG. 14 illustrates the particle size distribution of absorbent powders according to the present invention compared to the prior art.

FIG. 14 compares the particle size distribution ($d_{10}$, $d_{50}$ and $d_{90}$) of commercial grade CaO, CaO prepared by spray pyrolysis and CaO/$Al_2O_3$ powders prepared by spray conversion of oxalate precursors in a spray dryer and post-processing of the intermediate compound. While the $d_{50}$ of the commercial CaO powder is approximately 30 μm, the $d_{50}$ of CaO powder made by spray pyrolysis (Example A-16) is less than 10 μm and for the Ca-oxalate intermediate compound (Example A-2) is less than 5 μm. Post-processing of Ca-oxalate at 750° C. to convert it to CaO (Example A-13) increases the $d_{50}$ from 5 μm to about 20 μm, while the addition of $Al_2O_3$ as an additive and post-processing at 750° C. (Example A-5) reduces the sintering and $d_{50}$ increases to only about 10 μm. The addition of other inert additives such as MgO has a similar effect and prevents an increase of the absorbent particle size distribution after repetitive cycles.

Figure 15:
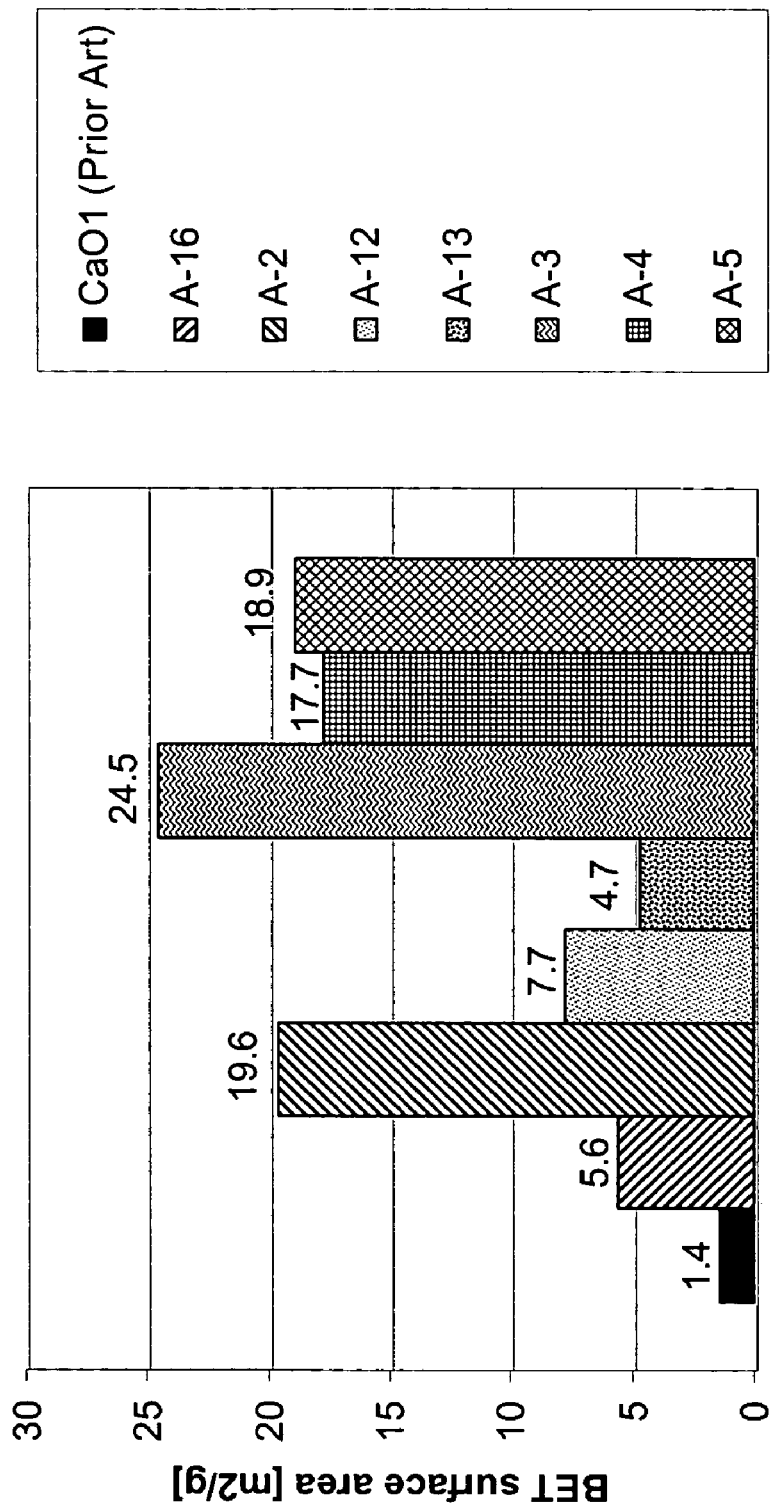
FIG. 15 illustrates the BET surface area of absorbent powders according to the present invention compared to the prior art.

FIG. 15 compares the BET surface area of the examples illustrated in FIG. 14. While the BET surface area of the commercial CaO powder is less than 2 $m^2$/g, the surface area of the absorbent materials prepared by spray processing according to the present invention is significantly higher.

Figure 16:
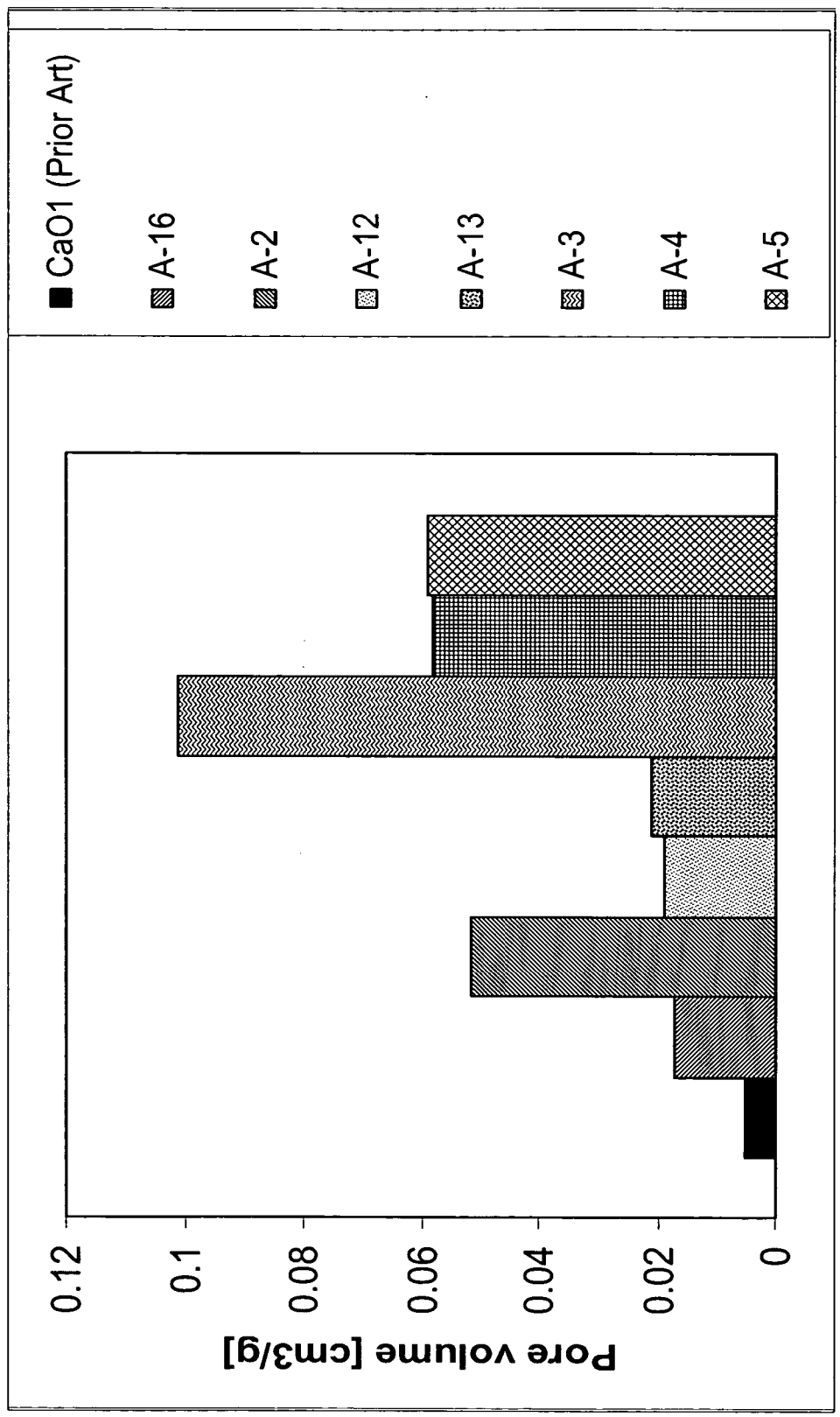
FIG. 16 illustrates the pore volume of absorbent powders according to the present invention compared to the prior art.

FIG. 16 compares the measured pore volume (pores <100 nanometers) of the examples illustrated in FIGS. 14 and 15. The pore volume is less than 0.01 $cm^3$/g for the conventional CaO powder and at least two times higher for the absorbent powders prepared by spray processing methods. The addition of inert additive such as alumina (Example A-3) leads to an even higher increase of the pore volume (e.g., up to 0.06 $cm^3$/g).

Cycling of Absorbents

Figure 17:
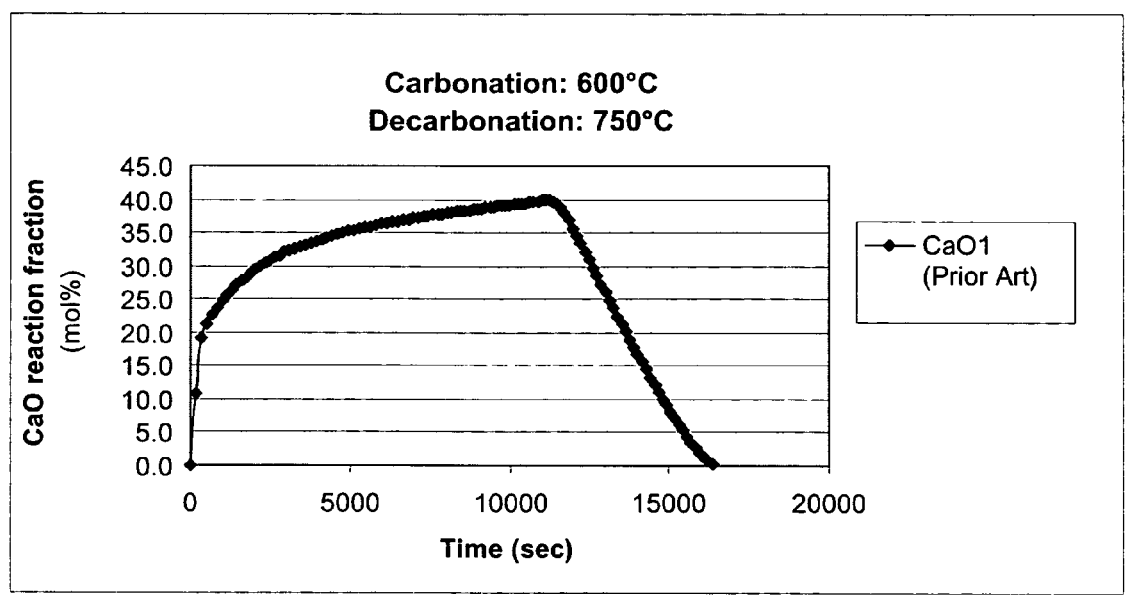
FIG. 17 illustrates the carbonation and decarbonation kinetics of a commercial CaO powder according to the prior art.

FIG. 17 illustrates the carbonation and decarbonation kinetics of $CO_2$ by commercially available CaO (J. T. Baker) measured by thermogravimetric analysis (TGA). FIG. 17 illustrates that the carbonation of CaO is divided into two distinct regions, the fast region and the slow region. The fast region (less than 800 seconds) corresponds to the easy access to CaO active sites present on the external surface and the slow region (1000 to 10,000 seconds) corresponds to the penetration of $CO_2$ through the carbonate layer into unreacted CaO near the particle core. The portion of CaO reactivity and kinetics in these two regions depend on the material properties and operating conditions. Decarbonation takes place (>10,000 seconds) when the bed temperature is raised up to 750° C. or higher. FIG. 17 illustrates that the overall absorption capacity, expressed as a CaO reaction fraction is around 40 mol. % at a time of 10000 seconds. As used herein, the CaO reaction fraction is the ratio of CaO converted to $CaCO_3$ relative to the amount of available absorbent compound (e.g., CaO) in the absorbent material, usually expressed as a mol. %.

Based on this interpretation, for the standard sample measurements illustrated in FIG. 17, about 50% of the total absorption capacity is consumed by the available surface area of the absorbent, and the remaining 50% of the capacity requires a long reaction time. It is therefore advantageous to increase the absorbent available surface area to enable faster absorption. This is illustrated in more detail below.

Figure 18:
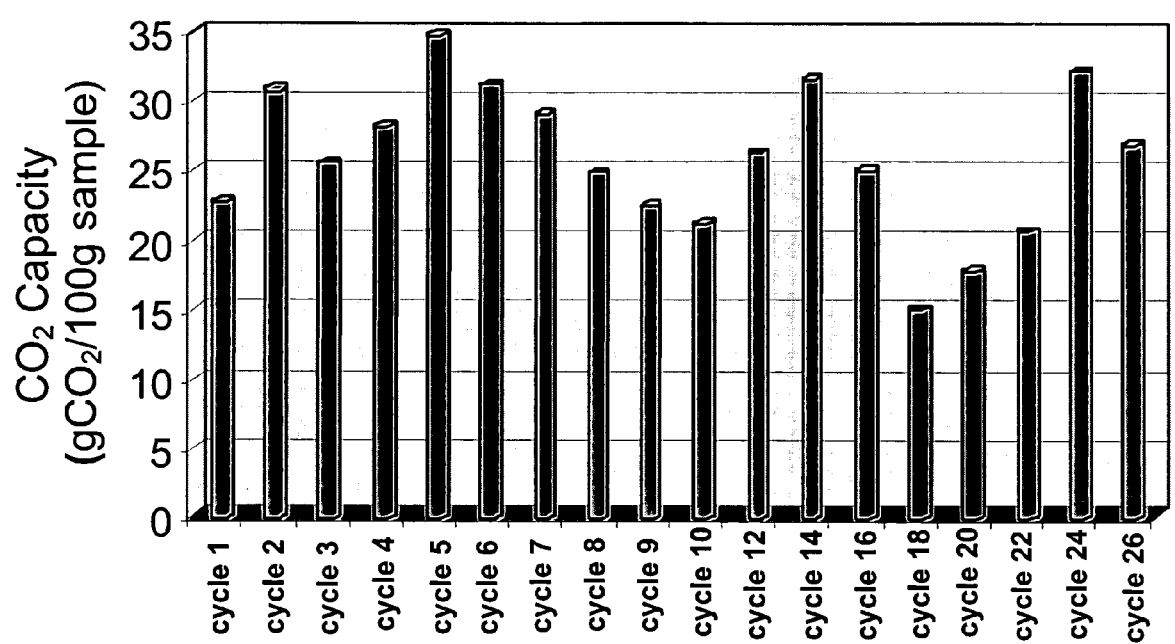
FIG. 18 illustrates the absorption capacity of a commercial CaO absorbent powder over 26 cycles.

FIG. 18 illustrates the absorption performance of the commercial CaO sample over 26 cycles with the carbonation at 600° C. and decarbonation at 750° C. For these examples a cycle of absorbent-containing material includes heating the sample disposed in a crucible in a thermo-gravimetric analysis (TGA) unit to 750° C. or 800° C. at a rate of 10-20° C./min in the presence of $N_2$ until the TGA baseline is stable. The crucibles are then cooled down to the carbonation temperature (600° C.), and pure $CO_2$ is introduced into the chamber. Once the stable baseline is reached, decarbonation starts by switching the gas to $N_2$ and raising the temperature to 750° C. or 800° C. The weight loss of the absorbent is then recorded as a function of time until a stable weight is reached and the sample is then cooled down to room temperature. All carbonation takes place at 600° C., and the sample pre-treatment and decarbonation temperature are kept the same.

Referring to FIG. 18, the initial absorption capacity of the commercial CaO is about 22 g $CO_2$/100 g of sample and the peak absorption capacity is about 35 g $CO_2$/100 g of sample. It is noteworthy that the absorption capacity fluctuates from about 15 g to 35 g $CO_2$/100 g of sample. Such fluctuations in absorption capacity are undesirable for commercial operations since the device must then be designed to accommodate the lowest capacity (e.g., to accommodate 15 g $CO_2$/ 100 g of sample).

Figure 19:
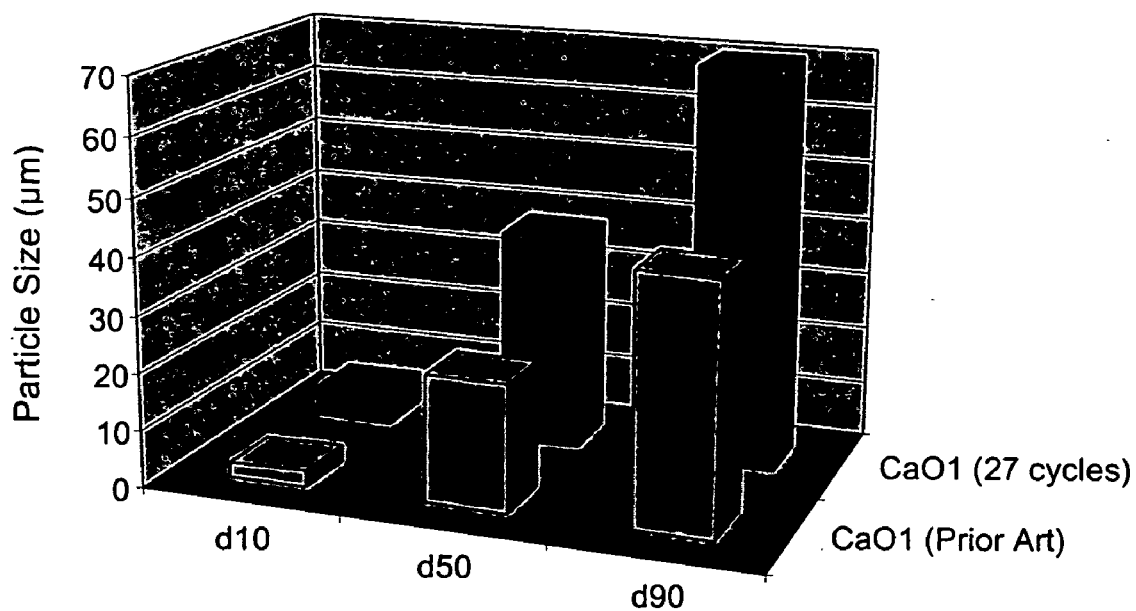
FIG. 19 illustrates the particle size distribution of a commercial CaO absorbent powder before and after 27 cycles.
Figure 20:
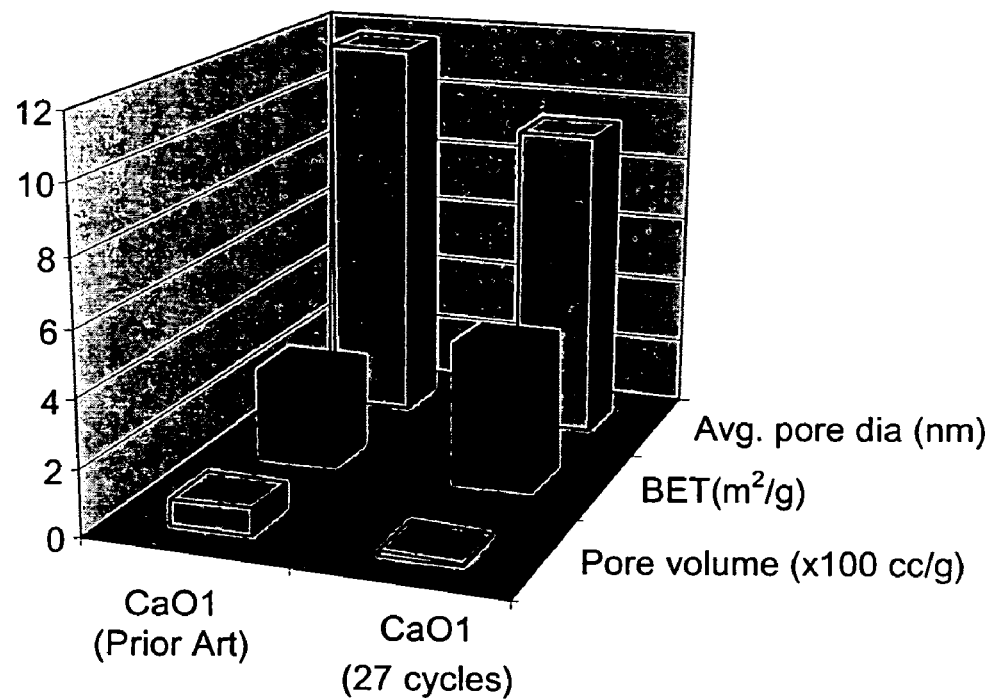
FIG. 20 illustrates the pore volume, BET surface area and average pore size of a commercial CaO absorbent powder before and after 27 cycles.

FIGS. 19 and 20 illustrate the change in particle size distribution ($d_{10}$, $d_{50}$ and $d_{90}$), pore volume (pores <100 nanometers), BET surface area and pore diameter for the commercial CaO powder after 27 cycles. It is evident that sintering of the powder has occurred, resulting in a significant increase in average particle size (FIG. 19). The pore volume and average pore diameter decreased slightly and the BET surface area increased slightly (FIG. 20).

Table 5 summarizes the change in BET surface area, pore volume and pore diameter after cycling select absorbent materials according to the present invention 12 times.

TABLE 5

| | As-Made | | | After 12 Cycles | | |
|---|---|---|---|---|---|---|
| Example | BET ($m^2$/g) | Pore Volume ($cm^3$/g) | Average Pore Diameter (nm) | BET ($m^2$/g) | Pore Volume ($cm^3$/g) | Average Pore Diameter (nm) |
| A-7 | 60.1 | 0.242 | 16.1 | 12.37 | 0.0612 | 19.5 |
| A-18 | 61.7 | 0.235 | 15.2 | 7.97 | 0.044 | 22.2 |
| A-22 | 17.5 | 0.055 | 14 | 6.07 | 0.019 | 12.7 |
| A-20 | 15.7 | 0.066 | 15.1 | 2.7 | 0.012 | 17.5 |
| A-4 | 17.7 | 0.019 | 9.7 | 5.48 | 0.012 | 8.9 |
| A-12 | 7.7 | 0.058 | 13.1 | 0.66 | 0.001 | 8.5 |
| A-16 | 5.6 | 0.057 | 13.2 | 1.65 | 0.033 | 8.11 |

Figure 21:
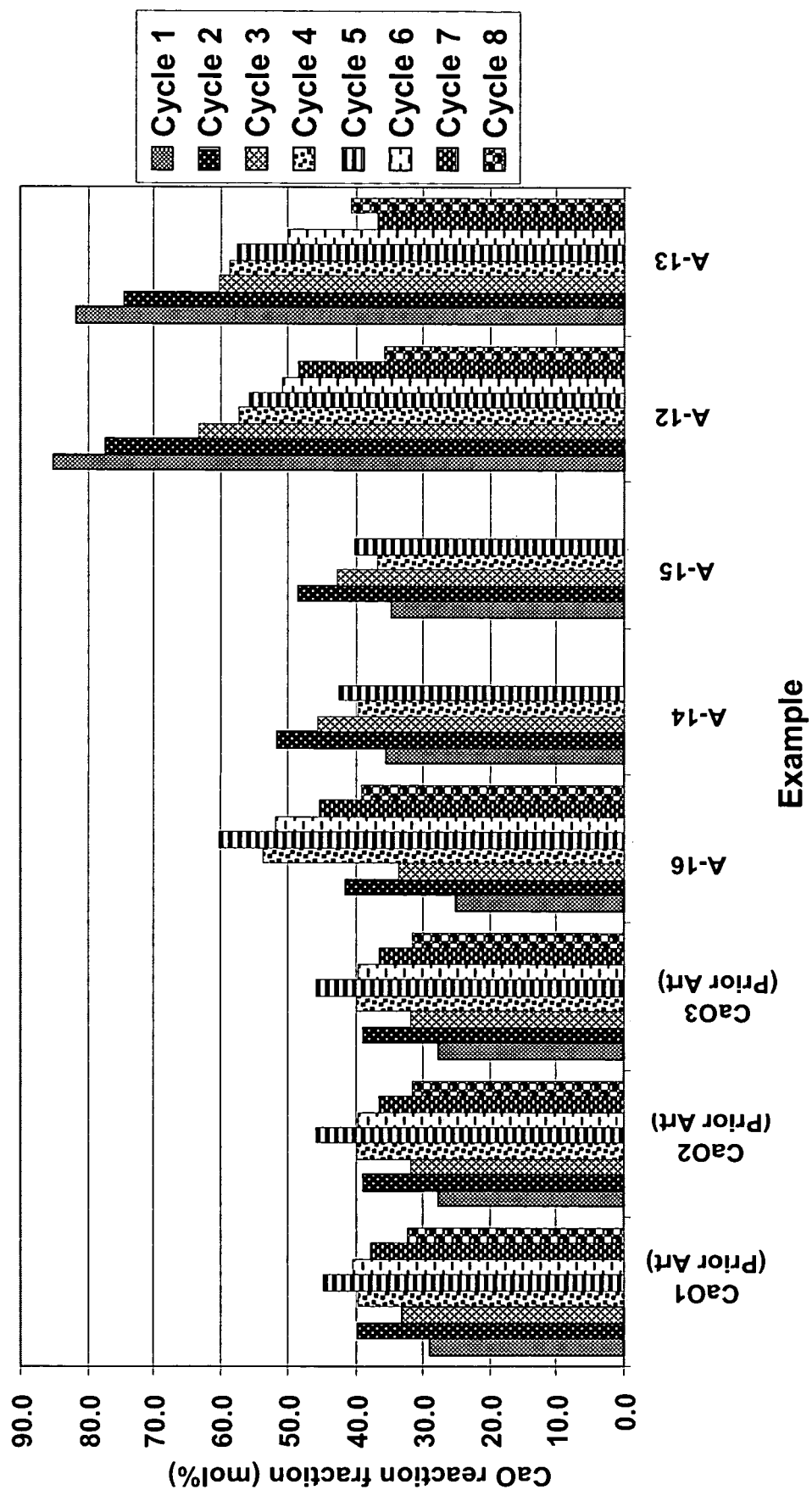
FIG. 21 illustrates the absorption capacity in terms of CaO reaction fraction of CaO-based absorbents over multiple cycles according to the present invention compared to the prior art.

FIG. 21 illustrates the absorption capacity in terms of CaO reaction fraction through multiple cycles for commercial CaO (3 samples) and CaO obtained from different spray processing methods, namely spray pyrolysis (Examples A-14 and A-15), and conversion in a spray dryer with post-processing (Examples A-12 and A-13).

Referring to FIG. 21, the capacity of some CaO absorbents made by spray pyrolysis is only slightly higher compared to the commercial CaO absorbents (30 mol. % vs. 25 mol. % CaO reaction fraction in the first cycle). It can also be seen that CaO samples from oxalate precursors (Example A-12, by XRD $CaCO_3$ and Example A-13, by XRD a mix of $CaCO_3$ an CaO, made by spray drying followed by post-processing at 500° C. and 750° C., respectively) have a high initial absorption capacity—up to 80 mol. % CaO reaction fraction, nearly three times higher than commercial CaO. These results clearly demonstrate the advantages of spray processing in the development of CaO-based absorbents. However, the absorption capacity decreases very rapidly after a limited number of cycles (from 85 mol. % to 32 mol. %) due to the loss of microstructure and porosity, as mentioned above. Therefore, further addition of materials into CaO is necessary to prevent the materials from sintering during temperature swing operation and to maintain the cyclability.

Figure 22:
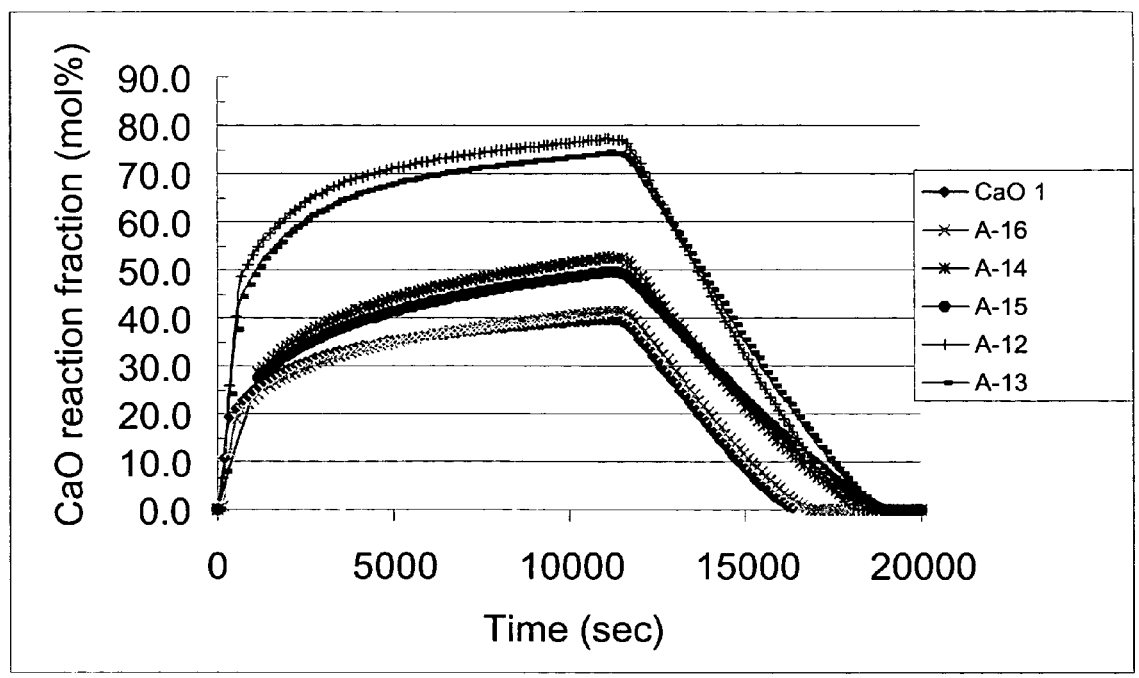
FIG. 22 illustrates the carbonation and decarbonation kinetics of CaO-based absorbents according to the present invention compared to the prior art.

FIG. 22 illustrates a comparison between the initial carbonation and decarbonation profiles of CaO absorbent materials from different sources including a commercial samples. The CaO fabricated from calcium nitrate and ammonium oxalate precursors and post processed at 500° C. (A-12) or at 750° C. (A-13) has faster kinetics and higher reactivity in the fast region and improved kinetics upon decarbonation.

Figure 23:
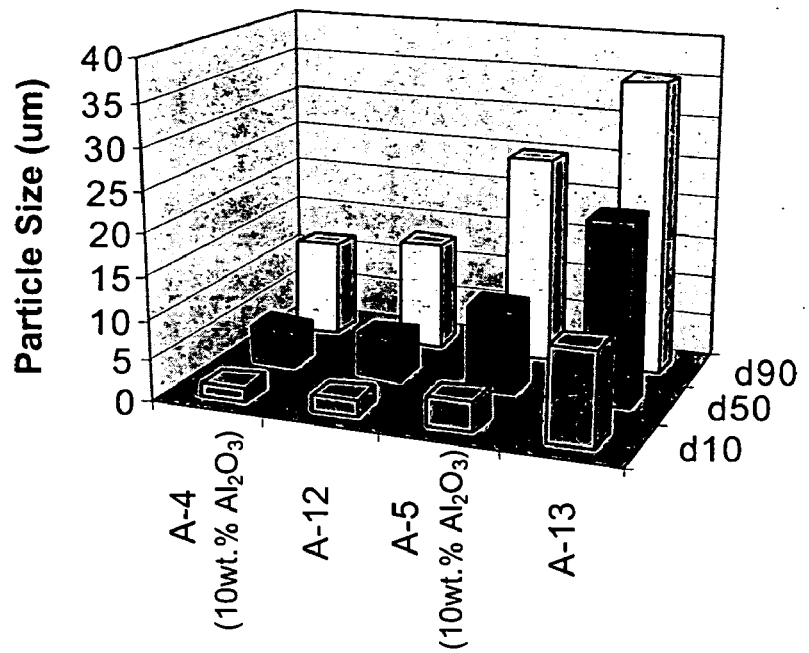
FIG. 23 illustrates the particle size distribution of absorbent powders according to the present invention.
Figure 24:
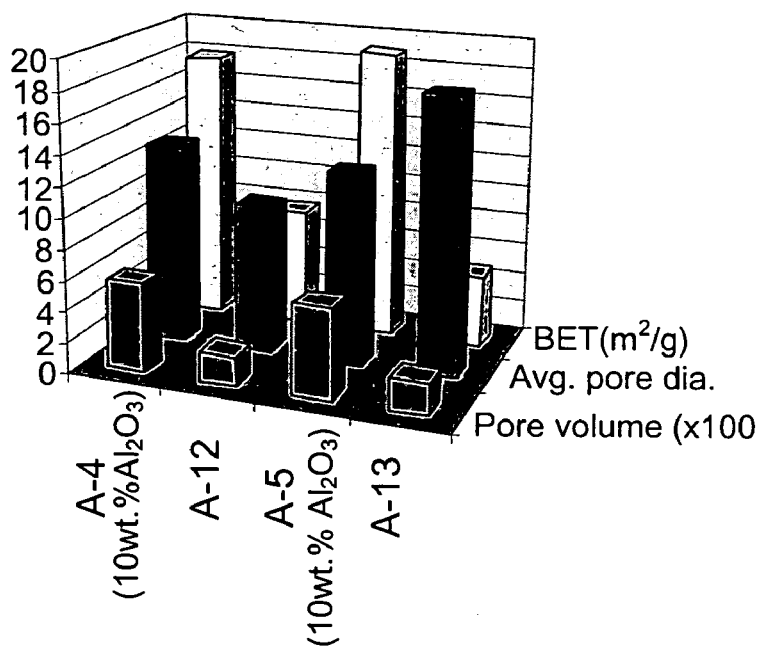
FIG. 24 illustrates the pore volume, BET surface area and average pore diameter for absorbent powders according to the present invention.

FIGS. 23 and 24 illustrate the particle size distribution (FIG. 23) and the pore volume, average pore diameter (pores <100 nanometers) and BET surface area (FIG. 24) for Examples A-4, A-12, A-5 and A-13. It is evident that the addition of 10% $Al_2O_3$ reduces the initial particle size of the absorbent materials (Example A-4 compared to Example A-12 and Example A-5 compared to Example A-13) and increases the average pore volume and surface area of the powders.

Figure 25:
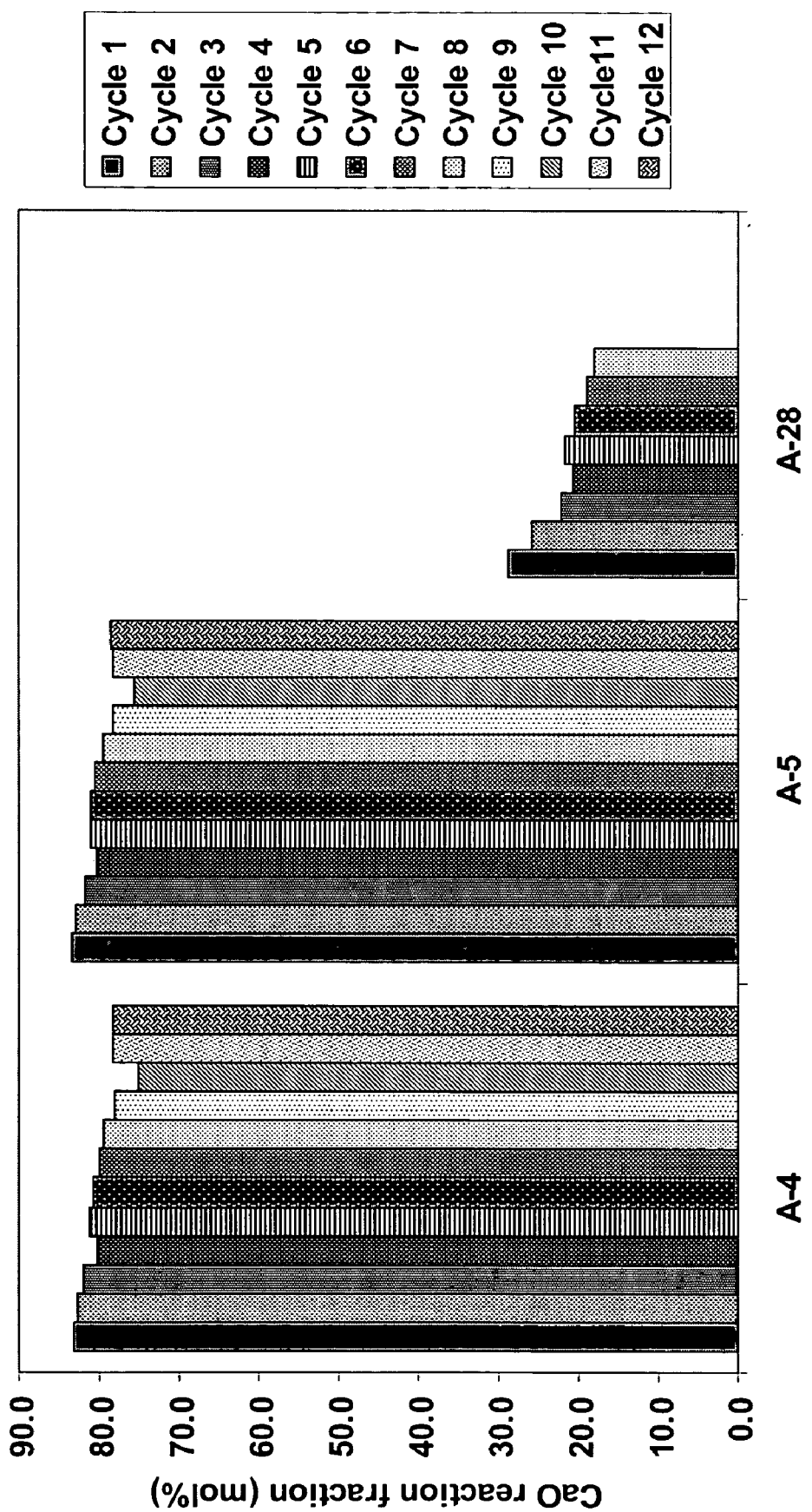
FIG. 25 illustrates the absorption capacity in terms of CaO reaction fraction of absorbent powders according to the present invention over multiple cycles.

FIG. 25 illustrates the CaO absorption capacity in terms of CaO reaction fraction as a function of the number of cycles for 3 different examples. The addition of 10 wt. % $Al_2O_3$ to CaO in Examples A-4 and A-5 can significantly improve the absorbent stability while maintaining the original high $CO_2$ absorption, retaining an absorption capacity above 70 mol. % for each cycle up to 12 cycles. One reason for good cyclability of 10 wt. % $Al_2O_3$/CaO samples is the particle size stability after the multiple cycles, as demonstrated in Table 6.

TABLE 6

| Example | Composition | Particle Size (μm) $d_{10}, d_{50}, d_{90}$ | |
|---|---|---|---|
| | | Before Cycling | After Cycling |
| A-12 | 100% CaO | 2.0, 5.1, 13.2 | 5.6, 14.5, 26.2 |
| A-4 | 90% CaO 10% $Al_2O_3$ | 1.7, 4.4, 11.7 | 1.0, 2.7, 11.4 |
| A-28 | 57% CaO 43% $Al_2O_3$ | 1.2, 5.9, 17.1 | 3.2, 7.5, 22.4 |

It is noteworthy that the PSD for Example A-4 actually decreases after cycling.

Figure 26:
FIGS. 26(a) and 26(b) illustrate SEM photomicrographs of a commercial CaO powder before and after 27 cycles.
Figure 26:
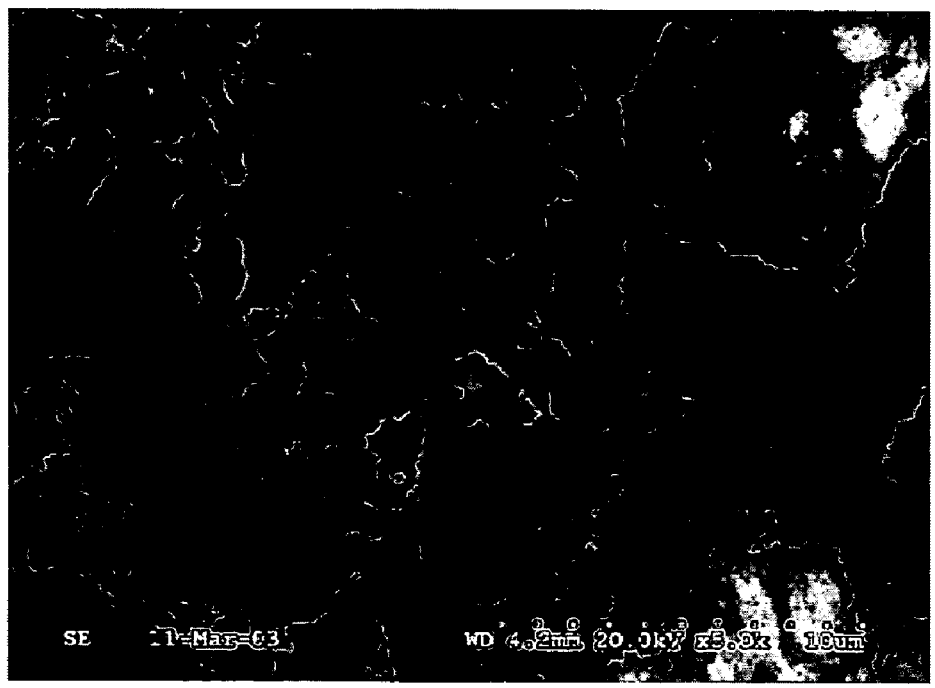
Figure 27:
FIGS. 27(a) and 27(b) illustrate SEM photomicrographs of an absorbent powder according to the present invention before and after 12 cycles.
Figure 27:
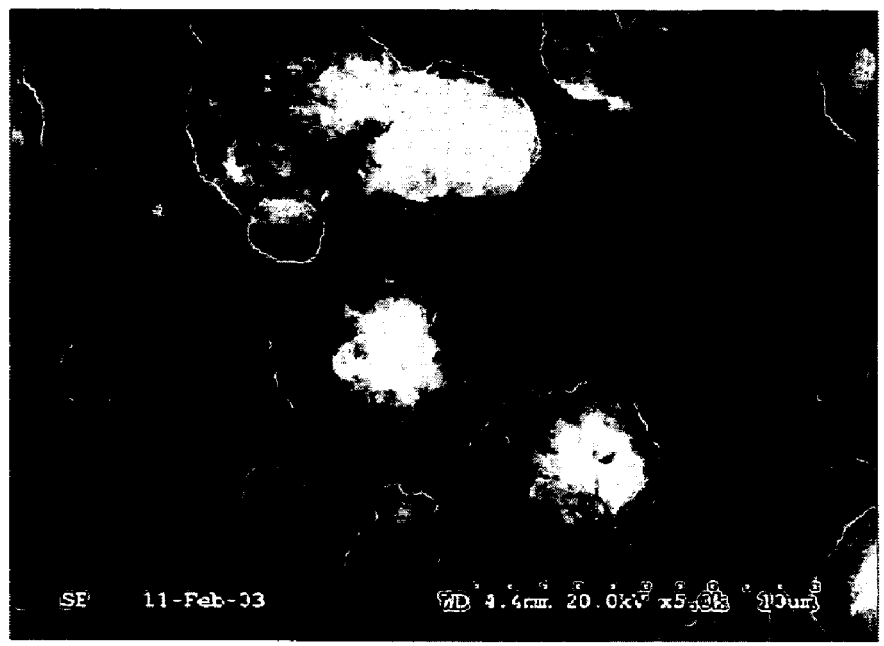
Figure 28:
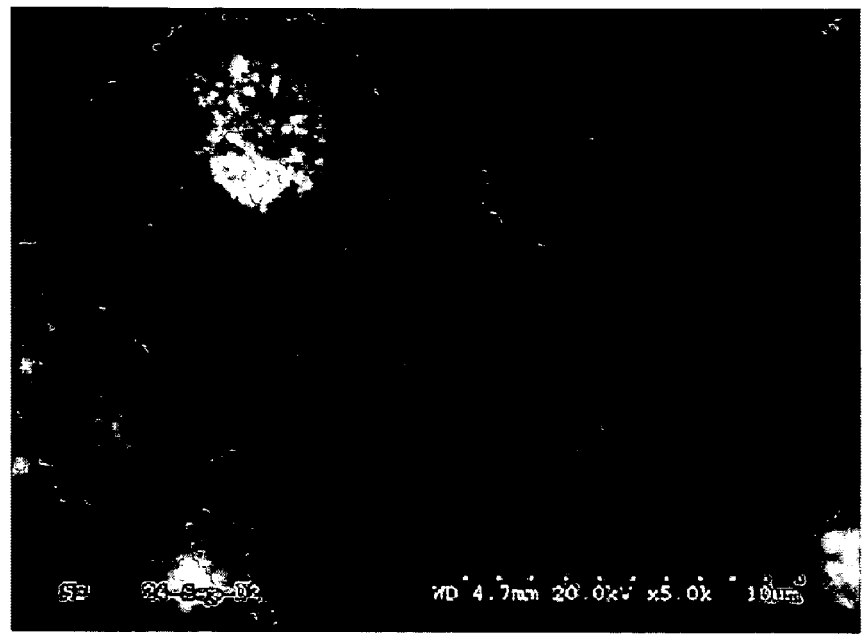
FIGS. 28(a) and 28(b) illustrate SEM photomicrographs of an absorbent powder according to the present invention before and after 12 cycles.
Figure 28:
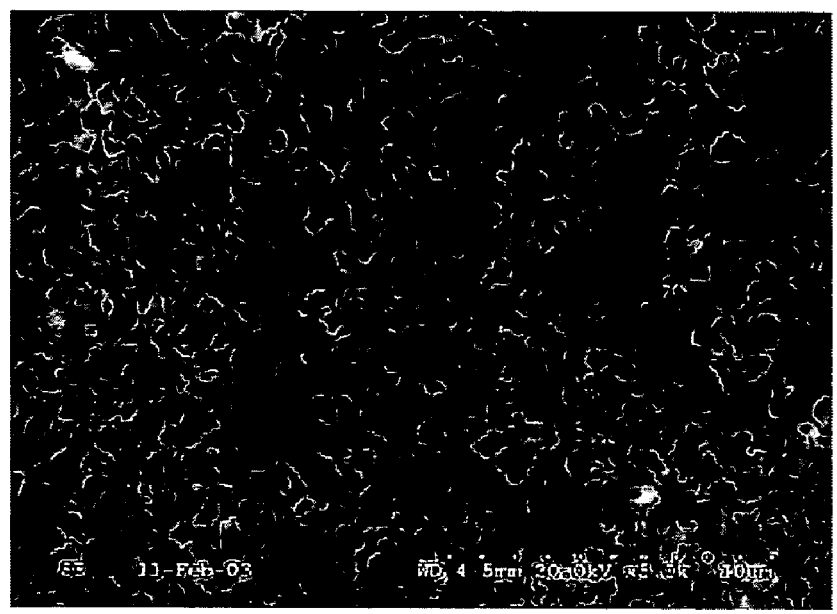

FIGS. 26(*a*) and (*b*) illustrate the SEM photomicrographs of a commercially available CaO powder before and after 27 cycles. FIGS. 27(*a*) and (*b*) illustrate SEM photomicrographs of Example A-12 before and after 12 cycles. FIGS. 28(*a*) and (*b*) illustrate SEM photomicrographs of Example A-4 before and after 12 cycles.

Figure 29:
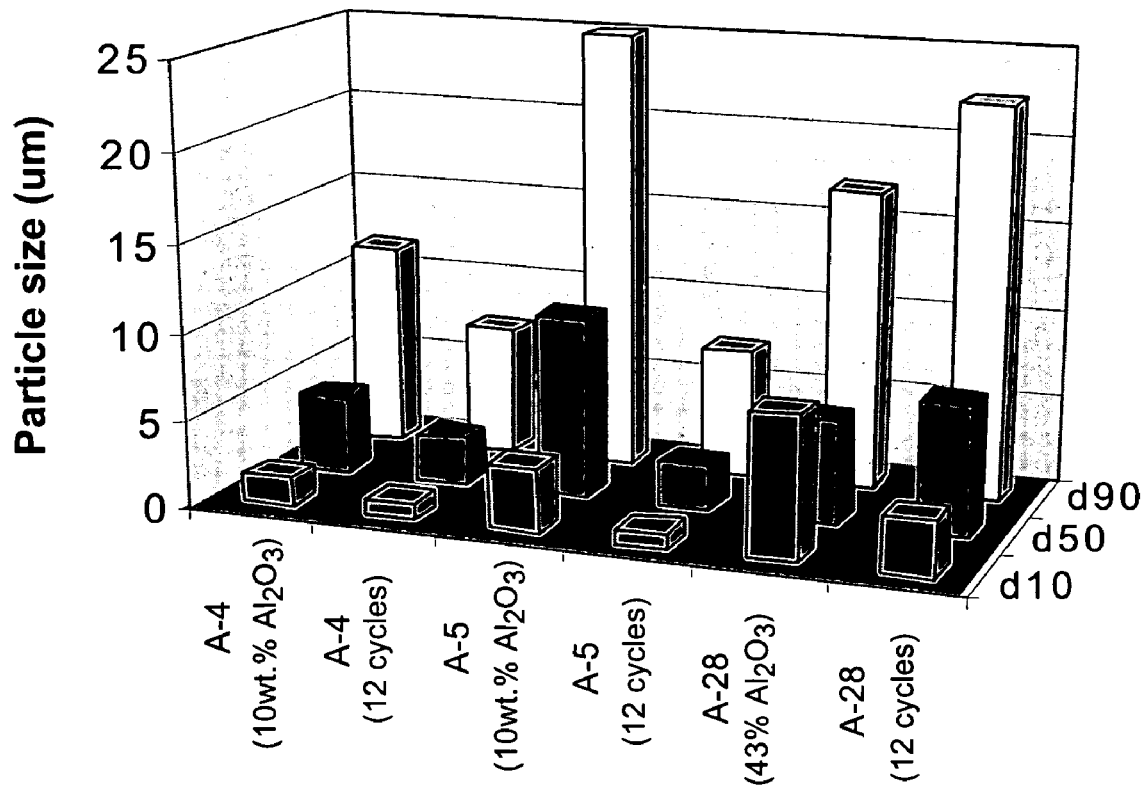
FIG. 29 illustrates the particle size distribution of absorbent powders according to the present invention before and after 12 cycles.

FIG. 29 illustrates the change in particle size distribution for $Al_2O_3$/CaO examples according to the present invention before and after 12 cycles. It is evident that the examples having good recyclability (Examples A-4 and A-5) also exhibit an overall decrease in particle size. Example A-28 (43% $Al_2O_3$) shows an increase in the $d_{50}$ and $d_{90}$ size ranges.

Figure 30:
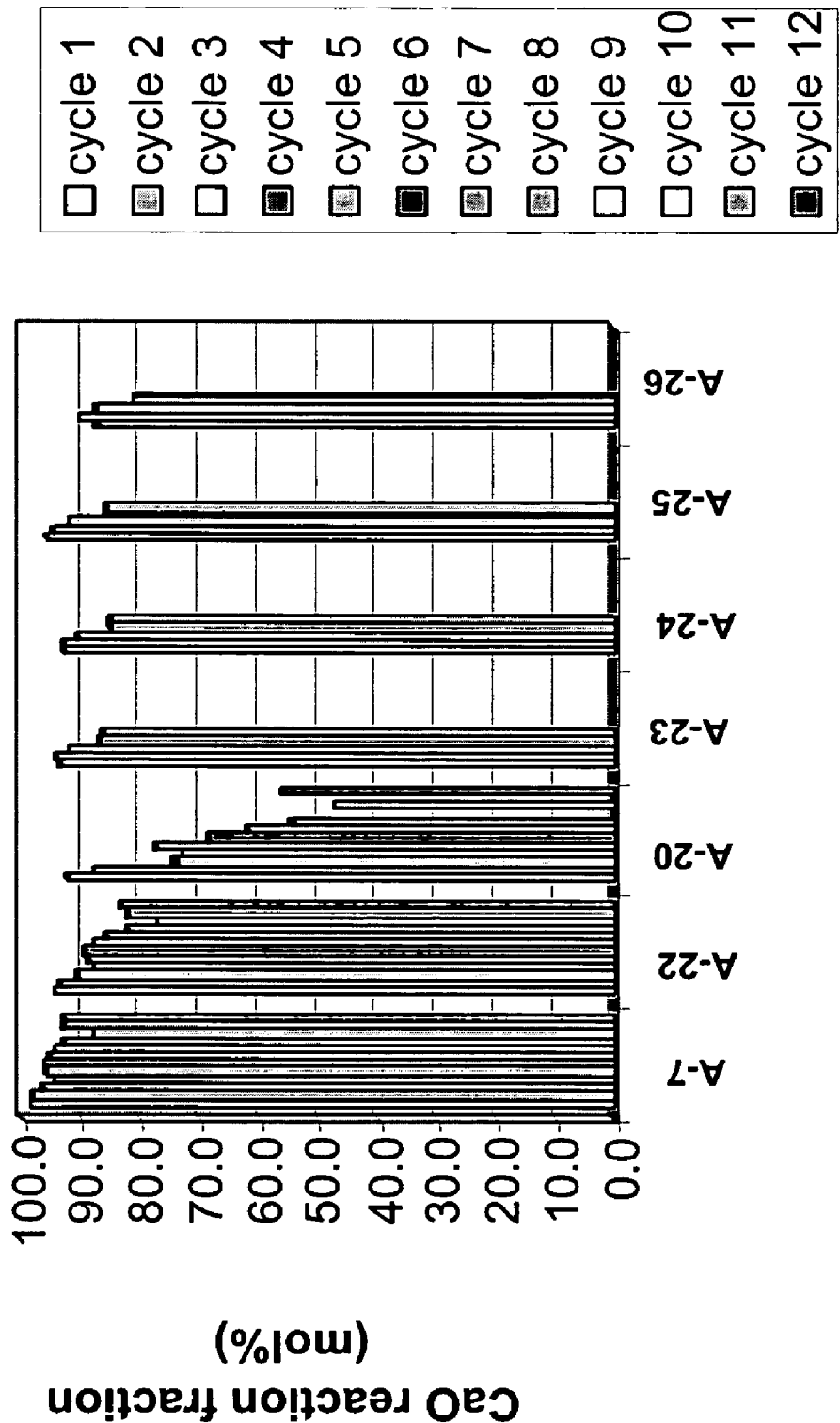
FIG. 30 illustrates the absorption capacity in terms of CaO reaction fraction of absorbent powders according to the present invention over 12 cycles.
Figure 31:
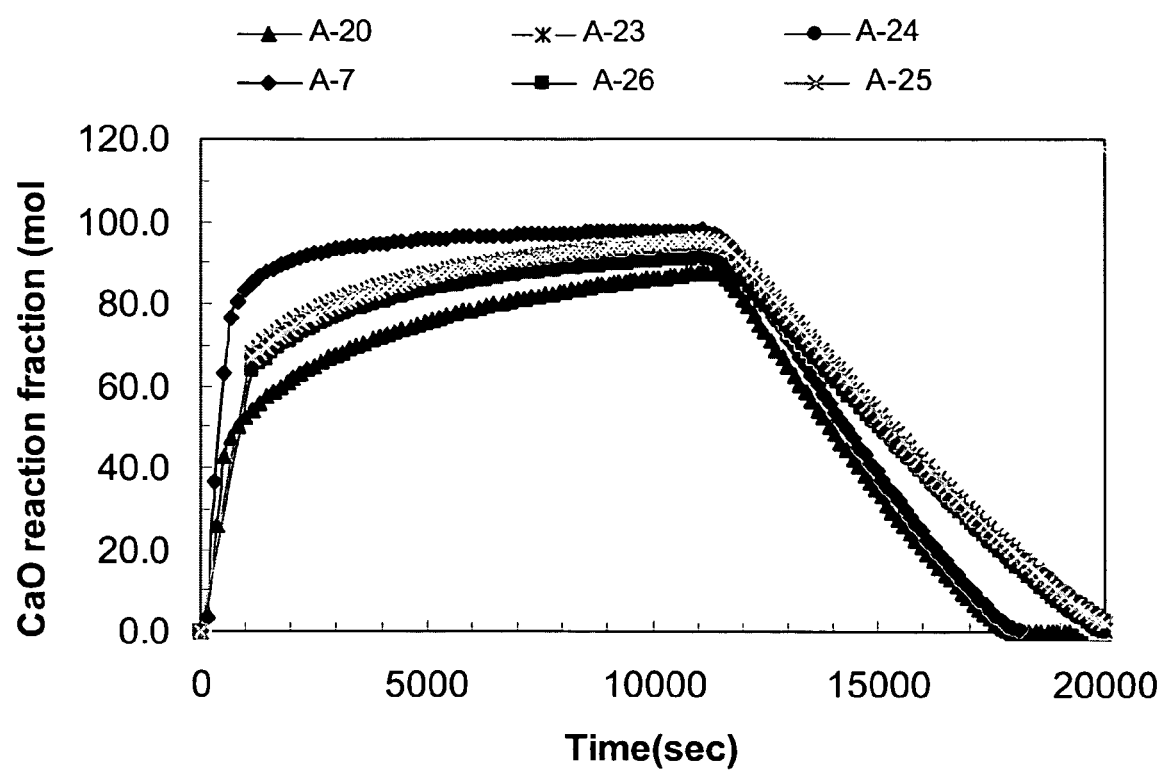
FIG. 31 illustrates the carbonation and decarbonation kinetics of several absorbent powders according to the present invention.

MgO can also be added to the absorbent materials in accordance with the present invention. FIG. 30 illustrates the performance achieved by adding MgO into CaO at different ratios of CaO:MgO and also by adding $Al_2O_3$. It can be seen that CaO:MgO with different ratios (from 90:10 to 50:50) made by spray drying followed by post processing at 500° C. have a similar initial absorption capacity in terms of CaO reaction fraction. However, the stability is quite different—only a CaO:MgO ratio of 50:50 stabilizes the recyclability. Example A-7 with a CaO:MgO ratio of 50:50 retains a capacity of over 90% even after 12 cycles, while the capacity of Example A-20 with a CaO:MgO ratio of 90:10 decreases to less than 60% after 12 cycles. The initial differences of carbonation/decarbonation kinetics among samples with the same composition depend on the specific conditions used for spray processing, as is illustrated in FIG. 31. However, both Example A-26 made by spray pyrolysis and Example A-7 made by spray drying followed by post-processing at 500° C. have similar carbonation/decarbonation rates. This observation supports the conclusion that absorbents with good absorption kinetics and recyclability can be derived by various spray processing methods, as described in detail above; as long as the right combination of composition and processing conditions have been utilized.

Figure 32:
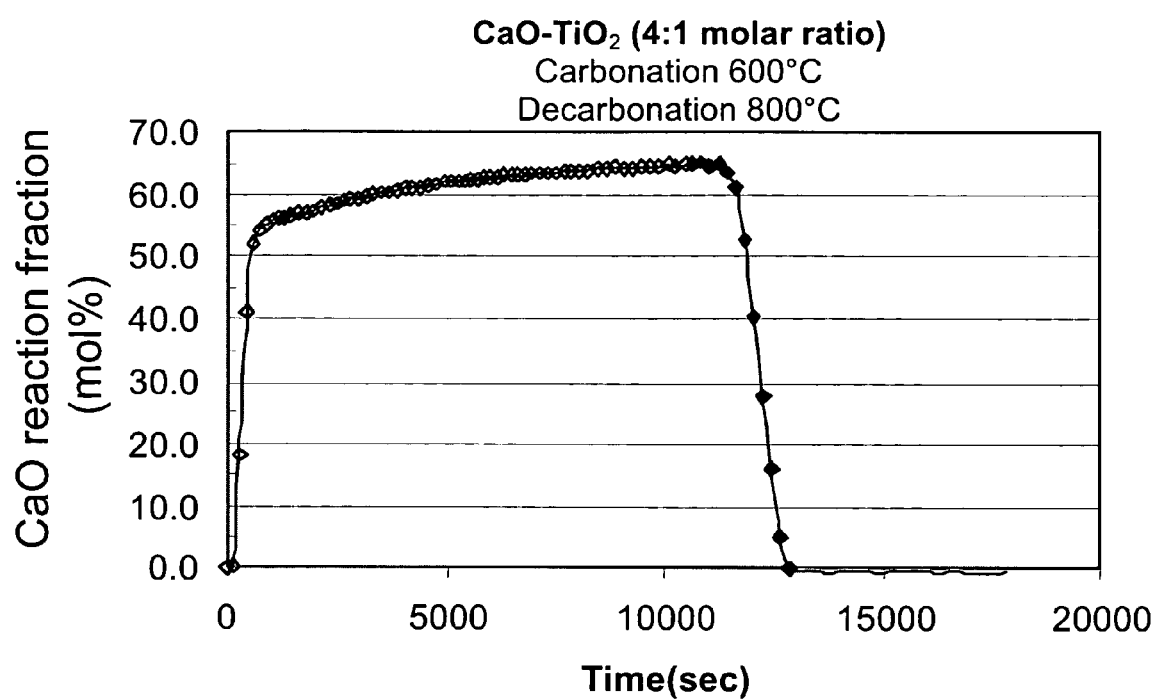
FIG. 32 illustrates the carbonation and decarbonation kinetics of a composite absorbent powder according to the present invention.

As shown above, absorbents with various compositions deliver high reactivity for $CO_2$ absorption in terms of mol. % fraction of CaO. The composition of the inert additives is not limited to $Al_2O_3$ and MgO—other oxides such as $TiO_2$ or a combination thereof can be added to the absorbent formulation to produce an absorbent with faster kinetics, as is illustrated in FIG. 32. The Example illustrated in FIG. 32 is a composite of CaO and $TiO_2$ (CaO:$TiO_2$=4:1) fabricated by spray drying and post-processing at 500° C. for 3 hours.

Figure 33:
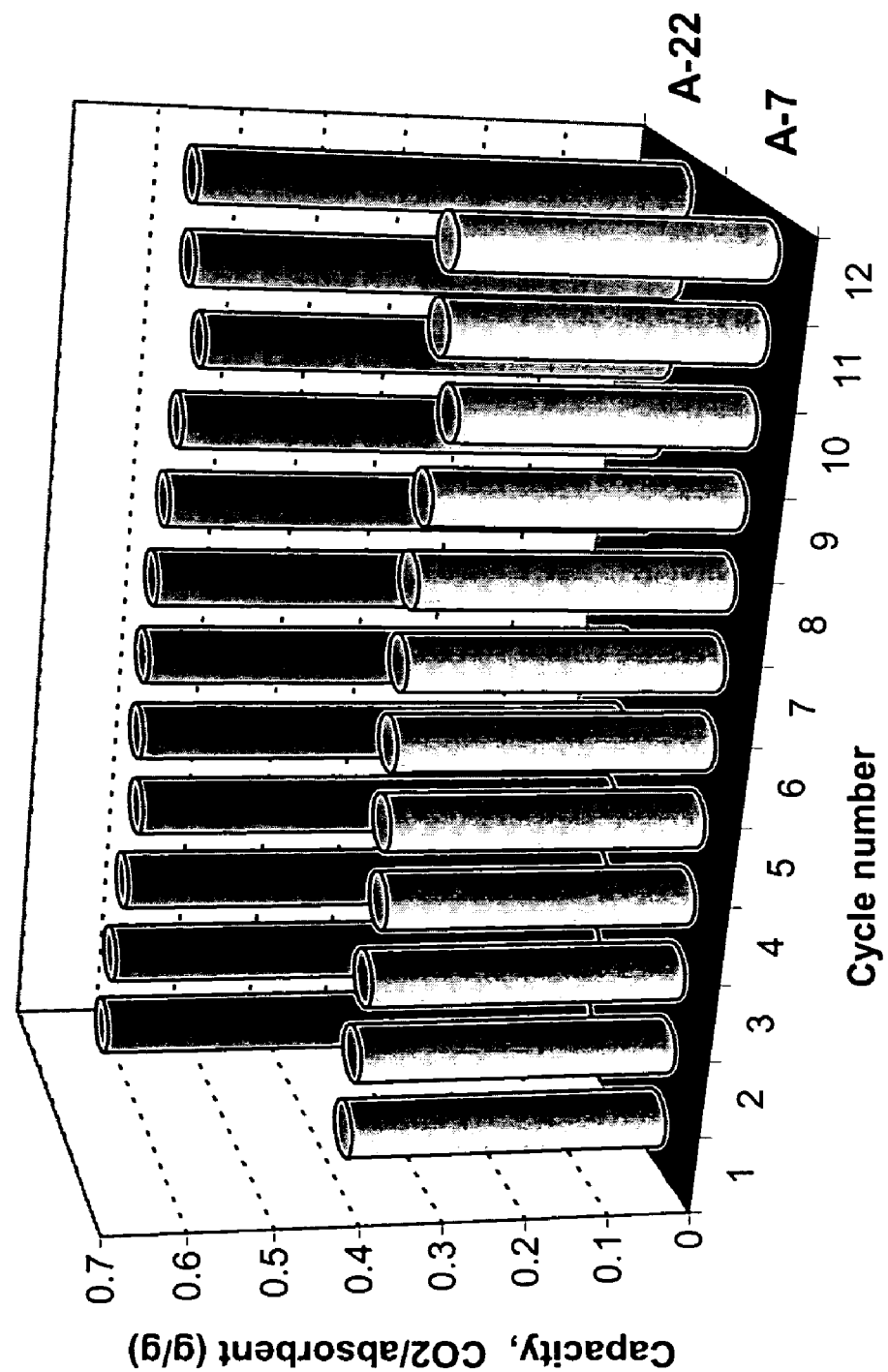
FIG. 33 illustrates the adsorption capacity over 12 cycles for 2 absorbent materials according to the present invention.

From a practical point of view, the total absorption capacity in terms of $CO_2$ weight or weight percentage based on the total weight of the absorbent is more important. By comparing the effects of inert additives such as $Al_2O_3$ and MgO, both showing high initial capacity and stable recyclability at the proper composition and spray processing conditions, significantly improved results are achieved with respect to the total $CO_2$ capacity per gram absorbent by using only a small portion of 10 wt. % $Al_2O_3$ into CaO, as compared to CaO:MgO with 50 wt. % MgO. For example, FIG. 33 illustrates the absorption capacity for Examples A-22 and A-7 expressed as the total $CO_2$ capacity based on the mass of total absorbent. Each example has a relatively constant absorption capacity through 12 cycles and each is close to the theoretical value (66.78 g $CO_2$/100 g absorbent for A-22 and 39.28 g $CO_2$/100 g absorbent for A-7).

Figure 34:
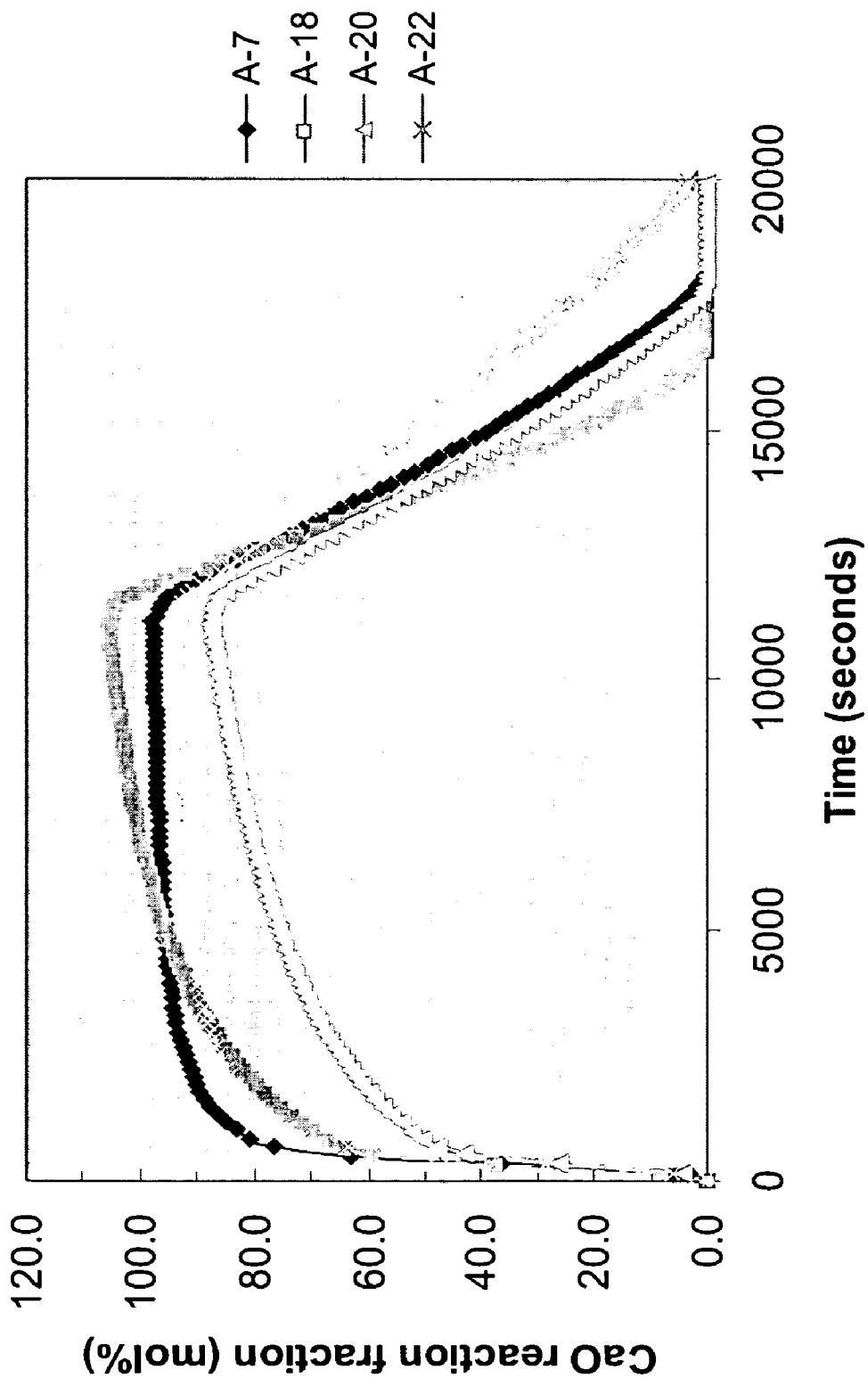
FIG. 34 illustrates the carbonation and decarbonation kinetics of several absorbent powders according to the present invention.

FIG. 34 illustrates the carbonation and decarbonation kinetics for four examples according to the present invention. It can be seen that the larger percentage of MgO in the CaO sample, the faster kinetics in the first carbonation region. Also the addition of $Al_2O_3$ can improve the kinetics in first carbonation region, as seen by comparing Examples A-20 and A-22. The most rapid decarbonation kinetics occur with Example A-18.

Figure 35:
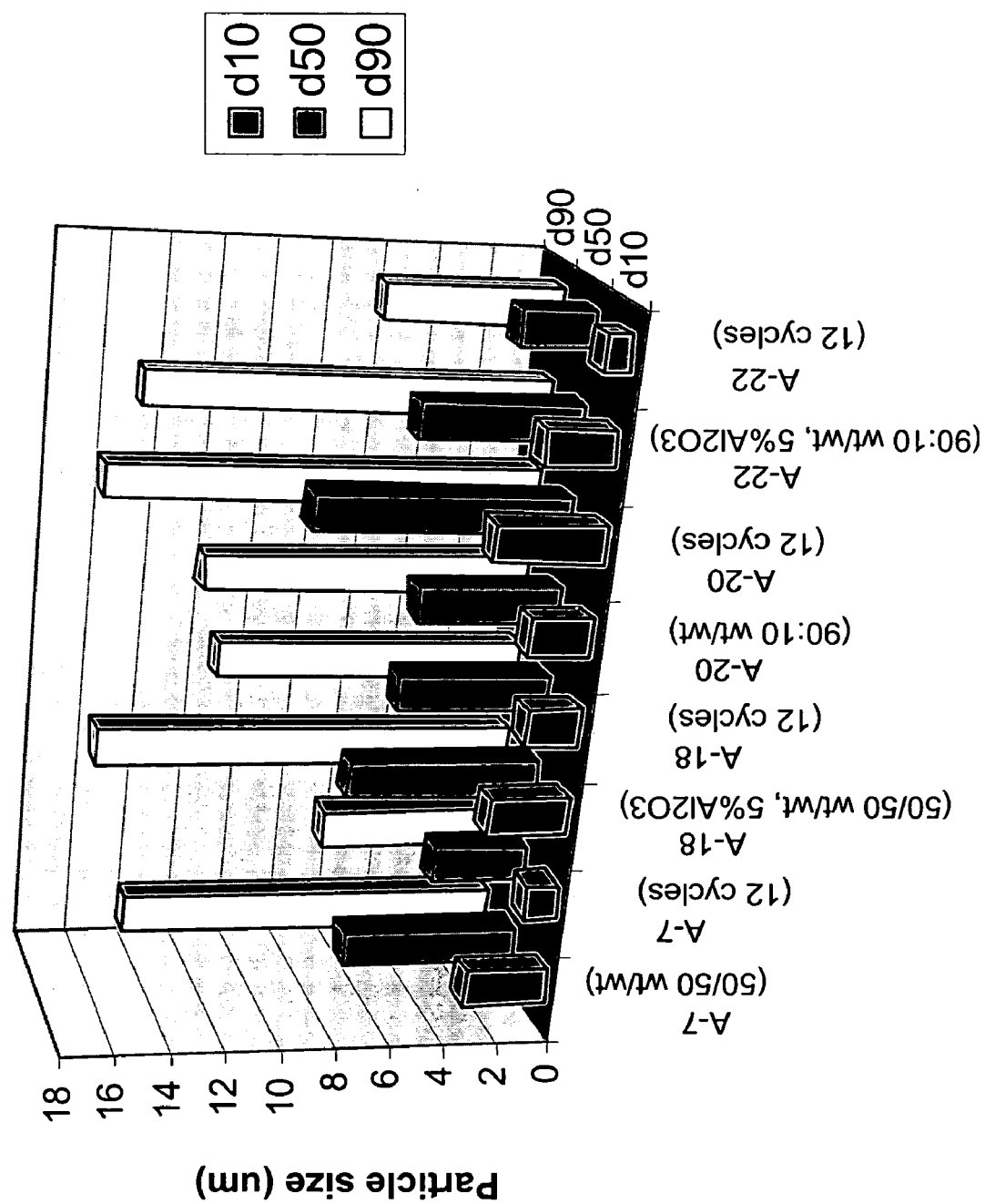
FIG. 35 illustrates the particle size distribution of absorbent powders according to the present invention before and after 12 cycles.
Figure 36:
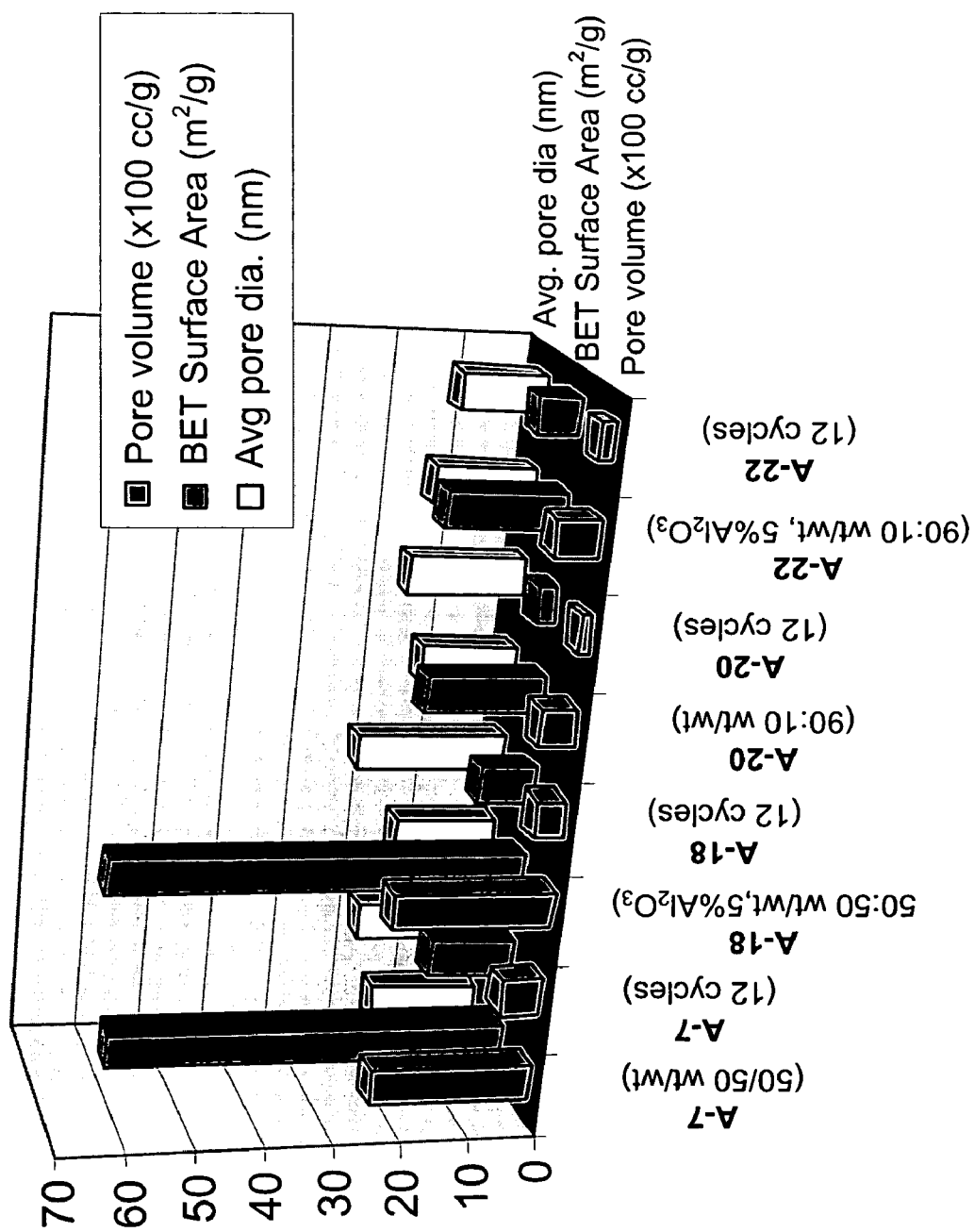
FIG. 36 illustrates the pore volume, BET surface area and average pore diameter of absorbent powders according to the present invention before and after 12 regeneration cycles.

FIG. 35 illustrates the particle size distribution before and after 12 cycles for certain CaO:MgO examples, with and without $Al_2O_3$ additions. FIG. 36 illustrates the pore volume, BET surface area and average pore diameter (pores <100 nanometers) for the same examples. The presence of MgO effectively increases the porosity, particularly at high MgO contents, and maintains a small particle size.

Reforming Catalysts

To determine the feasibility of fabricating SMR catalysts by spray processing, powders having the composition 0.5 wt. % Rh supported on $Al_2O_3$ are produced using a spray processing method according to the present invention.

Example RC-1

This example illustrates the preparation of a 40 g batch of 0.5% Rh/$Al_2O_3$ by spray pyrolysis. 4.2 g of a 5 wt. %

Rh(OAc)$_3$ solution is added while shearing to a solution formed from 200 g of DISPAL 23N4-20 and 500 g of de-ionized water. An additional 900 g of de-ionized water is added to this mixture to dilute the solids loading to 2.5 wt. %. The total precursor dispersion is sheared for an additional 10 minutes. Spray pyrolysis is conducted on an ultrasonic transducer system at a furnace temperature of 600° C., with air as the carrier gas and quench gas at 60 SLPM (standard liters per minute) and 5 SCFM (standard cubic feet per minute), respectively. This relates to a system having a reaction residence time of 1.5 seconds as calculated by the quotient of the system volume and the carrier gas flow rate corrected for temperature expansion.

Example RC-2

This example illustrates the preparation of a 40 g batch of 0.5% Rh/Al$_2$O$_3$ by spray pyrolysis. 1.9 g of a 10.6% Rh(NO$_3$)$_3$ solution is added while shearing to a solution formed from 200 g of DISPAL 23N4-20 and 500 g of de-ionized water. An additional 900 g of de-ionized water is added to this mixture to dilute the solids loading to 2.5 wt. %. The total precursor dispersion is sheared for an additional 10 minutes. Spray pyrolysis is conducted on an ultrasonic transducer system at a furnace temperature of 600° C., with air as the carrier gas and the quench gas at 60 SLPM and 5 SCFM, respectively. This relates to a system having a reaction residence time of 1.5 seconds, as defined above.

Example RC-3

This example illustrates the preparation of a 300 g batch of 0.5% Rh/Al$_2$O$_3$ by spray pyrolysis. 29.2 g of a 5% Rh(OAc)$_3$ solution is added while shearing to a solution formed from 1492 g of DISPAL 23N4-20 and 2 kg of de-ionized water. An additional 2.4 kg of de-ionized water is added to this mixture to dilute the solids loading to 5 wt. %. The total precursor dispersion is sheared for an additional 10 minutes. Spray pyrolysis is conducted on an ultrasonic transducer system at a furnace temperature of 600° C., with air as the carrier gas and as the quench gas at 60 SLPM and 5 SCFM, respectively. This relates to a system having a reaction residence time of 1.5 seconds, as defined above.

Example RC-3A

This example illustrates the preparation of a 40 g batch of 0.5% Rh/Al$_2$O$_3$ by spray pyrolysis. 3.9 g of a 5% Rh(OAc)$_3$ solution is added to a solution of 200 g of DISPAL 23N4-20 and 1.4 kg de-ionized water while shearing. The resulting 5 wt. % solids precursor dispersion is sheared for an additional 10 minutes. The spray pyrolysis is conducted on an ultrasonic transducer system at a furnace temperature of 500° C., with air carrier gas and quench at 60 SLPM and 5 SCFM, respectively. This relates to a system having a reaction residence time of 1.5 second as defined above.

Various other examples of reforming catalysts are prepared in a manner similar to the foregoing examples. All of these examples were prepared by spray pyrolysis. Table 7 lists the 0.5 wt % Rh/Al$_2$O$_3$ samples that are prepared by spray pyrolysis under different operating conditions. Each example is prepared from a precursor including Rh-nitrate or Rh-acetate and DISPAL 23 N4-20, except Example RC-7 which is prepared by post-treatment of Example RC-6.

TABLE 7

| Sample | Composition | Solution (wt. %) | Temp. (° C.) |
|---|---|---|---|
| RC-1 | 0.5% Rh/Al$_2$O$_3$ | 2.5 Rh-acetate | 600 |
| RC-2 | 0.5% Rh/Al$_2$O$_3$ | 2.5 Rh-nitrate | 600 |
| RC-3 | 0.5% Rh/Al$_2$O$_3$ | 5 Rh-acetate | 600 |
| RC-4 | 0.5% Rh/Al$_2$O$_3$ | 2.5 Rh-nitrate | 500 |
| RC-5 | 0.5% Rh/Al$_2$O$_3$ | 2.5 Rh-nitrate | 800 |
| RC-6 | 0.5% Rh/Al$_2$O$_3$ | 2.5 Rh-nitrate | 500 |
| RC-7 | 0.5% Rh/Al$_2$O$_3$ | N/A | 600* |
| RC-8 | 0.5% Rh/Al$_2$O$_3$ | 2.5 Rh-acetate | 500 |
| RC-9 | 0.5% Rh/Al$_2$O$_3$ | 2.5 Rh-acetate | 800 |
| RC-10 | 0.5% Rh/Al$_2$O$_3$ | 5 Rh-acetate | 700 |
| RC-11 | 0.5% Rh/Al$_2$O$_3$ | 5 Rh-acetate | 900 |
| RC-12 | 0.5% Rh/Al$_2$O$_3$ | RC-3A | 600* |

*Post-treatment at 600° C. for 5 hours

The PSD, BET surface area, average pore diameter (pores <100 nanometers) and pore volume are measured for Examples RC-1 and RC-2 and the results are listed in Table 8.

TABLE 8

| Example | PSD d10, d50, d90 (μm) | BET Surface Area (m$^2$/g) | Average Pore Diameter (nm) | Pore Volume (cm$^3$/g) |
|---|---|---|---|---|
| RC-1 | NA | 221.3 | 5.9 | 0.324 |
| RC-2 | 1.1, 1.7, 3.7 | 223.8 | 5.7 | 0.319 |

Catalytic activities are measured over Rh/Al$_2$O$_3$ catalysts prepared by spray processing under different operating conditions, which include different precursors, different precursor concentrations, and different processing temperatures as described in Table 7. The SMR activity of the powders is measured at a reaction temperature of 600° C. and a H$_2$O:C ratio of 3:1. Compared to a standard commercially available reference catalyst with the same composition, the materials produced in this example show excellent performance, as can be seen in the following Figures.

FIGS. 37 to 40 illustrate the effects of some spray processing parameters, including different precursors such as Rh-nitrate and Rh-acetate, different processing temperature and different concentration of the precursors, and post processing. These results are also compared to a commercial reference catalyst (Alfa Aesar, Ward Hill, Mass.) with identical amount of Rh supported on alumina.

Figure 37:
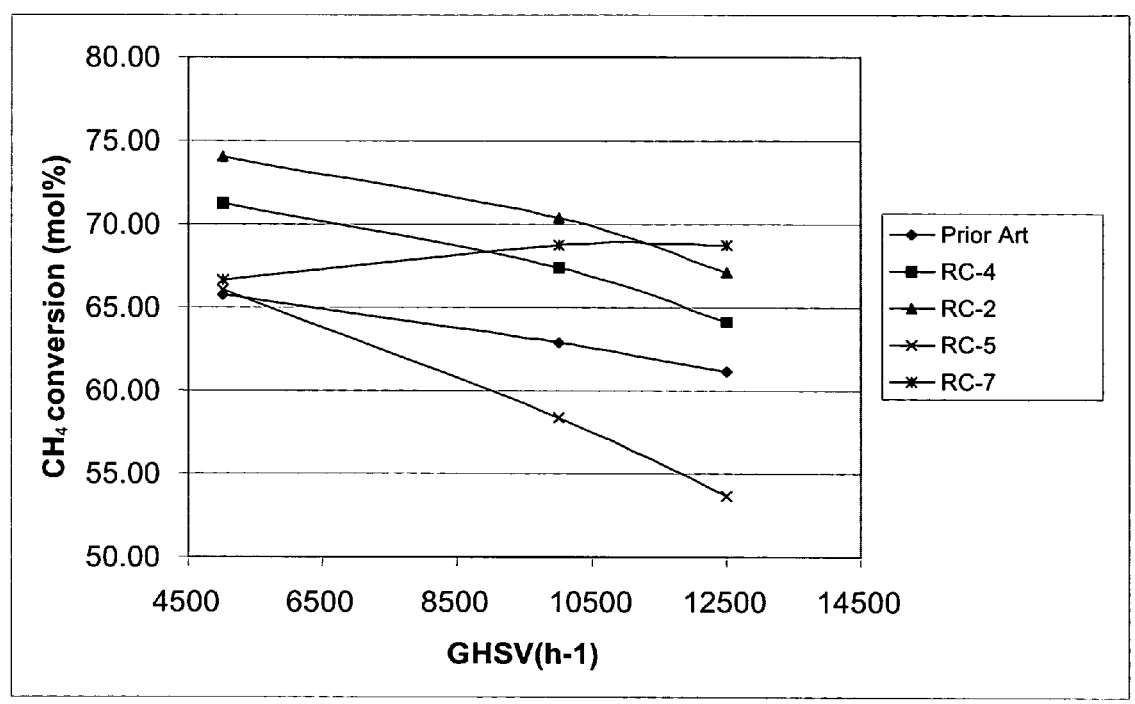
FIG. 37 illustrates the methane conversion over steam reforming catalysts according to the present invention compared to a prior art catalyst.

FIG. 37 illustrates the conversion of methane in SMR over a 0.5 wt. % Rh/Al$_2$O$_3$ catalyst prepared by spray pyrolysis of Rh-nitrate and alumina gel at spray processing temperatures from 500° C. to 800° C. The catalyst activity is clearly influenced by the spray processing temperature. Example RC-2 prepared at 600° C. demonstrates better activity and has significantly better performance than the commercial catalyst. Post-processing of a catalyst at 500° C. for 5 hours at 600° C. significantly changes the SMR activity (compare Example RC-4 and RC-7) decreasing the conversion at lower space velocities and increasing the conversion at higher space velocities. This indicates that further changes in the activity/distribution of the active sites as well as in the pore structure of the catalyst can be introduced by post-processing.

Figure 38:
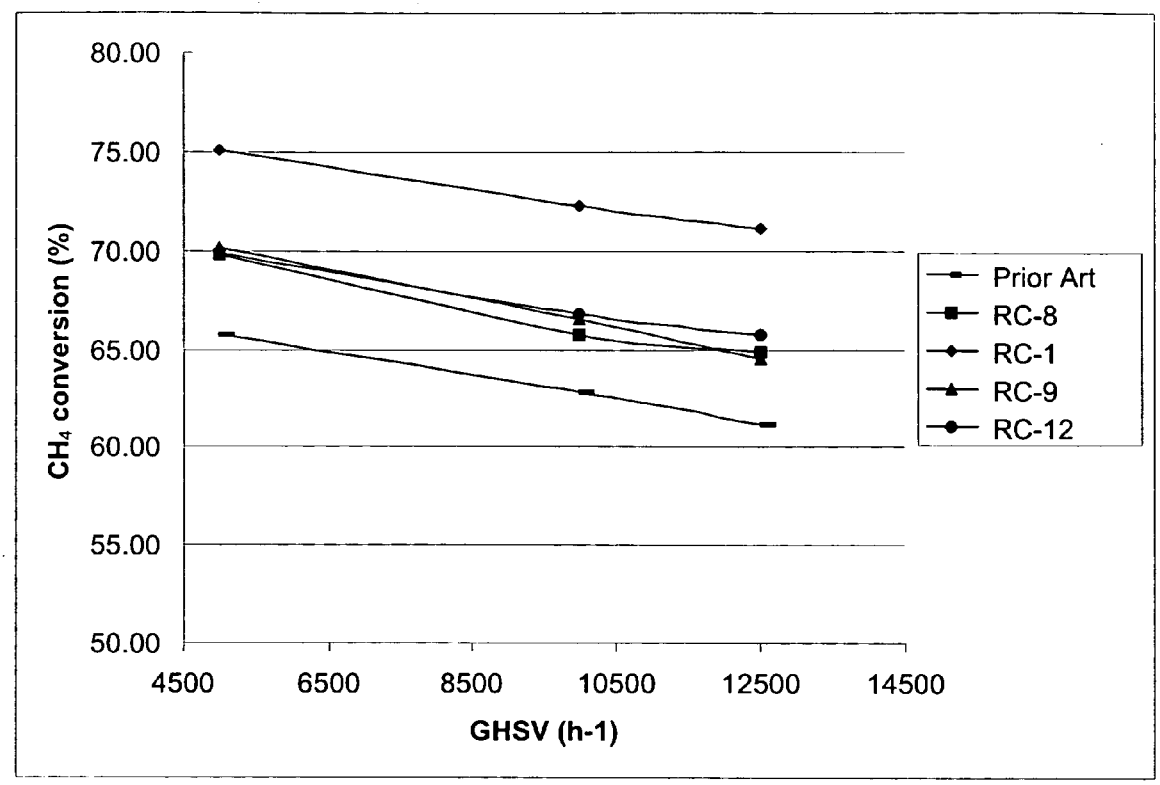
FIG. 38 illustrates the methane conversion over steam reforming catalysts according to the present invention compared to a prior art catalyst.

The SMR results illustrated in FIG. 38 show a similar trend as seen in FIG. 37, although the precursor for spray processing is Rh-acetate. Again, 600° C. is optimal for achieving the best performance and it is clear that spray processing has advantages for the preparation of a reforming catalyst as compared to conventional methods since all catalysts prepared by spray processing demonstrate higher conversion compared to the commercial catalyst.

Figure 39:
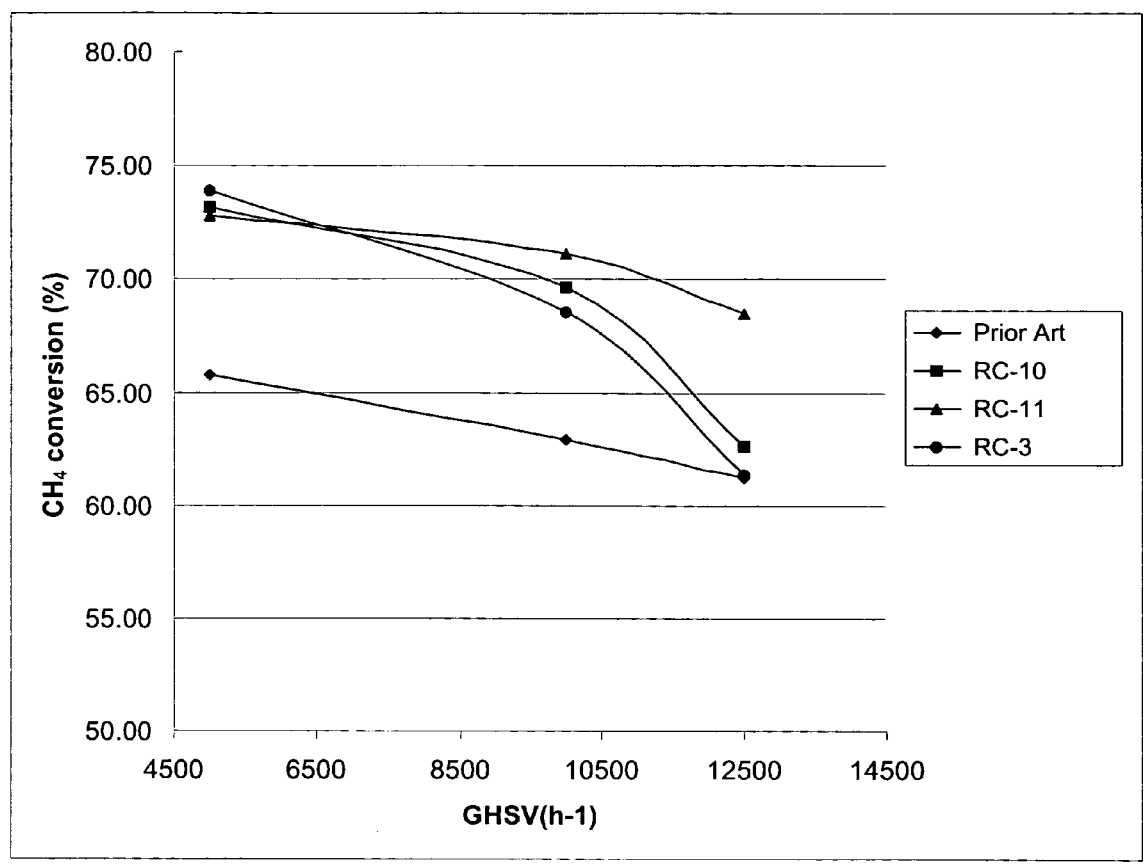
FIG. 39 illustrates the methane conversion over steam reforming catalysts according to the present invention compared to a prior art catalyst.

FIG. 39 compares the SMR activity of 0.5 wt % $Rh/Al_2O_3$ prepared by spray pyrolysis when higher solids concentration was used in the spray processing suspension (5 wt. %) as compared to the samples from FIG. 38 (2.5 wt. %) and as function of the processing temperature (600° C., 700° C. and 900° C.). When the solids loading concentration is increased at the identical spray processing temperature (Example RC-3 compared to Example RC-1 in FIG. 38) the performance of the catalyst is lower. At higher solids loading, a higher spray processing temperature (900° C.) forms a catalyst with the best performance at high space velocities (Example RC-11). This result clearly demonstrates the flexibility of spray processing (variety of precursors, spray processing conditions and suspension solids loading) for the preparation of reforming catalysts with higher catalytic activity as compared to the catalyst prepared by a conventional approach.

Figure 40:
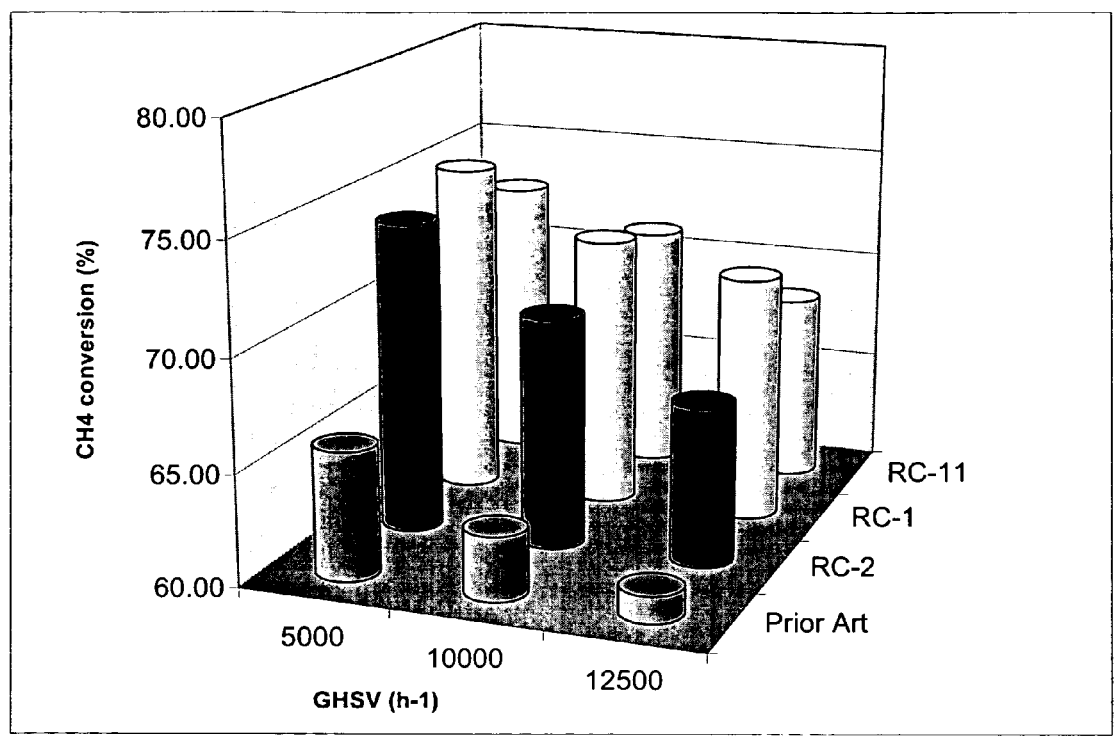
FIG. 40 illustrates the methane conversion over steam reforming catalysts according to the present invention compared to a prior art catalyst.

FIG. 40 compares the $CH_4$ conversion for the best SMR catalysts made under different spray processing conditions with the commercial reference catalyst. It can be seen from FIG. 40 that all catalysts obtained from different conditions have superior catalytic activity than the commercial catalyst at all space velocities, and among them, the $Rh/Al_2O_3$ catalyst made by spray processing at 600° C. using Rh-acetate as a precursor and alumina gel at 2.5 wt. % solids loadings (Example RC-1) has the best performance over a wide range of space velocities.

These results also indicate that by using spray processing as a method for producing the SMR catalysts, it may be possible to reduce the precious metal content in these materials while maintaining or even improving overall performance. The results shown in FIG. 40 indicate that there is a strong connection between the spray-processing conditions and the structure and performance.

Multifunctional Catalysts

Two approaches can be used to make multifunctional particles containing an absorbent and an SMR catalyst. The final powders can be generated by either spray drying or spray pyrolysis, starting with either combinations of powders or combinations of precursors and powders.

One method combines individual CaO:MgO and $Rh/Al_2O_3$ powders, preferably powders that are made by either spray drying or spray pyrolysis. The individual powders are dispersed together in a carrier such as water and processed through a spray dryer or a spray pyrolysis unit. For example, in the first row of Table 9 below, both powders are made on a spray dryer, and the powders are then dispersed in water and spray dried again. In another example, the catalyst represented in the second row is made by combining CaO:MgO powder from spray pyrolysis with $Rh/Al_2O_3$ powder from a spray dryer in water, then processing the combined powders on a spray dryer.

TABLE 9

| CaO:MgO Powder | $Rh/Al_2O_3$ Powder | Processing |
| --- | --- | --- |
| Spray Dryer | Spray Dryer | Spray Dryer |
| Spray Pyrolysis | Spray Dryer | Spray Dryer |
| Spray Dryer | Spray Dryer | Spray Pyrolysis |
| Spray Pyrolysis | Spray Dryer | Spray Pyrolysis |
| Spray Dryer | Spray Pyrolysis | Spray Dryer |
| Spray Pyrolysis | Spray Pyrolysis | Spray Dryer |
| Spray Dryer | Spray Pyrolysis | Spray Pyrolysis |
| Spray Pyrolysis | Spray Pyrolysis | Spray Pyrolysis |

The second approach, summarized in Table 10 below, combines powders and precursors with different processing systems. Component powders are generated by either spray drying or spray pyrolysis. The powder is then combined with the precursors to the remaining component and processed.

In Table 10, the word 'Precursors' indicates that the final catalyst is made by adding precursors to a powder, followed by a final processing. In the first row of Table 10, $Rh/Al_2O_3$ is separately made on a spray dryer and combined with the precursors to CaO:MgO. The resulting mixture is then processed on a spray dryer to yield a multifunctional catalyst. In the fifth row, the CaO:MgO is made on a spray dryer and combined with the precursors to $Rh/Al_2O_3$. The resulting mixture is then processed on a spray dryer to yield a multifunctional catalyst.

TABLE 10

| CaO:MgO | $Rh/Al_2O_3$ | Processing |
| --- | --- | --- |
| Precursors | Spray Dryer | Spray Dryer |
| Precursors | Spray Pyrolysis | Spray Dryer |
| Precursors | Spray Dryer | Spray Pyrolysis |
| Precursors | Spray Pyrolysis | Spray Pyrolysis |
| Spray Dryer | Precursors | Spray Dryer |
| Spray Pyrolysis | Precursors | Spray Pyrolysis |
| Spray Dryer | Precursors | Spray Pyrolysis |
| Spray Pyrolysis | Precursors | Spray Dryer |
| Precursors | Precursors | Spray Dryer |
| Precursors | Precursors | Spray Pyrolysis |

The following illustrate certain examples of the fabrication of multi-functional composite materials in more detail.

Example MC-1

This example illustrates the fabrication of a 1 kg batch of CaO:MgO (55:45 ratio) and 0.5% $Rh/Al_2O_3$ having a net composition of 90% CaO:MgO and 10% SMR catalyst according to the present invention. 0.96 kg of $CaC_2O_4$:$MgC_2O_4$ (55:45 ratio and fabricated on a spray dryer) is dispersed in 4 kg of de-ionized water. 39.8 g of 0.5% $Rh/Al_2O_3$ fabricated on a spray dryer and an additional 4 kg of de-ionized water is added, and the mixture is shear mixed for 30 minutes. The precursor dispersion is fed into a mixed flow spray dryer at a liquid feed rate to maintain inlet/outlet temperatures of 975/580° F., using a two-fluid nozzle with an air pressure of 65 psig. The residence time of the system used is 10 seconds as defined above. The powder is collected using a cyclone.

Example MC-2

This example illustrates the fabrication of a 1 kg batch of CaO:MgO (55:45 ratio), 0.5% $Rh/Al_2O_3$ having a net composition of 90% CaO:MgO and 10% SMR catalyst according to the present invention. Individually, 0.83 kg of calcium nitrate is dissolved in 1 kg of de-ionized water, 0.81 kg of ammonium oxalate in 2 kg of de-ionized water, 1.0 kg of magnesium nitrate in 1 kg of de-ionized water, and 0.92 kg of ammonium oxalate in 2 kg of de-ionized water. These solutions are shear mixed for 30 minutes. The calcium nitrate solution is added to the smaller ammonium oxalate solution and the magnesium nitrate solution is added to the larger. The precipitates are shear mixed individually for an hour, then combined. 39.8 g of 5 wt. % $Rh/Al_2O_3$ (made in a spray dryer) is added to the precipitate mixture, and the resulting 10 wt. % solids precursor is shear mixed for one hour. The precursor dispersion is fed into a mixed flow spray dryer at a liquid feed rate to maintain inlet/outlet temperatures of 975° F./580° F., using a two-fluid nozzle with an air pressure of 65 psig. The residence time of the system is 10 seconds, as defined above. The powder is collected using a cyclone.

Example MC-3

This example illustrates the fabrication of a 1 kg batch of CaO:MgO (55:45 ratio) and 0.5% $Rh/Al_2O_3$ having a net composition of 90% CaO:MgO and 10% SMR catalyst according to the present invention. Individually, 0.83 kg of calcium nitrate is dissolved in 1 kg of de-ionized water, 0.81 kg of ammonium oxalate in 2 kg of de-ionized water, 1.0 kg of magnesium nitrate in 1 kg of de-ionized water, and 0.92 kg of ammonium oxalate in 2 kg of de-ionized water. These solutions are shear mixed for 30 minutes. The calcium nitrate solution is added to the smaller ammonium oxalate solution and the magnesium nitrate solution is added to the larger. The precipitates are shear mixed individually for an hour, then combined and sheared for 30 minutes. 3.9 g of a 5 wt. % $Rh(OAc)_3$ solution is sheared into 198 g of DISPAL 23N4-20, then slowly added to the calcium and magnesium oxalates mixture. This resulting 10 wt. % solids precursor is shear mixed for an additional 30 minutes. The precursor dispersion is fed into a mixed flow spray dryer at a liquid feed rate to maintain inlet/outlet temperatures of 975° F./580° F., using a two-fluid nozzle with an air pressure of 65 psig. The residence time of the system used is 10 seconds as defined above. The powder is collected using a cyclone.

Example MC-4

This example illustrates the fabrication of a 30 g batch of CaO:MgO (55:45 ratio) and 0.5% $Rh/Al_2O_3$ having a net composition of 90% CaO:MgO and 10% SMR catalyst according to the present invention. Individually, 56.7 g of calcium nitrate is dissolved in 200 g of de-ionized water and 85.8 g of magnesium nitrate in 200 g of de-ionized water. 0.3 g of a 5 wt. % $Rh(OAc)_3$ solution is sheared into 15 g of DISPAL 23N4-20 and 500 g of de-ionized water. The calcium and magnesium solutions and 140 g of de-ionized water are sheared into the $Rh/Al_2O_3$ dispersion. This resulting 2.5 wt. % solids precursor is shear mixed for an additional 10 minutes. Spray pyrolysis is conducted using an ultrasonic transducer system at a furnace temperature of 900° C., with air carrier gas and quench at 70 SLPM and 6 SCFM, respectively. The system has a reaction residence time of 0.9 second, as defined above.

Example MC-5

This example illustrates the fabrication of a 1 kg batch of CaO:MgO (80:20 ratio) and 0.5% $Rh/Al_2O_3$ having a net composition 90% CaO:MgO and 10% SMR catalyst according to the present invention. 0.96 kg of $CaC_2O_4:MgC_2O_4$ (80:20 ratio and made on a spray dryer) is dispersed in 4 kg of de-ionized water. 41.8 g of 0.5% $Rh/Al_2O_3$ (made by spray pyrolysis) and an additional 5 kg of de-ionized water is added, and the mixture is shear mixed for 30 minutes. The precursor dispersion is fed into a mixed flow spray dryer at a liquid feed rate to maintain inlet/outlet temperatures of 975° F./580° F., using a two-fluid nozzle with an air pressure of 65 psig. The residence time of the system used is 10 seconds, as defined above. The powder is collected using a cyclone.

Example MC-6

This example illustrates the fabrication of a 1 kg batch of CaO:MgO (55:45 ratio) and 0.5% $Rh/Al_2O_3$ having a net composition of 90% CaO:MgO and 10% SMR catalyst according to the present invention. Individually, 0.83 kg of calcium nitrate is dissolved in 1.5 kg of de-ionized water, 0.81 kg of ammonium oxalate is dissolved in 2 kg of de-ionized water, 1.0 kg of magnesium nitrate is dissolved in 0.5 kg of de-ionized water, and 0.92 kg of ammonium oxalate is dissolved in 2 kg of de-ionized water. These solutions are shear mixed for 30 minutes. The calcium nitrate solution is added to the smaller ammonium oxalate solution and the magnesium nitrate solution is added to the larger. The precipitates are shear mixed individually for an hour, then combined and sheared for 30 minutes. 39.8 g of 0.5% $Rh/Al_2O_3$ (made via spray pyrolysis) is slowly added to the calcium and magnesium oxalates mixture. The resulting 10 wt. % solids precursor is shear mixed for an additional 30 minutes. The precursor dispersion is fed into a mixed flow spray dryer at a liquid feed rate to maintain inlet/outlet temperatures of 975° F./580° F., using a two-fluid nozzle with an air pressure of 65 psig. The residence time of the system used is 10 seconds, as defined above. The powder is collected using a cyclone.

Table 11 provides some physical characterization data for the materials described in the examples above.

TABLE 11

| Sample | PSD d10, d50, d90 (µm) | BET Surface Area (m²/g) | Pore Diameter (nm) | Pore Volume (cm³/g) |
|---|---|---|---|---|
| MC-2 | 1.8, 4.1, 8.8 | 31.3 | 11.1 | 0.087 |
| MC-3 | 1.6, 3.8, 8.4 | 18.8 | 11.7 | 0.055 |
| MC-4 | 1.6, 3.8, 8.1 | 7.5 | 13.1 | 0.025 |
| MC-5 | 1.8, 5.3, 12.9 | 56.8 | 10.8 | 0.154 |
| MC-6 | 1.7, 3.9, 8.0 | 33.2 | 10.3 | 0.086 |

Additional examples of multi-functional absorbent/catalysts are prepared, as listed in Table 12. Each of the multi-functional absorbent/catalysts was a composite powder batch including 90 wt. % CaO:MgO (50:50 by wt.) and 10 wt. % of a 0.5 wt. % $Rh/Al_2O_3$ SMR catalyst. Each of the Examples was prepared by spray pyrolysis using ultrasonic transducers.

TABLE 12

| Example | Process Conditions | Precursor Composition |
|---|---|---|
| MC-7 | Spray Pyrolysis (500° C.) | Ca-nitrate |
| | | Mg-nitrate |
| | | Rh-acetate |
| | | DISPAL 23N4-20 |

TABLE 12-continued

| Example | Process Conditions | Precursor Composition |
|---|---|---|
| MC-8 | Spray Pyrolysis (500° C.) Post-process (500° C.) | MC-7 |
| MC-9 | Spray Pyrolysis (700° C.) | Ca-nitrate Mg-nitrate Rh-acetate DISPAL 23N4-20 |
| MC-10 | Spray Pyrolysis (900° C.) | Ca-nitrate Mg-nitrate Rh-acetate DISPAL 23N4-20 |
| MC-11 | Spray Pyrolysis (900° C.) | Ca-nitrate Mg-nitrate Rh-acetate DISPAL 23N4-20 |

The precursor solution for Example MC-11 is allowed to sit overnight to enable the Rh-acetate precursor to absorb onto the alumina surface.

Figure 41:
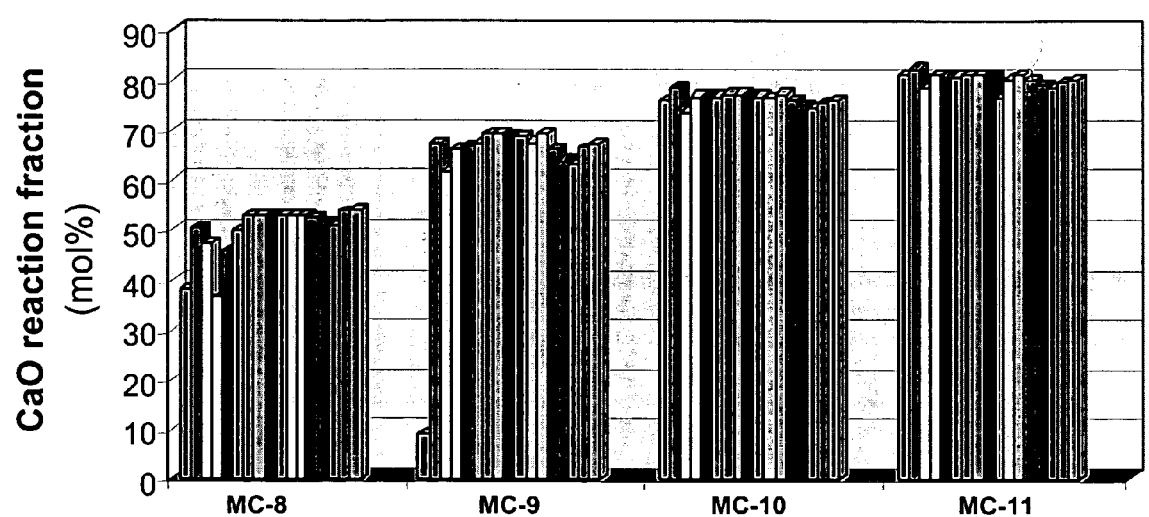
FIG. 41 illustrates the absorption capacity in terms of CaO reaction fraction of multi-functional composite powders according to the present invention.

The multi-functional materials are first tested for their absorption characteristics. FIG. 41 illustrates the absorption capacity over 24 cycles for Examples MC-8, MC-9, MC-10 and MC-11. Example MC-11 had the highest $CO_2$ absorption capacity and had very little loss in capacity over multiple cycles.

Figure 42:
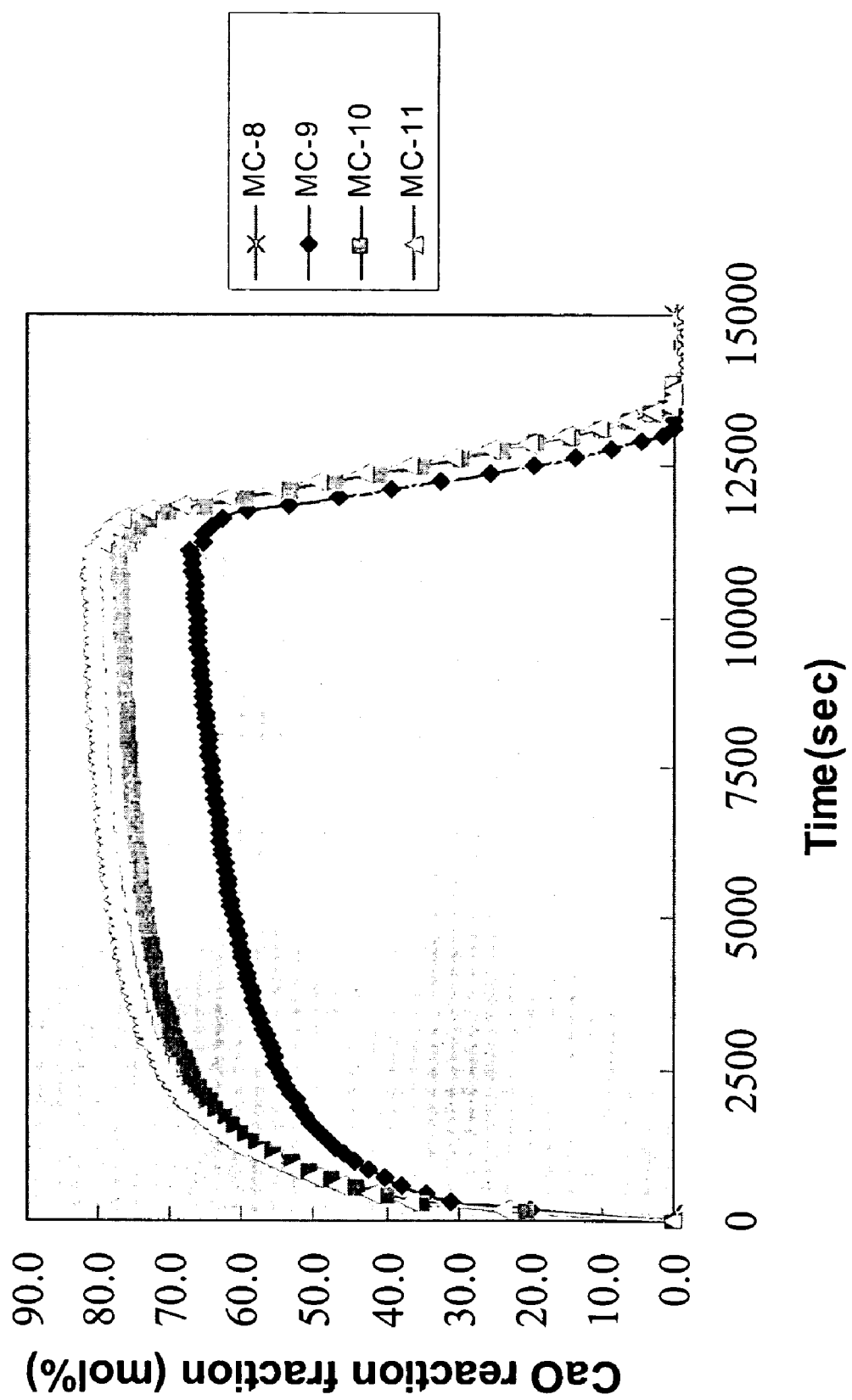
FIG. 42 illustrates the carbonation and decarbonation kinetics of multi-functional composite powders according to the present invention.

FIG. 42 illustrates the comparison of the carbonation/decarbonation kinetics profile for Examples MC-8, MC-9, MC-10 and MC-11. A comparison of the decarbonation rates for the multifunctional materials containing absorbent and catalysts made by spray pyrolysis simultaneously (FIG. 42) with those of materials without catalyst (FIG. 31) shows that the former have substantially faster decarbonation rates. Therefore, the production of combined functionality materials by spray methods offers higher level of flexibility in the control over the decarbonation rates.

Figure 43:
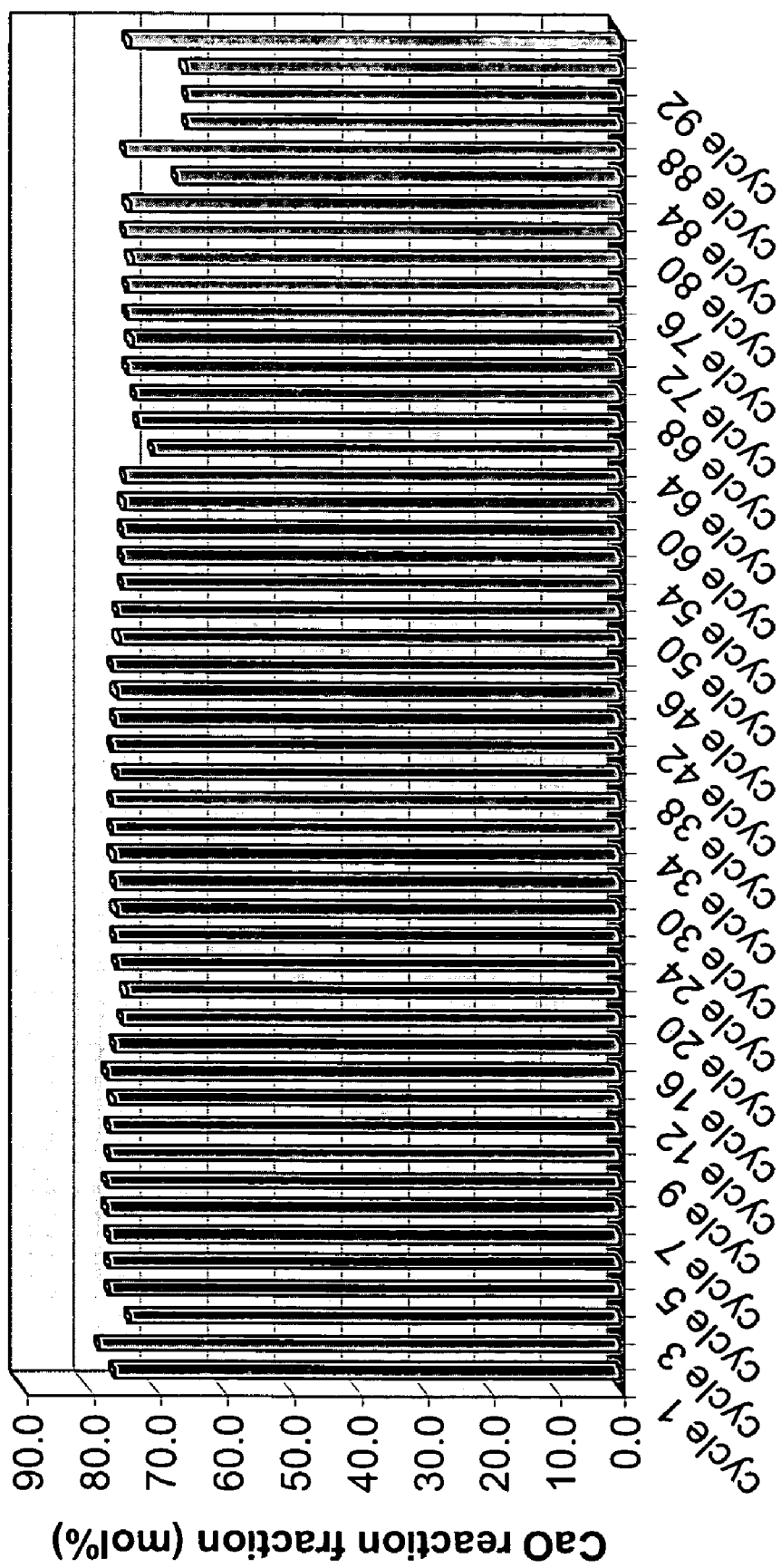
FIG. 43 illustrates the absorption capacity over 92 cycles in terms of CaO reaction fraction of a multi-functional composite powder according to the present invention.
Figure 44:
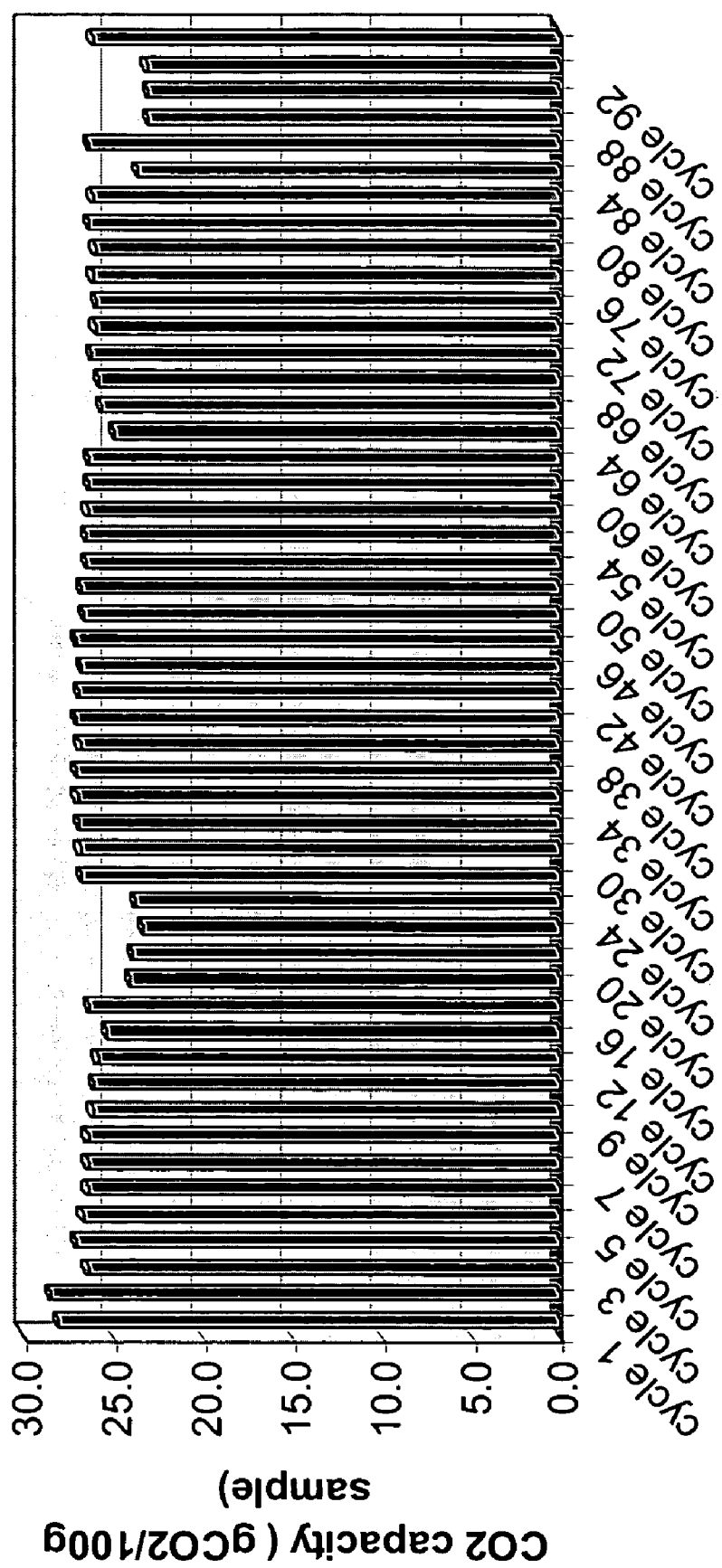
FIG. 44 illustrates the absorption capacity over 92 cycles of a multi-functional composite powder according to the present invention.
Figure 45:
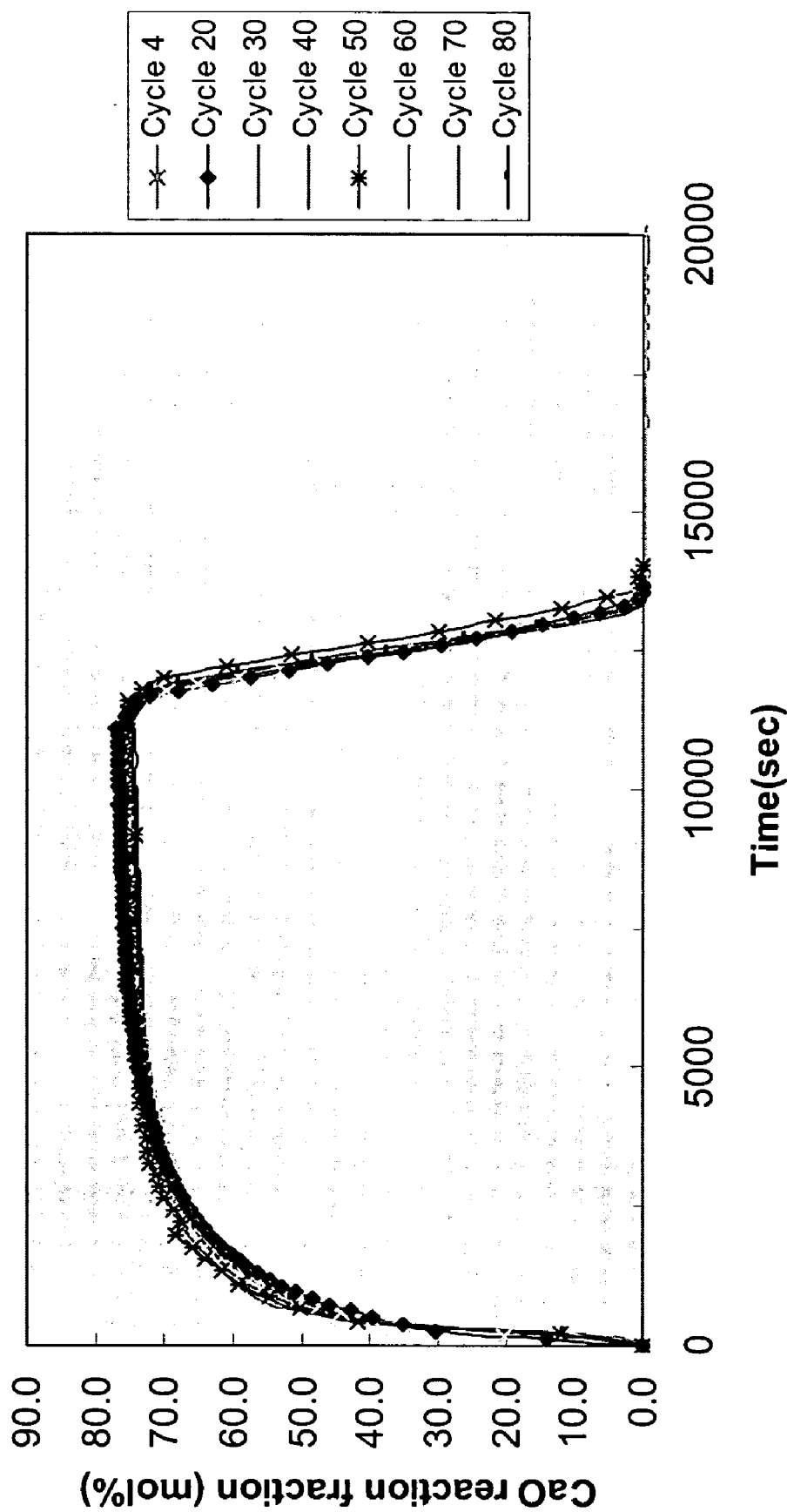
FIG. 45 illustrates the carbonation and decarbonation kinetics for a multi-functional composite powder according to the present invention.

FIGS. 43 and 44 illustrate the cyclability of Example MC-10 over 92 cycles. These Figures illustrate that the multi-functional materials have a high $CO_2$ absorption capacity and maintain a level absorption performance over at least 92 cycles. FIG. 45 illustrates the kinetics of carbonation and decarbonation for Example MC-10 over 80 cycles. The kinetics show a rapid desorption kinetics of the $CO_2$ which stays substantially unchanged over 80 cycles.

Pelletization

The following illustrates $CO_2$ absorbent performance after pelletizing and how the selected powder precursors for pellet extrusion affect $CO_2$ absorption by altering the microstructure and porosity.

Table 13 summarizes examples of extruded pellets made from powders that were produced on a spray dryer without further post-processing (see Tables 4 and 5 for the synthesis conditions). Among the extrudates, the binder (boehmite alumina) used for extrusion is kept the same.

TABLE 13

| Example | Powder Composition | Extrudate |
|---|---|---|
| A-2 | Ca-oxalate | EA-2 |
| A-3 | Ca-oxalate 5% $Al_2O_3$ | EA-3 |
| A-3A | Ca-oxalate 25% $Al_2O_3$ | EA-3A |
| A-6 | CaO:MgO (50:50 wt. %) | EA-6 |
| A-7 | CaO:MgO (50:50 wt. %) 5% $Al_2O_3$ | EA-7 |

TABLE 13-continued

| Example | Powder Composition | Extrudate |
|---|---|---|
| A-19 | CaO:MgO (90:10 wt. %) | EA-19 |
| A-21 | CaO:MgO (90:10 wt. %) 5% $Al_2O_3$ | EA-21 |

Figure 46:
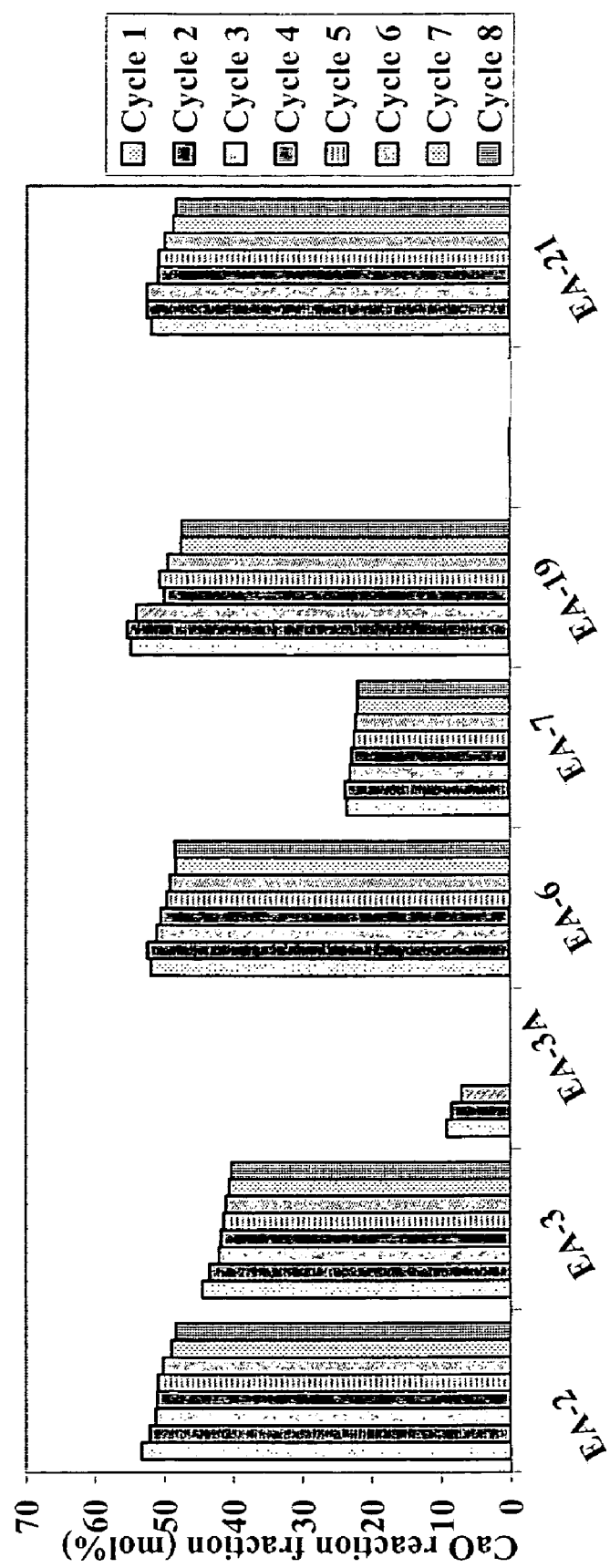
FIG. 46 illustrates the absorption capacity in terms of CaO reaction fraction of pelletized absorbent powders according to the present invention.
Figure 47:
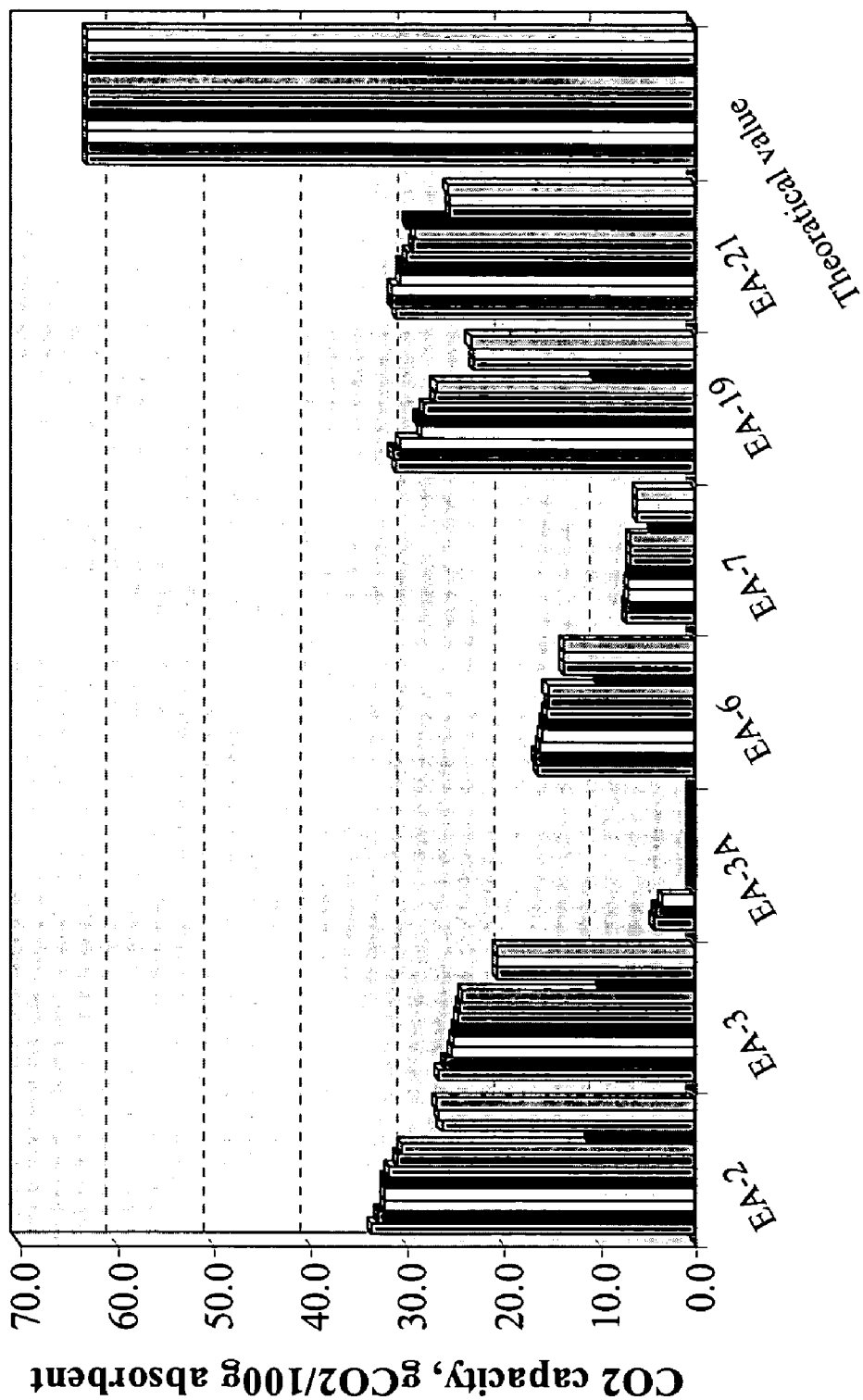
FIG. 47 illustrates the absorption capacity of pelletized absorbent powders according to the present invention.

FIGS. 46 and 47 illustrate the carbonation performance of extrudates formed from precursors including calcium oxalate or calcium carbonate. FIG. 46 illustrates the CaO reaction fraction and FIG. 47 shows the total $CO_2$ capacity in mass $CO_2$ per mass of absorbent. After pelletization, CaO reactivity to $CO_2$ carbonation decreases due to microstructural changes caused by the presence of a binder. In the case of Extrudate EA-3 A the activity to $CO_2$ carbonation is very low due to the use of large amount of $Al_2O_3$ in the powder precursor sample, similar to the results described for the non-pelletized powder. The presence of a large amount of $Al_2O_3$ will possibly cause it to react with CaO to form a new phase such as a spinel structure and prevent access of $CO_2$ to unreacted CaO.

Figure 48:
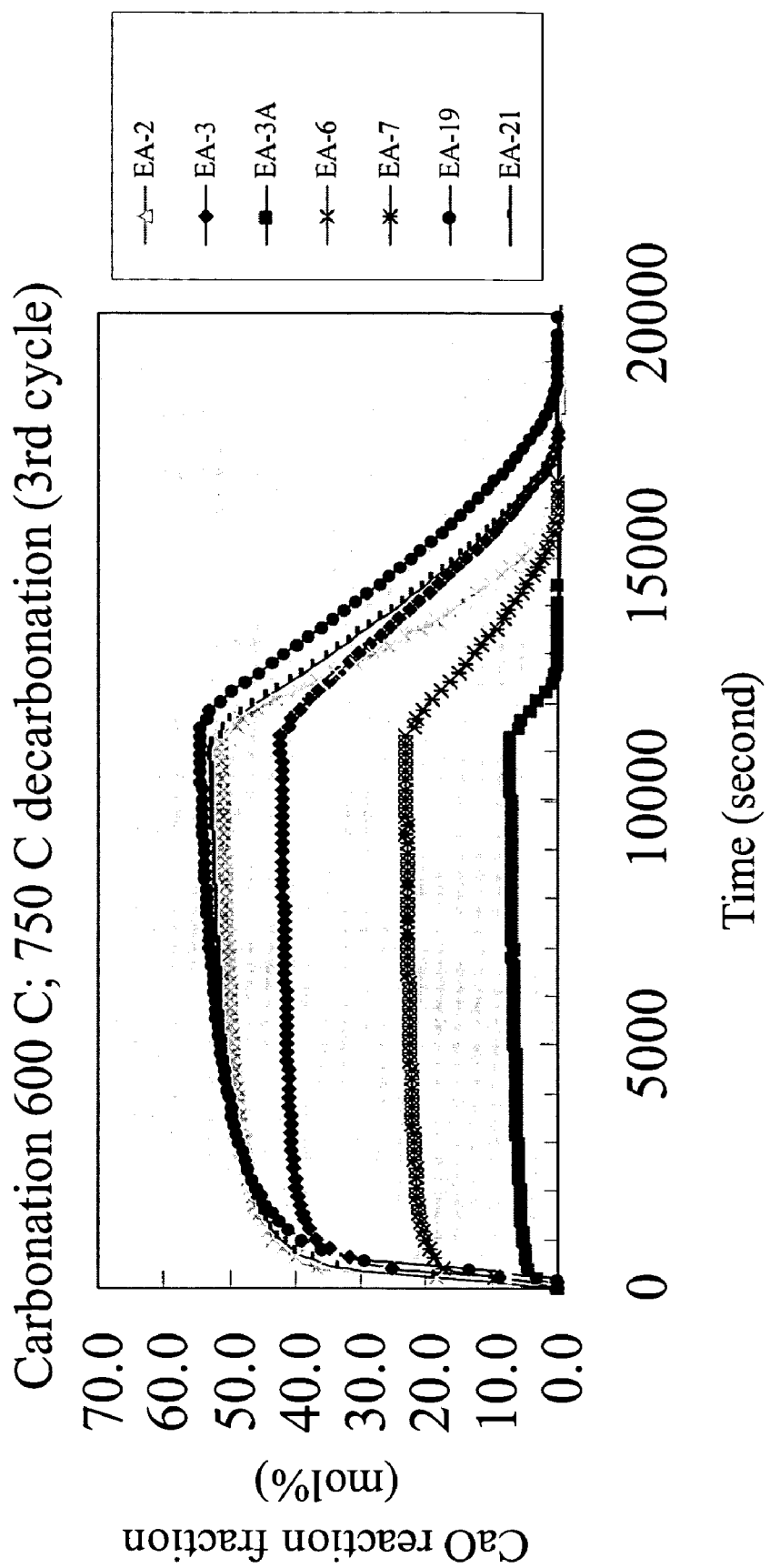
FIG. 48 illustrates the carbonation and decarbonation kinetics of pelletized absorbent powders according to the present invention.

FIG. 48 illustrates a comparison of the carbonation and decarbonation kinetics for selected extrudates.

Figure 49:
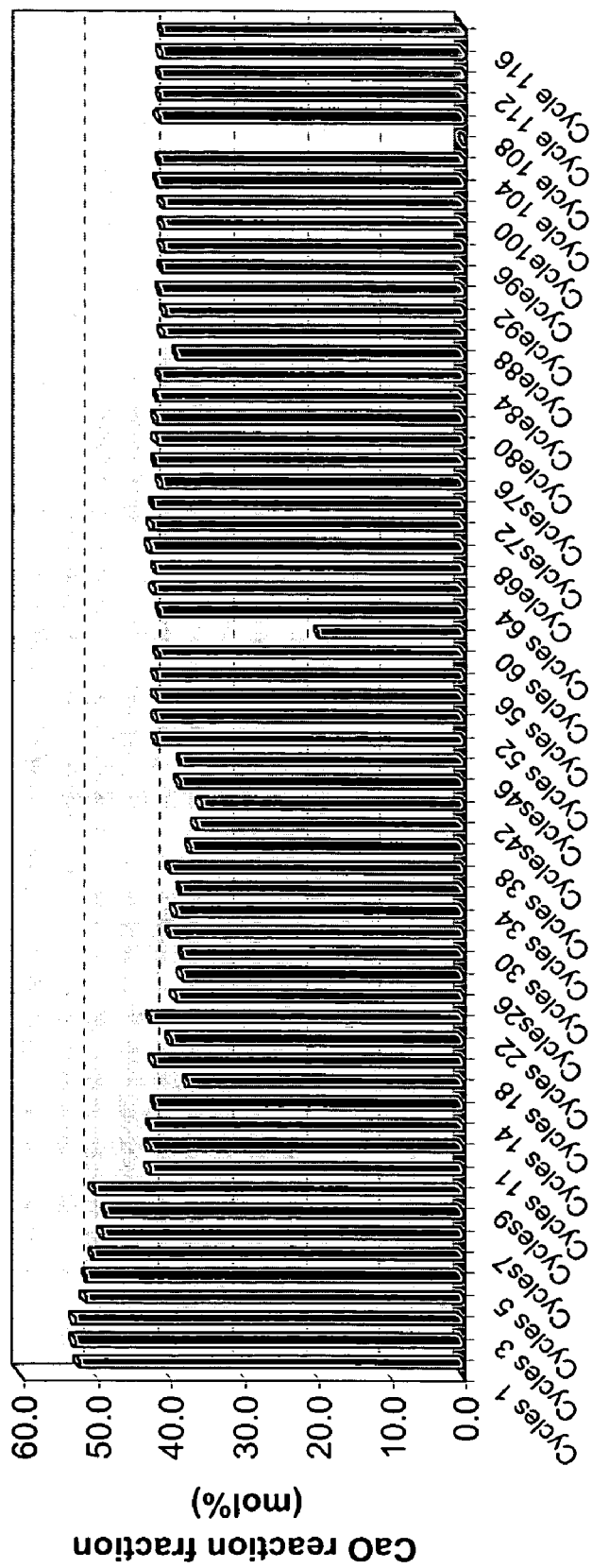
FIG. 49 illustrates the absorption capacity in terms of CaO reaction fraction of pelletized absorbent powders according to the present invention over 116 cycles.
Figure 50:
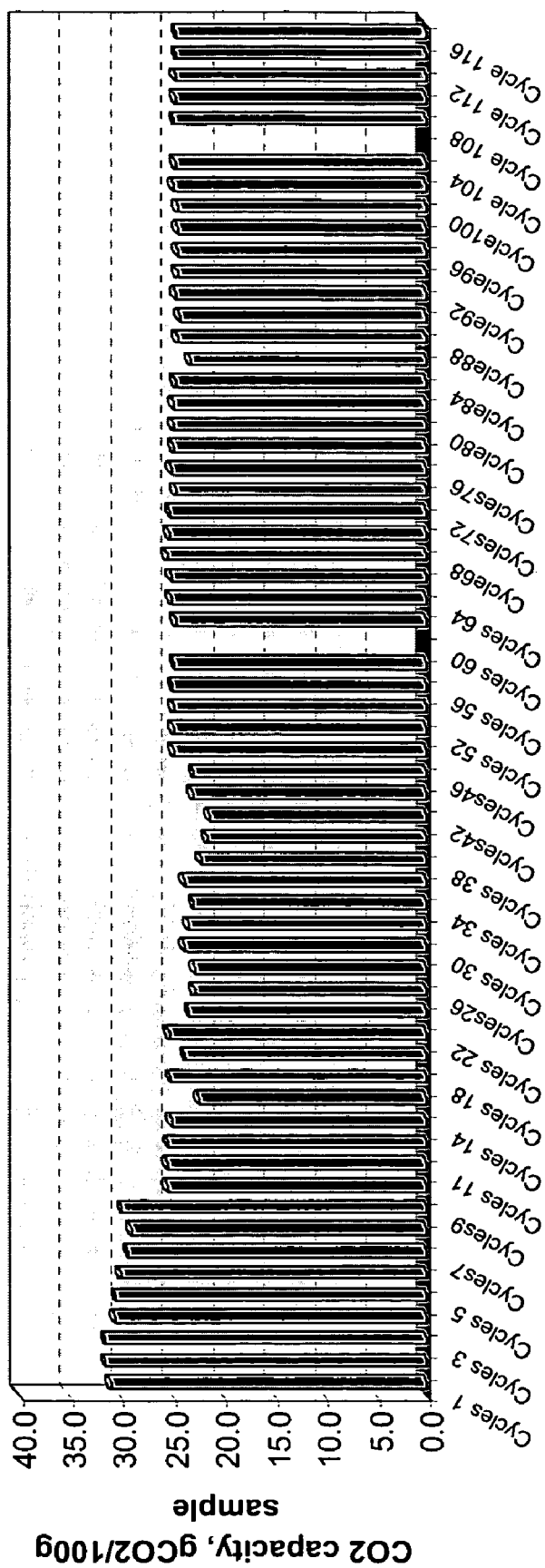
FIG. 50 illustrates the absorption capacity of pelletized absorbent powders according to the present invention over 116 cycles.

FIG. 49 illustrates the absorption capacity over 116 cycles of Extrudate EA-21, which is pelletized from a powder made by spray drying with a composition of Ca-oxalate and Mg-oxalate precursor containing 5 wt. % $Al_2O_3$. It can be seen that CaO reactivity to $CO_2$ carbonation is around 40 mol. % and is very stable over the 116 cycles of the test. (The dips in absorption at cycle numbers 60 and 108 are due to the depletion of the $CO_2$ source during testing). The absolute capacity for $CO_2$ absorption illustrated in FIG. 50 during the same cycling test is around 23 to 25 grams $CO_2$/per 100 grams of extrudate.

Table 14 lists the powders made from spray pyrolysis used for additional pelletization testing.

TABLE 14

| Sample | Composition | Extrudate |
|---|---|---|
| A-14 | CaO | EA-14 |
| A-15 | CaO | EA-15 |
| A-23 | CaO:MgO (50:50 at. %) | EA-23 |
| A-24 | CaO:MgO (50:50 at. %) | EA-24 |
| A-25 | CaO:MgO (50:50 at. %) | EA-25 |
| A-26 | CaO:MgO (50:50 at. %) | EA-26 |

The details of the powder preparation conditions are listed in Tables 2 and 3. The amount of the binders used for extrusion for these powders are all kept the same.

Figure 51:
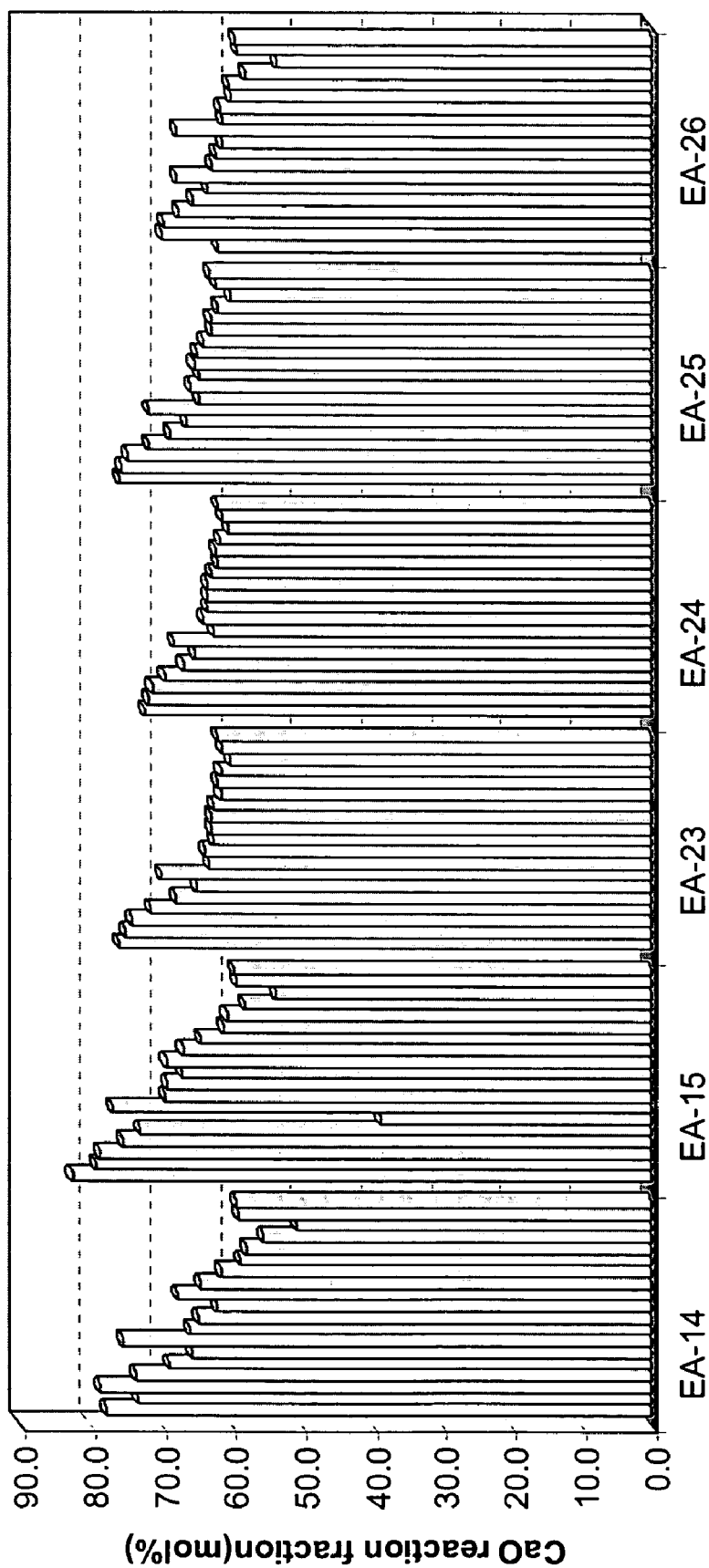
FIG. 51 illustrates the absorption capacity in terms of CaO reaction fraction of pelletized absorbent powders according to the present invention over multiple cycles.
Figure 52:
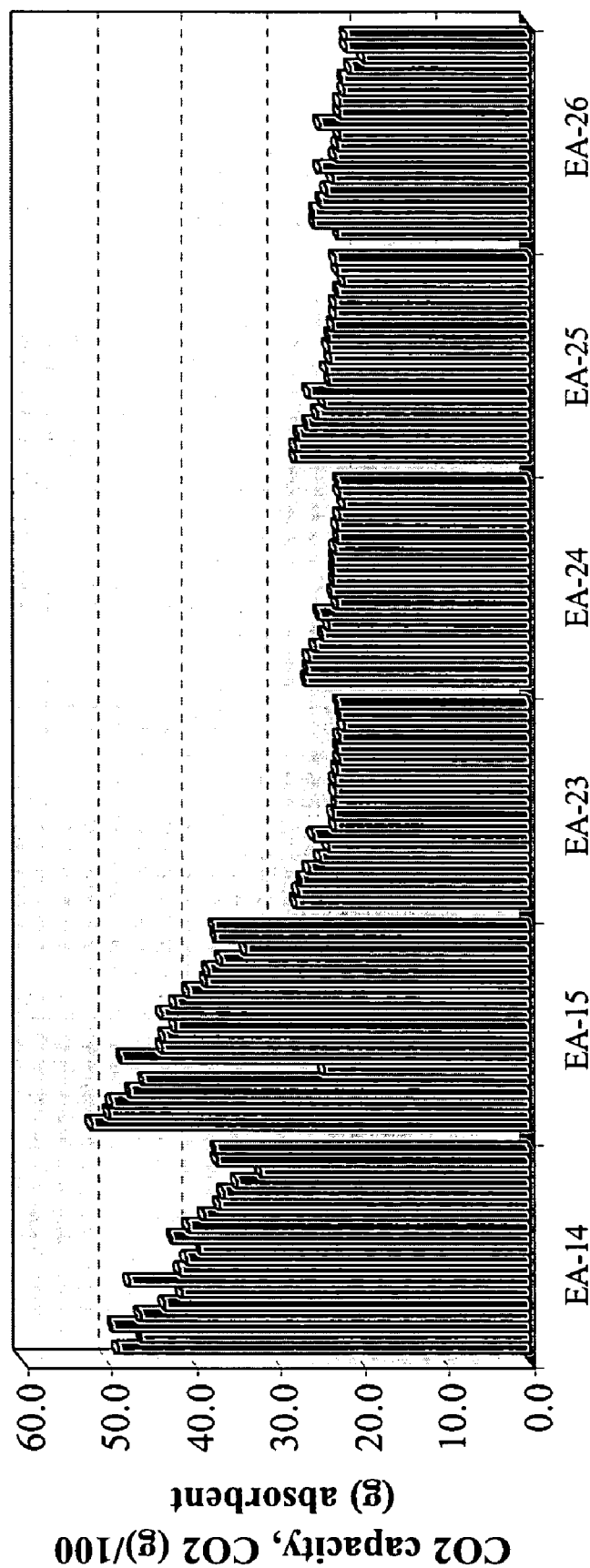
FIG. 52 illustrates the absorption capacity of pelletized absorbent powders according to the present invention over multiple cycles.

FIGS. 51 and 52 show the results of $CO_2$ carbonation reactivity and cyclability over the extrudates. FIG. 51 illustrates the CaO reaction fraction over multiple cycles. For the Examples illustrated in FIGS. 51 to 63, carbonation occurs at 600° C. and decarbonation occurs at 800° C. At the initial stage, the CaO reactivity is higher, then gradually becomes stable and levels at around 60 mol. % during multiple cycles. As compared to the extrudates from CaO:MgO, the extrudates from CaO (EA-14 and EA-15) have a low stability and the absorption capacity gradually decreases during multiple cycles.

FIG. 52 illustrates the total $CO_2$ capacity over the same cycle test as illustrated in FIG. 51. The capacity for the extrudates made from CaO powders (EA-14 and EA-15) is higher than the extrudates made from CaO:MgO powders (EA-23, EA-24, EA-25 and EA-26). However, the extrudates from CaO:MgO powders show more stable recyclability and the capacity for $CO_2$ removal is around 22 g $CO_2$ per 100 g absorbent.

Figure 53:
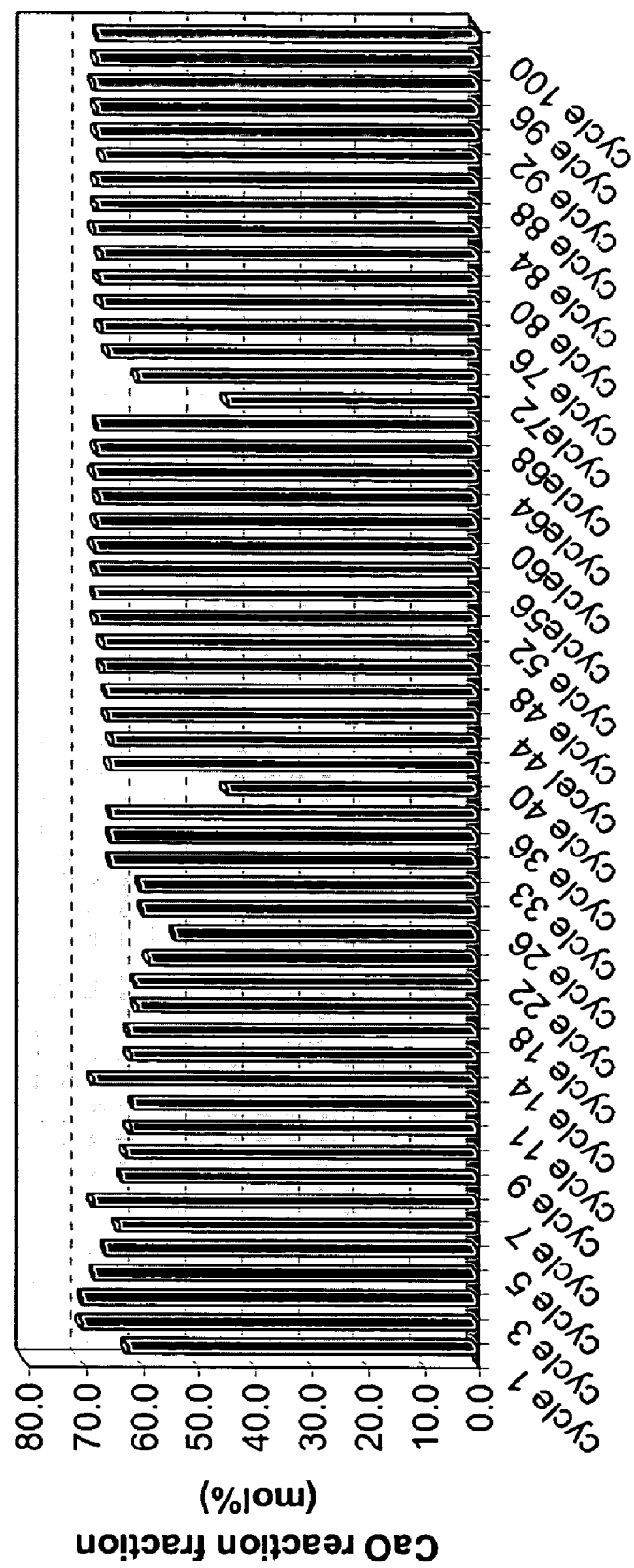
FIG. 53 illustrates the absorption capacity in terms of CaO reaction fraction of pelletized absorbent powders according to the present invention over multiple cycles.
Figure 54:
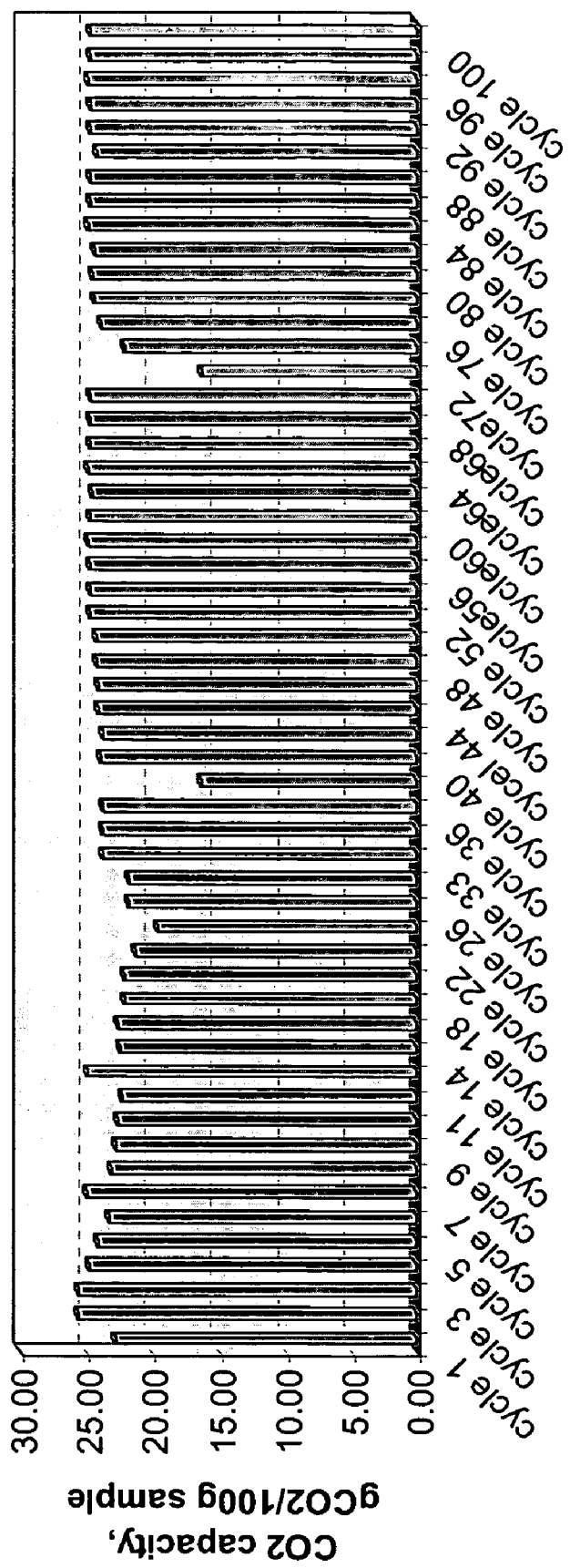
FIG. 54 illustrates the absorption capacity of pelletized absorbent powders according to the present invention over multiple cycles.

FIGS. 53 and 54 illustrate the cyclability of Extrudate EA-26 over 100 cycles. FIG. 53 illustrates the CaO reaction fraction and FIG. 54 illustrates the total $CO_2$ capacity. (The deviations at Cycles 40 and 72 are due to depletion of the $CO_2$ source during testing). This extrudate maintains a high absorption capacity over at least 100 cycles.

Pellets can also be formed from powders made by spray drying and post-processing according to the present invention. Table 15 lists several such examples.

TABLE 15

| Extrudate | Powder Composition | Process Conditions |
| --- | --- | --- |
| EA-101 | CaO:MgO (50:50 by wt.) | SD, PP at 500° C. |
| EA-102 | CaO:MgO (50:50 by wt.) | SD, PP at 750° C. |
| EA-103 | CaO:MgO (50:50 by wt.) | SD, PP at 500° C. |
| EA-104 | 95% CaO 5% $CaTiO_3$ | SD, PP at 750° C. |
| EA-105 | CaO:MgO (50:50)/$CaTiO_3$ (3/1 by at.) | SD, PP at 650° C. |
| EA-106 | CaO/$CaTiO_3$ (3/1 by at.) | SD, PP at 750° C. |
| EA-107 | Ca-oxalate 5 wt. % $Al_2O_3$ | SD, PP at 500° C. |
| EA-108 | Ca-oxalate 5 wt. % $Al_2O_3$ | SD, PP at 750° C. |
| EA-109 | CaO:MgO (80:20 by wt.) | SD, PP at 500° C. |
| EA-110 | CaO:MgO (80:20 by wt.) | SD, PP at 500° C. |

Figure 55:
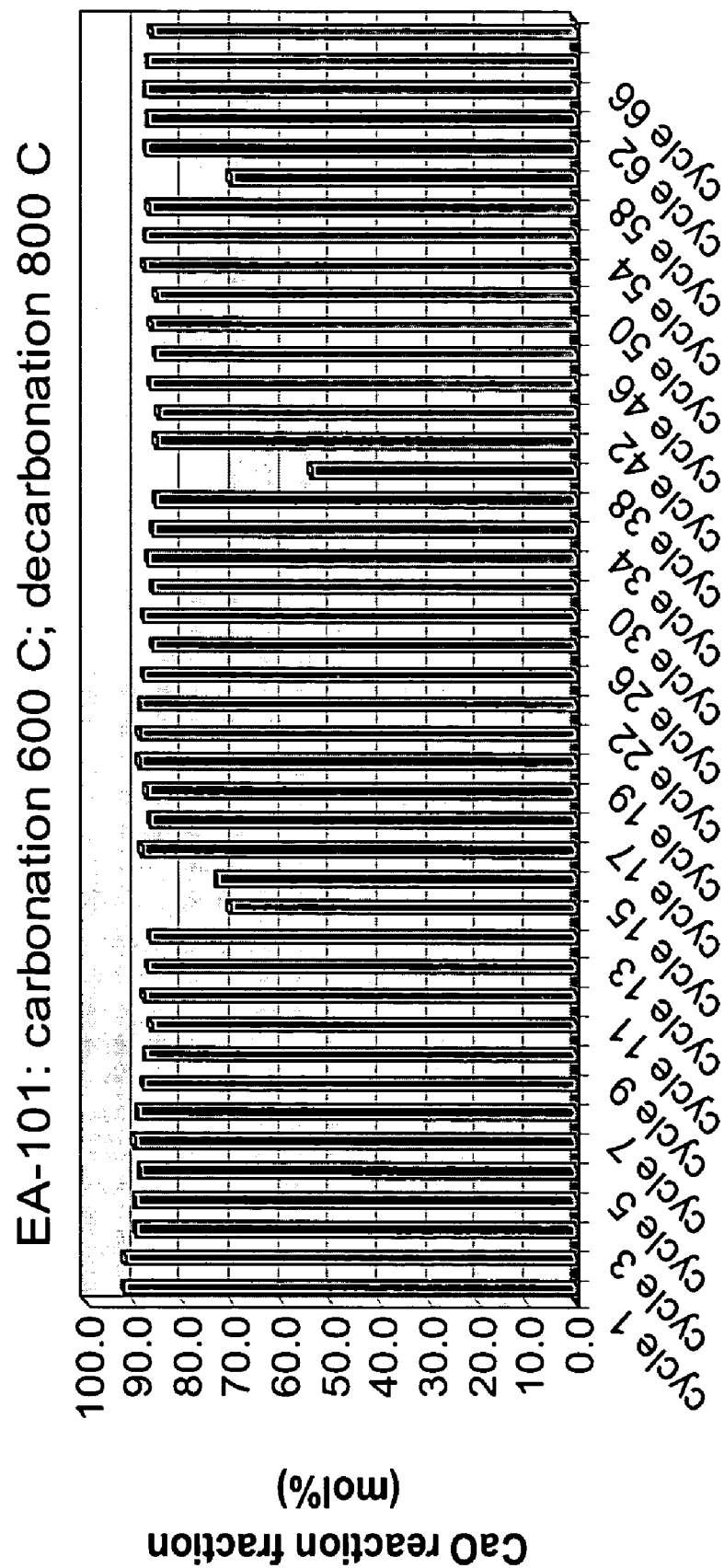
FIG. 55 illustrates the absorption capacity in terms of CaO reaction fraction of pelletized absorbent powders according to the present invention over multiple cycles.
Figure 56:
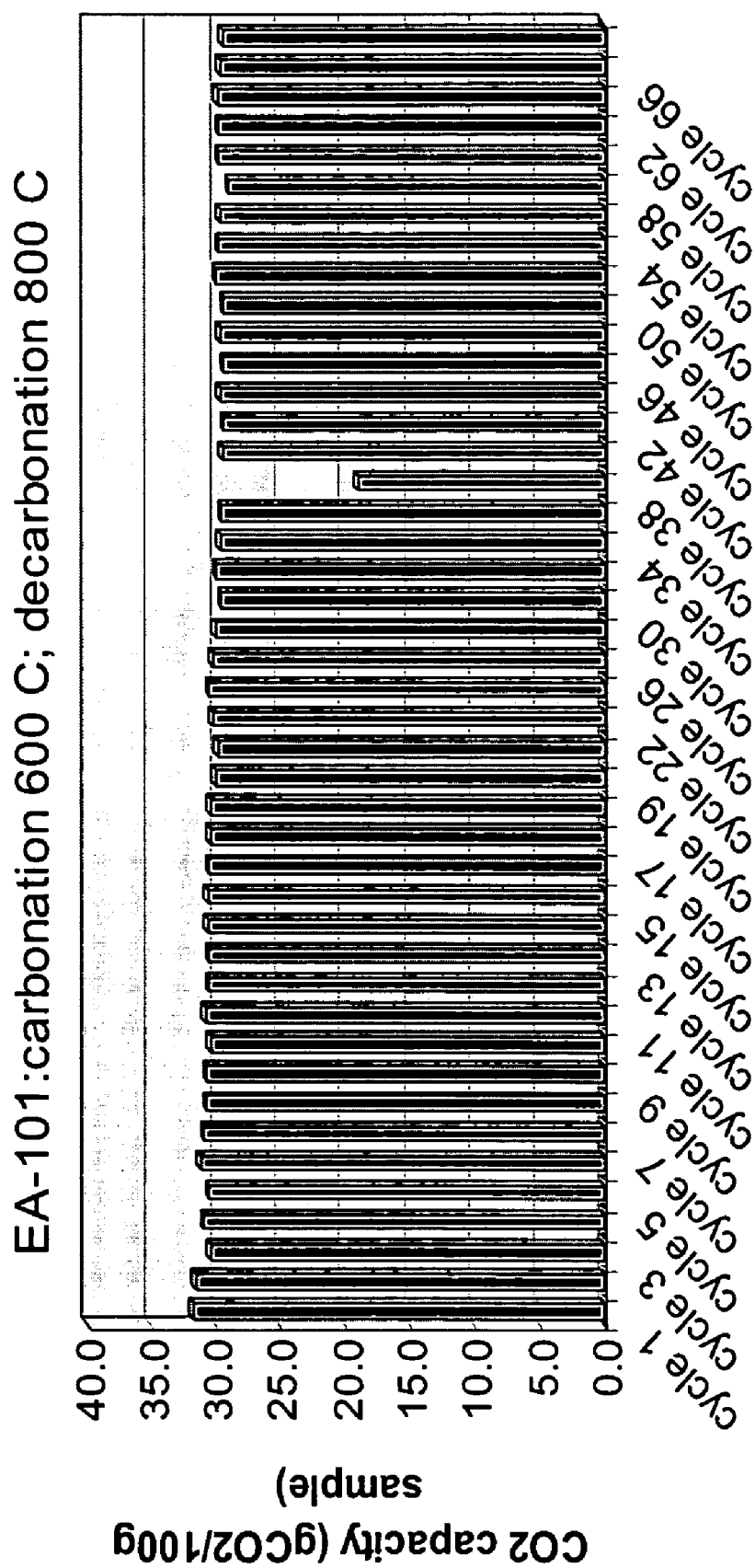
FIG. 56 illustrates the absorption capacity over 66 cycles of pelletized absorbent powders according to the present invention.

FIGS. 55 and 56 illustrate the reactivity and cyclability of extrudate EA-101 made from the powder with CaO/MgO (50:50 wt. ratio) followed by post processing at 500° C. FIG. 55 illustrates the CaO reaction fraction over 66 cycles and FIG. 56 illustrates the $CO_2$ capacity for the same cycle tests. The dips in CaO reaction fraction (e.g., at Cycle 42) is believed to be due to a depletion of the $CO_2$ source. These figures demonstrate that the absorbent powder formed by spray drying and post-processing at 500° C. can be formed into a pellet having a high absorption capacity over a large number of cycles.

Figure 57:
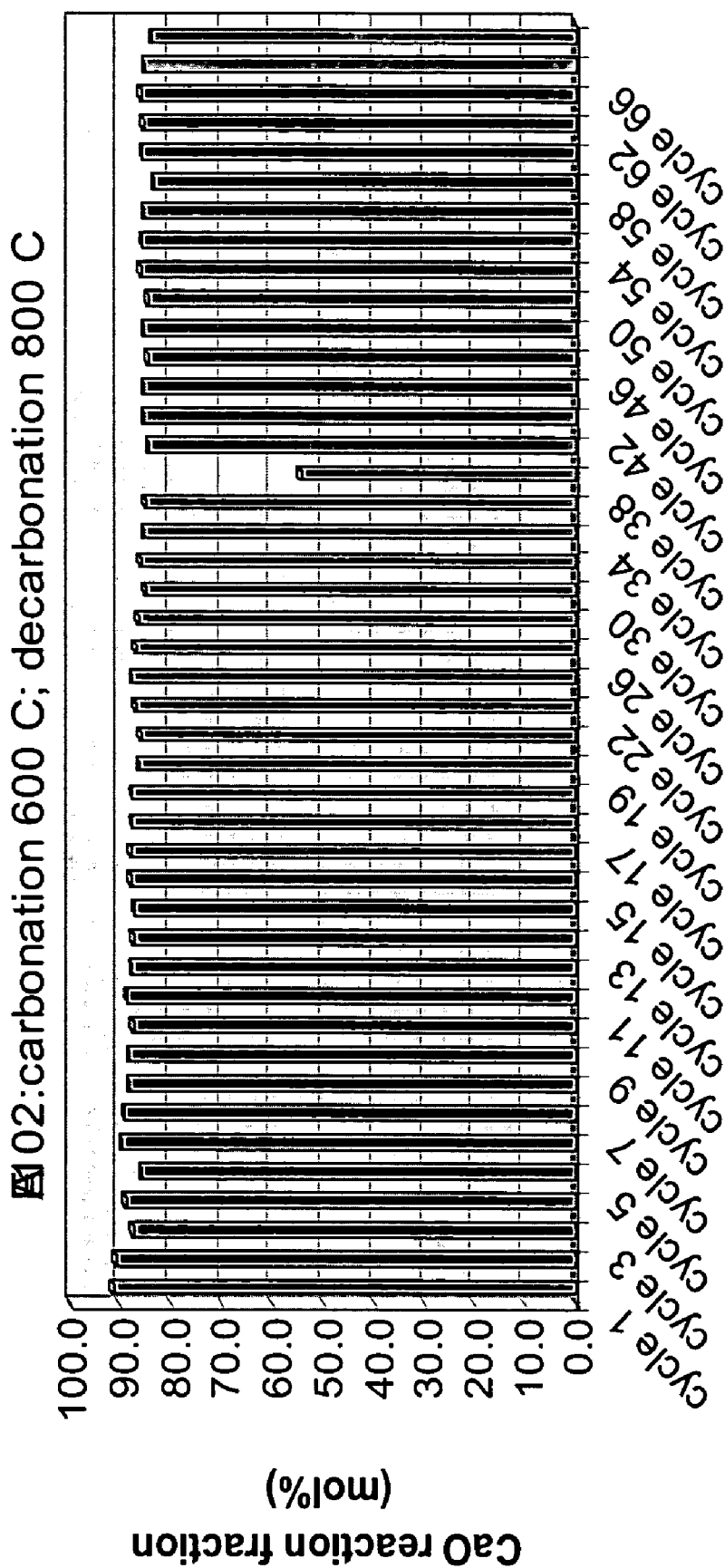
FIG. 57 illustrates the absorption capacity over 66 cycles in terms of CaO reaction fraction of pelletized absorbent powders according to the present invention.
Figure 58:
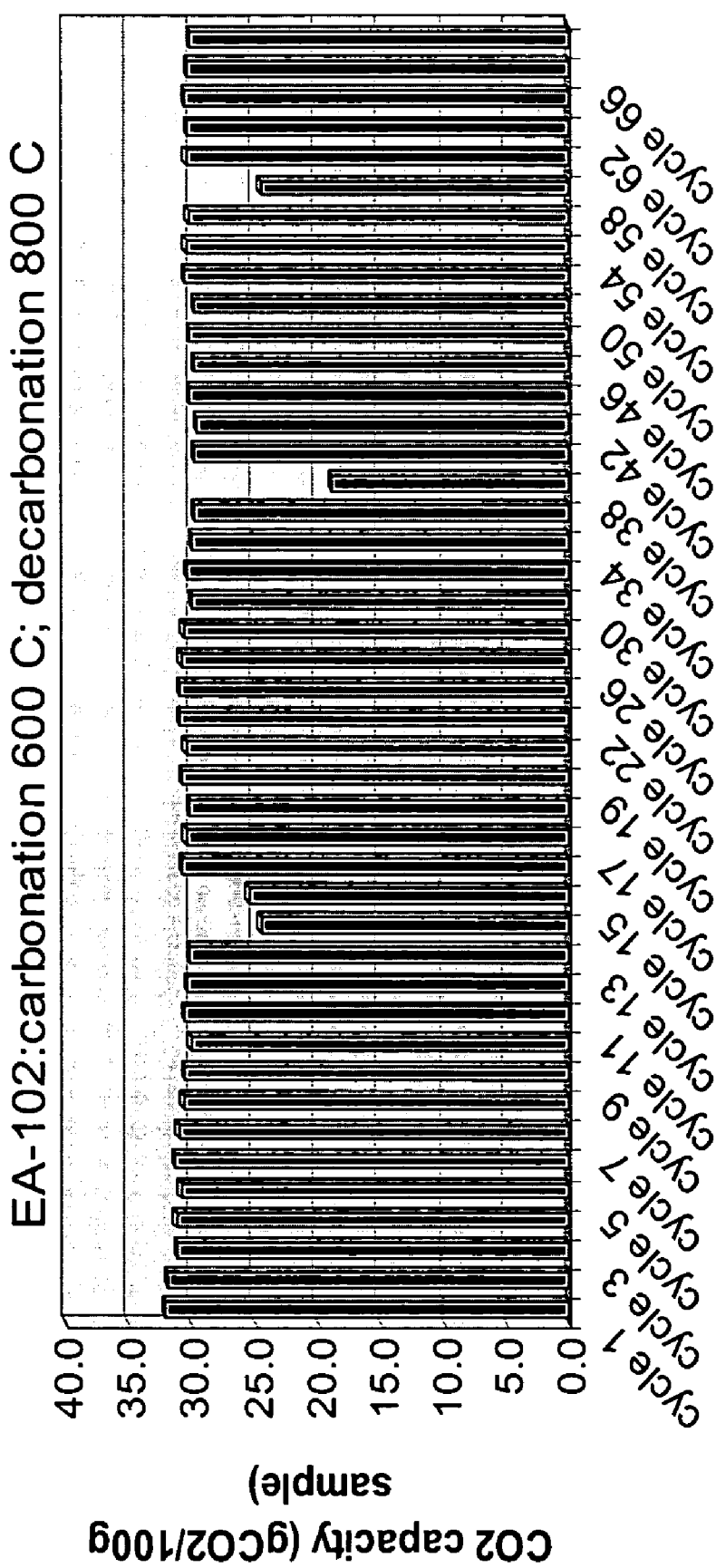
FIG. 58 illustrates the absorption capacity over 66 cycles of pelletized absorbent powders according to the present invention.

FIGS. 57 and 58 illustrate the reactivity and cyclability of extrudate EA-102 made from the powder with CaO:MgO (50:50 wt. ratio) followed by post processing at 750° C. FIG. 57 illustrates the CaO reaction fraction over 66 cycles and FIG. 58 illustrates the $CO_2$ capacity for the same cycle tests. These examples were tested at the same time as the examples illustrated in FIGS. 55 and 56, and the dips in CaO reaction fraction (e.g., at Cycle 42) is believed to be due to a depletion of the $CO_2$ source. These figures demonstrate that the absorbent powder formed by spray drying and post-processing at 750° C. can be formed into a pellet having a high absorption capacity over a large number of cycles.

Figure 59:
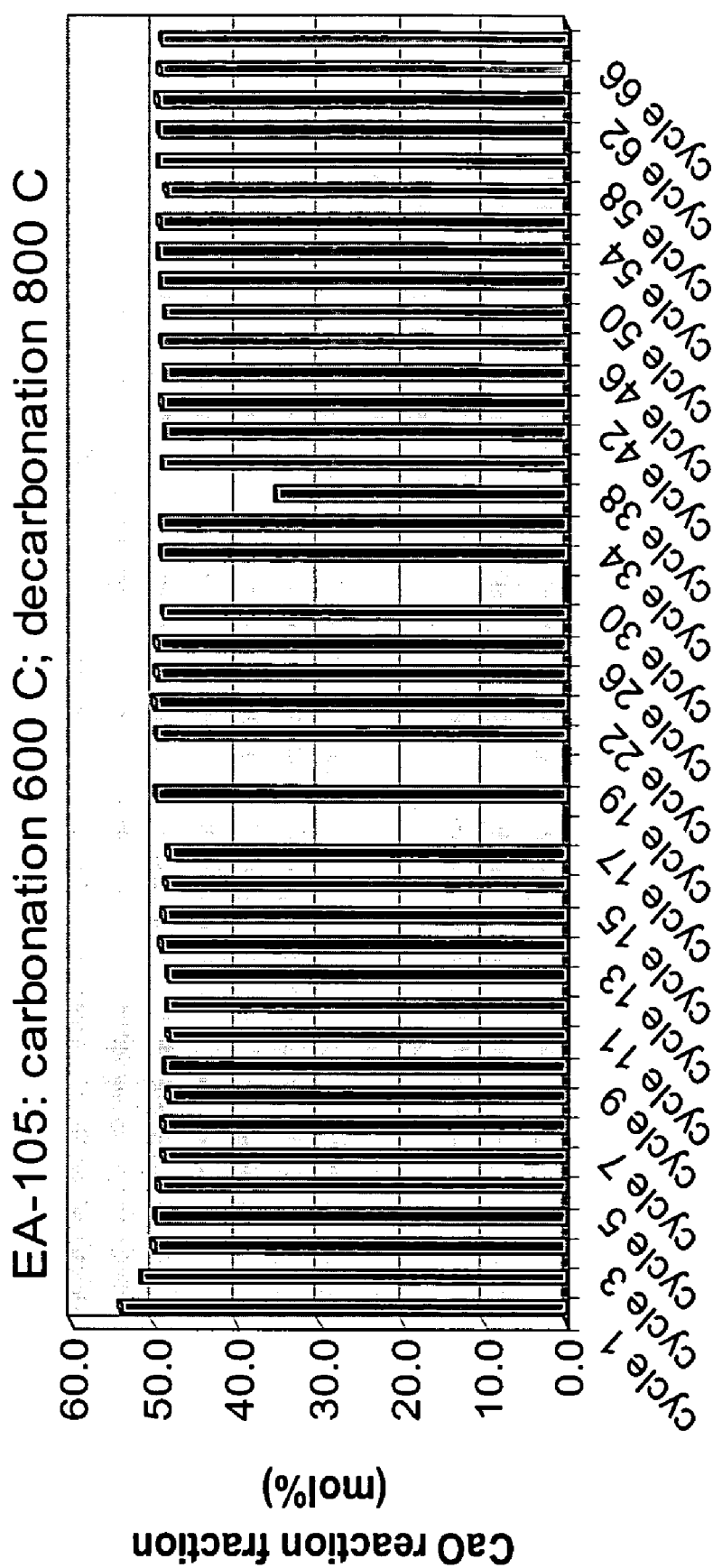
FIG. 59 illustrates the absorption capacity over 66 cycles in terms of CaO reaction fraction of pelletized absorbent powders according to the present invention over multiple cycles.
Figure 60:
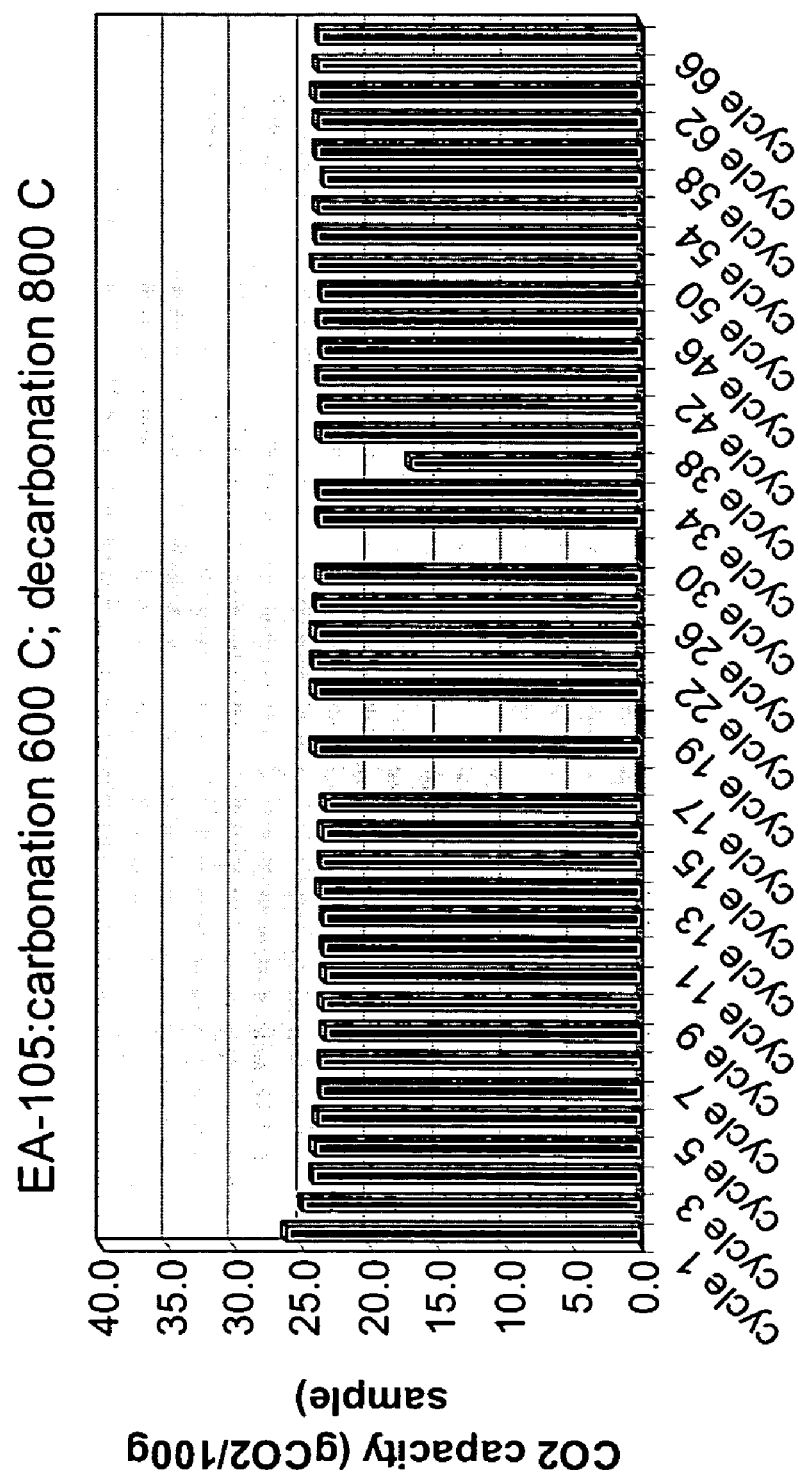
FIG. 60 illustrates the absorption capacity over 66 cycles of pelletized absorbent powders according to the present invention.

FIGS. 59 and 60 illustrate the reactivity and cyclability of extrudate EA-105 made 1.5 from the powder with CaO:MgO (50:50 wt. ratio) containing 33 mol % of $CaTiO_3$ followed by post processing at 750° C. FIG. 59 illustrates the CaO reaction fraction over 66 cycles and FIG. 60 illustrates the $CO_2$ capacity for the same cycle tests. Again, the dips in capacity (e.g., at cycles 17, 30 and 38) are due to depletion of the $CO_2$ source.

Figure 61:
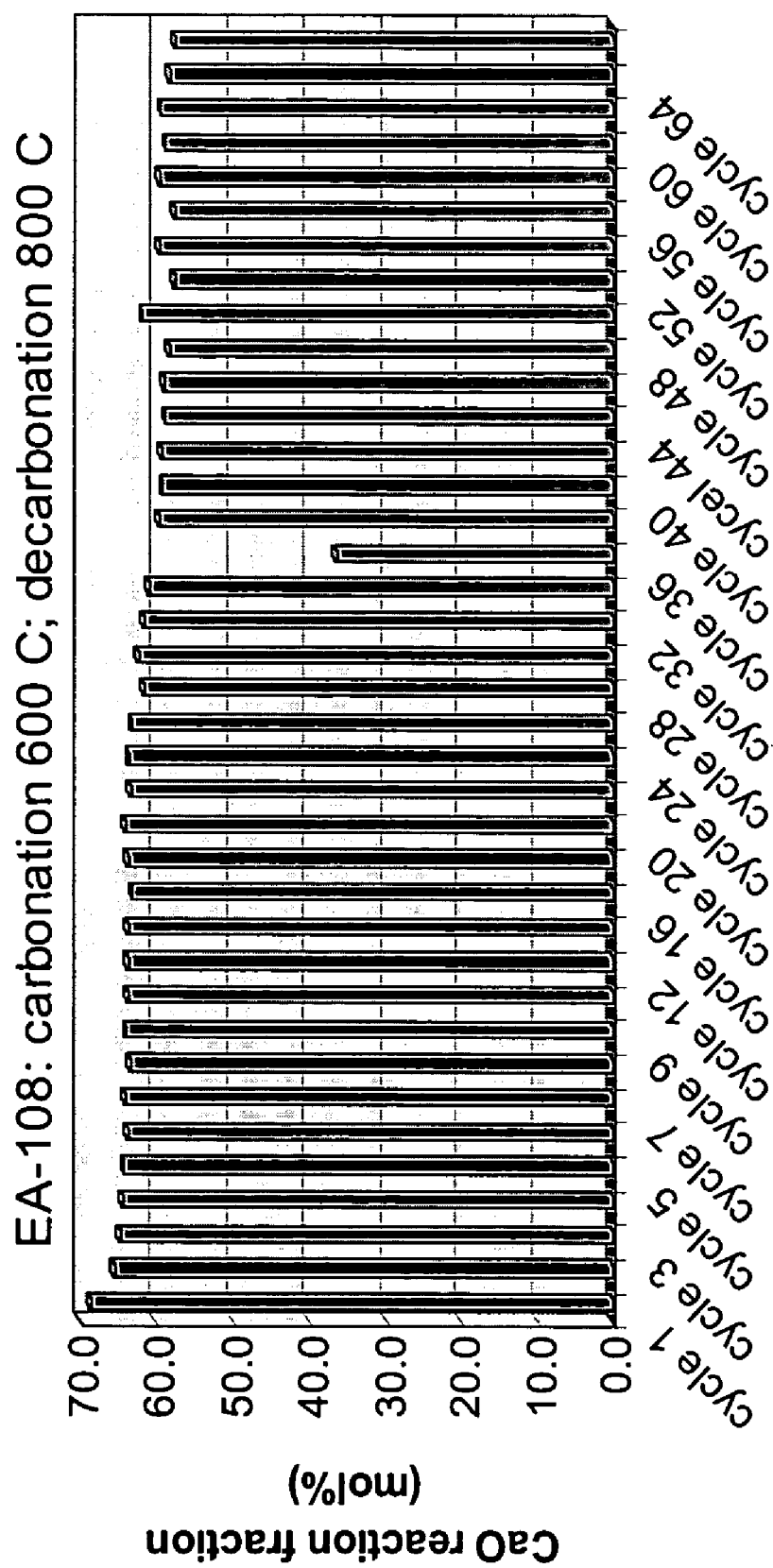
FIG. 61 illustrates the absorption capacity over 64 cycles in terms of CaO reaction fraction of pelletized absorbent powders according to the present invention.
Figure 62:
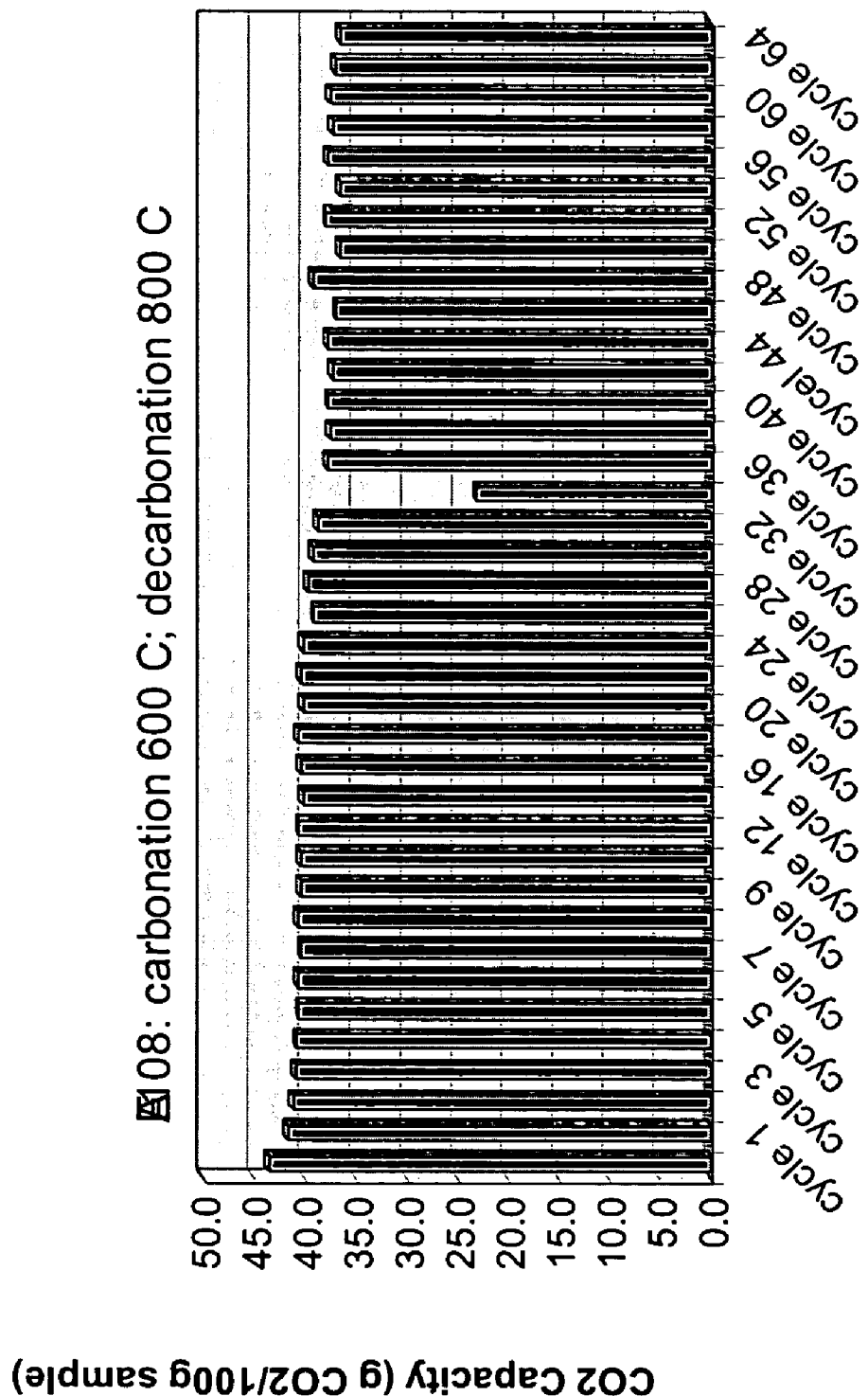
FIG. 62 illustrates the absorption capacity over 64 cycles of pelletized absorbent powders according to the present invention.

FIGS. 61 and 62 illustrate the cyclability of extrudate EA-108 made from the powder with 10 wt. % $Al_2O_3$ followed by post processing at 750° C. FIG. 61 illustrates the CaO reaction fraction over 64 cycles and FIG. 62 illustrates the $CO_2$ capacity for the same cycle tests.

Figure 63:
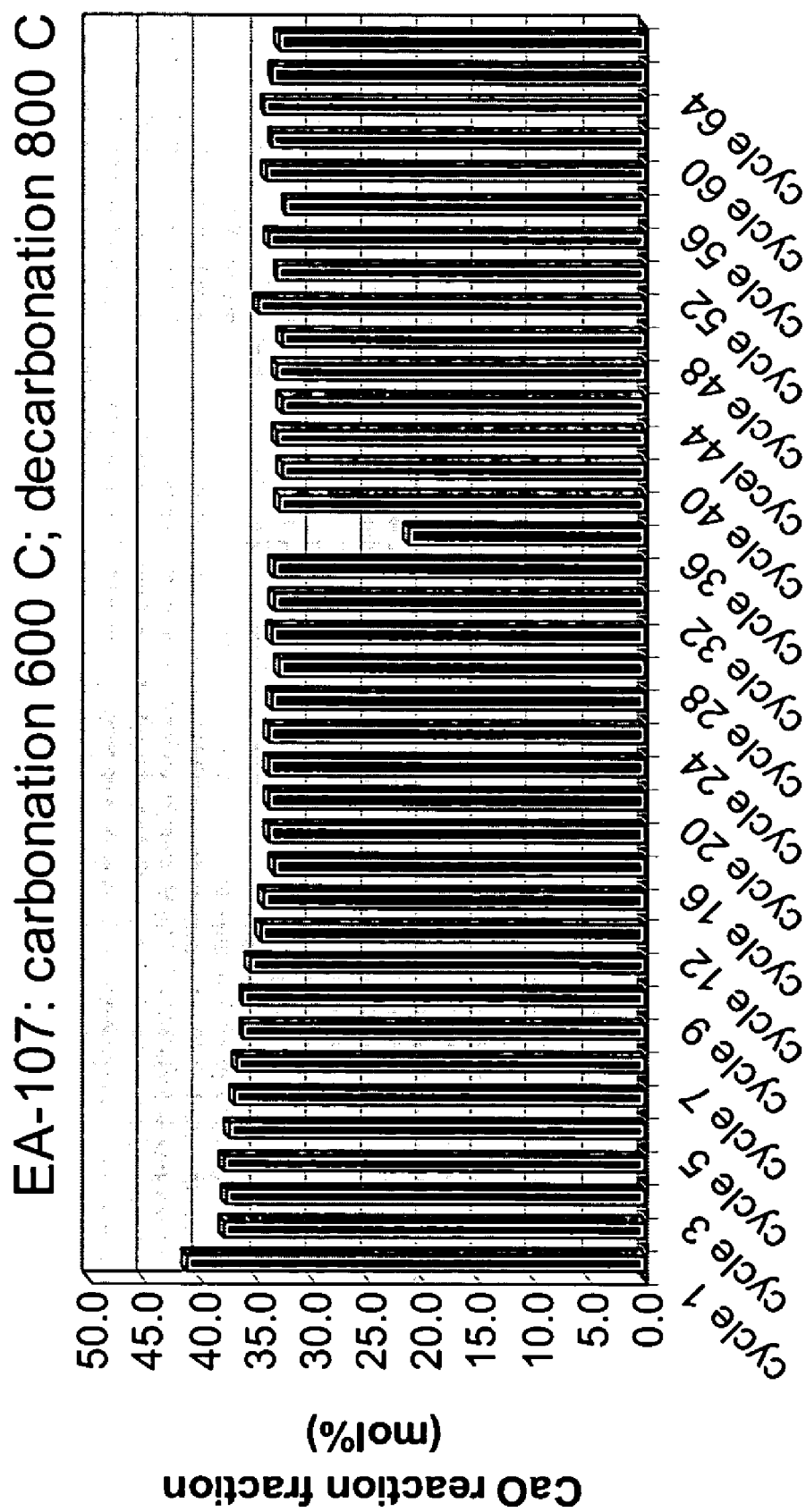
FIG. 63 illustrates the absorption capacity over 64 cycles in terms of CaO reaction fraction of pelletized absorbent powders according to the present invention.

FIG. 63 illustrates the CaO reaction fraction for Extrudate EA-107 made from the powder with 10 wt. % $Al_2O_3$ followed by post processing at 500° C. over 64 cycles.

Performance of Multi-Functional Composites

Figure 64:
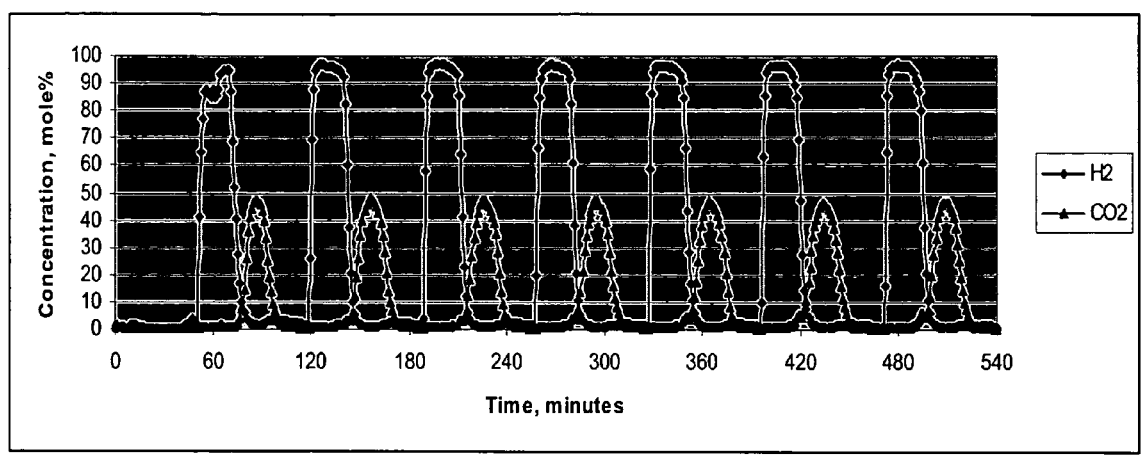
FIG. 64 illustrates the conversion efficiency of a composite absorbent/catalyst material according to an embodiment of the present invention.

FIG. 64 illustrates the cycling results of steam methane reforming over materials according to the present invention, namely a combination of mechanical mixing of SMR catalysts with CaO-based reversible $CO_2$ absorbents, namely the combination of pellets, which are extruded from powders of calcium oxalate containing 5% $Al_2O_3$ and CaO. The weight ratio of catalyst to absorbent is 1:5. The steam reforming of methane is conducted under conditions of $H_2O$:C of 3:1 and a temperature of 600° C.

Figure 65:
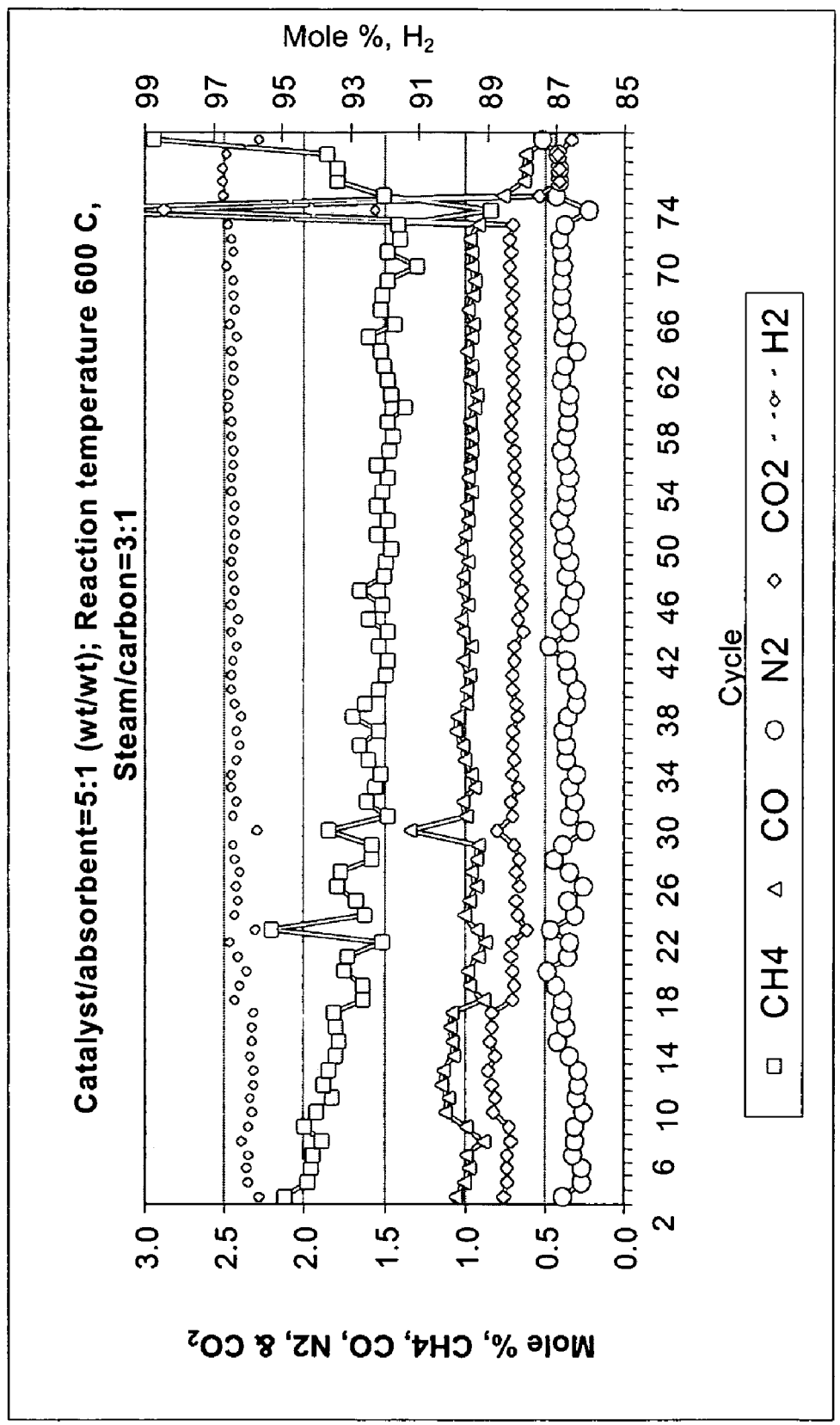
FIG. 65 illustrates the conversion efficiency of a composite absorbent/catalyst material according to an embodiment of the present invention.

FIG. 65 illustrates that with a single step, hydrogen-containing gas can be produced with a $H_2$ purity of more than 96% (dry basis). The CO is around 1.0 mol. % and $CO_2$ is less than 0.5 mol. %. The high and stable hydrogen concentration as a function of cycle number demonstrates the utility of the materials according to the present invention. These results are significantly different from the conventional steam methane reforming, in which the reformate typically includes only about 45% to 55% hydrogen (dry basis), and more than 20% carbon oxides including about 10% CO.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for the conversion of a carbon-based fuel to a $H_2$-rich product gas, comprising the steps of:
   (a) providing a carbon-based fuel;
   (b) converting said carbon-based fuel to an intermediate gas product by contacting said carbon-based fuel with at least a first conversion catalyst;
   (c) contacting said intermediate gas product with an absorbent material to absorb $CO_2$ and form a $H_2$-rich gas, said absorbent material having a theoretical absorption capacity for $CO_2$ and having an initial surface area of at least about 5 $m^2/g$ and an initial pore volume of at least about 0.01 $cm^3/g$;
   (d) extracting said $H_2$-rich gas from said contacting step;
   (e) regenerating said absorbent; and
   (f) repeating said steps (a), (b), (c), (d) and (e) at least 50 times, wherein said absorbent material retains at least about 50 mol. % of said theoretical absorption capacity after each of said repeating steps.

2. A method as recited in claim 1, wherein said converting step comprises steam reforming of said carbon-based fuel.

3. A method as recited in claim 2, wherein said first conversion catalyst is a steam reforming catalyst.

4. A method as recited in claim 1, wherein said converting step is selected from the group consisting of auto-thermal reforming, partial oxidation and catalytic partial oxidation of said carbon-based fuel.

5. A method as recited in claim 1, further comprising the step of contacting said $H_2$-rich gas with a water-gas shift catalyst.

6. A method as recited in claim 1, wherein said repeating step comprises repeating steps (a), (b), (c),(d) and (e) at least 100 times.

7. A method as recited in claim 1, wherein said repeating step comprises repeating steps (a), (b), (c), (d) and (e) at least 500 times.

8. A method as recited in claim 1, wherein said absorbent material retains at least about 70 mol. % of said theoretical capacity after said repeating step.

9. A method as recited in claim 1, wherein said absorbent material retains at least about 90 mol. % of said theoretical capacity after said repeating step.

10. A method as recited in claim 1, wherein said repeating step comprises repeating steps (a), (b), (c), (d) and (e) at least 200 times and wherein said absorbent material retains at least about 10 mol. % of said theoretical absorption capacity after said repeating step.

11. A method as recited in claim 1, wherein said repeating step comprises repeating steps (a), (b), (c), (d) and (e) at least 200 times and wherein said absorbent material retains at least about 25 mol. % of said theoretical absorption capacity after said repeating step.

12. A method as recited in claim 1, wherein said repeating step comprises repeating steps (a), (b), (c), (d) and (e) at least 200 times and wherein said absorbent material retains at least about 50 mol. % of said theoretical absorption capacity after said repeating step.

13. A method as recited in claim 1, wherein said absorbent material comprises at least one metal oxide selected from the group consisting of Group 1 and Group 2 metal oxides.

14. A method as recited in claim 1, wherein said absorbent material comprises a calcium-containing compound.

15. A method as recited in claim 1, wherein said absorbent material comprises CaO.

16. A method as recited in claim 1, wherein said absorbent material is selected from a group consisting of $CaO:MgO$, $CaO:Al_2O_3$, $CaO:TiO_2$, $CaO:ZrO_2$ and $CaO:Al_2O_3:MgO$.

17. A method as recited in claim 1, wherein said absorbent material comprises $CaO:Al_2O_3$.

18. A method as recited in claim 1, wherein said absorbent material comprises $CaO:TiO_2$.

19. A method as recited in claim 1, wherein said absorbent material comprises at least 30 wt. % CaO.

20. A method as recited in claim 1, wherein said absorbent material comprises $Li_2O$.

21. A method as recited in claim 1, wherein said contacting step occurs at a temperature of not greater than about 800° C.

22. A method as recited in claim 1, wherein said carbon-based fuel is a hydrocarbon-based fuel.

23. A method as recited in claim 1, wherein said carbon-based fuel is a gaseous fuel.

24. A method as recited in claim 1, wherein said carbon-based fuel comprises methane.

25. A method as recited in claim 1, wherein said carbon-based fuel comprises a liquid fuel.

26. A method as recited in claim 1, wherein said carbon-based fuel comprises a liquid fuel selected from the group consisting of diesel fuel, JP-8 aviation fuel, kerosene, ethanol and gasoline.

27. A method as recited in claim 1, wherein said $H_2$-rich gas comprises at least about 95 mol. % $H_2$ after each said repeating steps.

28. A method as recited in claim 1, wherein said regenerating step comprises heating said absorbent material to a temperature of at least about 700° C.

29. A method as recited in claim 1, wherein said absorbent material is pelletized.

30. A method as recited in claim 1, wherein said absorbent material is in the form of a monolith.

31. A method as recited in claim 1, wherein said absorbent material is in the form of an extrudate.

32. A method as recited in claim 1, wherein said first conversion catalyst is pelletized.

33. A method as recited in claim 1, wherein said absorbent and said first conversion catalyst are formed into extrudates, at least a portion of said extrudates comprise both of said absorbent and said first conversion catalyst.

34. A method as recited in claim 1, wherein said absorbent material is coated on a support structure.

35. A method as recited in claim 1, wherein said absorbent material has substantially spherical morphology.

36. A method as recited in claim 1, wherein said absorbent material retains at least about 10 grams $CO_2$ per 100 grams unreacted absorbent compound after each of said repeating steps.

37. A method as recited in claim 1, wherein said absorbent material retains at least about 20 grams $CO_2$ per 100 grams unreacted absorbent compound after each of said repeating steps.

38. A method as recited in claim 1, wherein said absorbent material retains at least about 40 grams $CO_2$ per 100 grams unreacted absorbent compound after each of said repeating steps.

39. A method as recited in claim 1, further comprising providing steam with said carbon-based fuel.

40. A method as recited in claim 1, further comprising providing an oxygen-containing gas with said carbon-based fuel.

41. A method as recited in claim 1, wherein said absorbent material is pelletized and wherein said contacting step comprises contacting said intermediate gas product with said pelletized absorbent material having a first bulk density, wherein said repeating steps convert said pelletized absorbent material to a carbonized absorbent material having a second bulk density, and after said repeating steps said carbonized absorbent material has a third bulk density, wherein said third bulk density is greater than said first bulk density.

42. A method as recited in claim 41, wherein said third bulk density is up to about 140% of said first bulk density.

43. A method as recited in claim 1, wherein said carbon-based fuel comprises methane and wherein said first conversion catalyst comprises:
  (a) a particulate support structure; and
  (b) a metal dispersed on said support structure, wherein said conversion catalyst is capable of achieving at least about 90% of the theoretical thermodynamic conversion of methane to hydrogen at a temperature of 600° C., a $H_2O:C$ ratio of 3:1 and a gas hour space velocity (GHSV) of 5000 $h^{-1}$ in the absence of an absorbent for $CO_2$.

44. A method as recited in claim 43, wherein said catalyst is capable of achieving at least about 95% of the theoretical thermodynamic conversion.

45. A method as recited in claim 43, wherein said catalyst is capable of achieving at least about 90% of the theoretical thermodynamic conversion of methane to hydrogen at a temperature of 600° C., a $H_2O:C$ ratio of 3:1 and a gas hour space velocity (GHSV) of 10000 $h^{-1}$ in the absence of an absorbent for $CO_2$.

46. A method as recited in claim 43, wherein said catalyst is capable of achieving at least about 90% of the theoretical thermodynamic conversion of methane to hydrogen at a temperature of 600° C., a $H_2O:C$ ratio of 3:1 and a gas hour space velocity (GHSV) of 12500 $h^{-1}$ in the absence of an absorbent for $CO_2$.

47. A method as recited in claim 43, wherein said support is selected from the group consisting of the metal oxides of aluminum, cerium, zirconium, lanthanum, silicon, magnesium, zinc and combinations thereof.

48. A method as recited in claim 43, wherein said dispersed metal is selected from the group consisting of Rh, Ni, Ru, Pt, Pd and alloys thereof.

49. A method as recited in claim 43, wherein said dispersed metal comprises Rh.

50. A method as recited in claim 43, wherein said conversion catalyst comprises from about 0.1 wt. % to about 5 wt. % of said metal.

51. A method as recited in claim 43, wherein said support structure comprises $Al_2O_3$ and said dispersed metal comprises Rh.

52. A method as recited in claim 43, wherein said conversion catalyst is pelletized.

53. A method as recited in claim 43, wherein said conversion catalyst is coated on a support.

54. A method as recited in claim 43, wherein said conversion catalyst has substantially spherical morphology.

55. A method as recited in claim 43, further comprising the step of contacting said intermediate gas phase with a water-gas shift catalyst.

56. A method as recited in claim 55, wherein said water-gas shift catalyst comprises a metal dispersed on a support phase, said metal being selected from the group consisting of Fe, Co, Cu and Cr.

57. A method as recited in claim 1, wherein said absorbent material and said first conversion catalyst are in the form of a particulate composite material, said particulate composite material comprising a first phase comprising said absorbent material, and a second phase comprising said conversion catalyst.

58. A method as recited in claim 57, wherein the mass ratio of said first phase to said second phase is greater than 1:1.

59. A method as recited in claim 57, wherein the mass ratio of said first phase to said second phase is from about 20:1 to about 3:1.

60. A method as recited in claim 57, wherein the mass ratio of said first phase to said second phase is from about 9:1 to about 5:1.

61. A method as recited in claim 57, wherein said particulate composite material is pelletized.

62. A method as recited in claim 57, wherein said particulate composite material is coated on a support structure.

63. A method as recited in claim 57, wherein said particulate composite material is a monolithic structure.

64. A method as recited in claim 57, wherein said particulate composite material has an average particle size ($d_{50}$) of from about 1 µm to about 50 µm.

65. A method as recited in claim 1, wherein said initial surface area is at least about 10 $m^2/g$.

66. A method as recited in claim 1, wherein said initial surface area is at least about 15 $m^2/g$.

67. A method as recited in claim 1, wherein said initial pore volume is at least about 0.04 $cm^3/g$.

68. A method as recited in claim 1, wherein said initial pore volume is at least about 0.15 $cm^3/g$.

69. A method as recited in claim 1, wherein said absorbent material is fabricated by spray processing.

70. A method for the conversion of a carbon-based fuel to a $H_2$-rich product gas, comprising the steps of:
 (a) providing a carbon-based fuel;
 (b) converting said carbon-based fuel to an intermediate gas product by contacting said carbon-based fuel with at least a first conversion catalyst;
 (c) contacting said intermediate gas product with an absorbent material selected from the group consisting of $CaO:Al_2O_3$, $CaO:TiO_2$, $Li_2O$ to absorb $CO_2$ and form a $H_2$-rich gas, said absorbent material having a theoretical absorption capacity for $CO_2$ and having an initial surface area of at least about 5 $m^2/g$ and an initial pore volume of at least about 0.01 $cm^3/g$;
 (d) extracting said $H_2$-rich gas from said contacting step;
 (e) regenerating said absorbent; and
 (f) repeating said steps (a), (b), (c), (d) and (e) at least 10 times, wherein said absorbent material retains at least about 50 mol. % of said theoretical absorption capacity after each of said repeating steps.

71. A method as recited in claim 70, wherein said absorbent material comprises $CaO:Al_2O_3$.

72. A method as recited in claim 70, wherein said absorbent material comprises $CaO:TiO_2$.

73. A method as recited in claim 70, wherein said absorbent material comprises $Li_2O$.

74. A method as recited in claim 70, wherein said absorbent material retains at least about 70 mol. % of said theoretical capacity after said repeating step.

75. A method as recited in claim 70, wherein said absorbent material retains at least about 90 mol. % of said theoretical capacity after said repeating step.

76. A method as recited in claim 70, wherein said repeating step comprises repeating steps (a), (b), (c), (d) and (e) at least 200 times and wherein said absorbent material retains at least about 10 mol. % of said theoretical absorption capacity after said repeating step.

77. A method as recited in claim 70, wherein said repeating step comprises repeating steps (a), (b), (c), (d) and (e) at least 200 times and wherein said absorbent material retains at least about 25 mol. % of said theoretical absorption capacity after said repeating step.

78. A method as recited in claim 70, wherein said repeating step comprises repeating steps (a), (b), (c), (d) and (e) at least 200 times and wherein said absorbent material retains at least about 50 mol. % of said theoretical absorption capacity after said repeating step.

79. A method as recited in claim 70, wherein said carbon-based fuel is a gaseous fuel.

80. A method as recited in claim 70, wherein said carbon-based fuel is a liquid fuel.

* * * * *